US011802230B2

(12) United States Patent
Novek

(10) Patent No.: US 11,802,230 B2
(45) Date of Patent: Oct. 31, 2023

(54) LIQUID-LIQUID PHASE TRANSITION COMPOSITIONS AND PROCESSES

(71) Applicant: SOLVCOR TECHNOLOGIES LLC, Houston, TX (US)

(72) Inventor: Ethan J. Novek, Princeton, NJ (US)

(73) Assignee: SOLVCOR TECHNOLOGIES LLC, Houston, TX (US)

( * ) Notice: Subject to any disclaimer, the term of this patent is extended or adjusted under 35 U.S.C. 154(b) by 0 days.

(21) Appl. No.: 17/198,834

(22) Filed: Mar. 11, 2021

(65) Prior Publication Data

US 2022/0017802 A1 Jan. 20, 2022

Related U.S. Application Data

(60) Provisional application No. 62/987,972, filed on Mar. 11, 2020.

(51) Int. Cl.
| | | |
|---|---|---|
| *C09K 5/02* | (2006.01) | |
| *C09K 5/10* | (2006.01) | |
| *C08L 71/02* | (2006.01) | |
| *F24F 5/00* | (2006.01) | |

(52) U.S. Cl.
CPC ............ *C09K 5/10* (2013.01); *C08L 71/02* (2013.01); *C09K 5/02* (2013.01); *F24F 5/0021* (2013.01)

(58) Field of Classification Search
CPC . C09K 3/18; C09K 3/185; C09K 5/02; C09K 5/10; C09K 5/20; C08L 71/02
See application file for complete search history.

(56) References Cited

U.S. PATENT DOCUMENTS

| | | | | |
|---|---|---|---|---|
| 4,876,035 A * | 10/1989 | Breitzke | ........... | A61K 8/463 |
| | | | | 516/14 |
| 5,674,559 A * | 10/1997 | Riemer | ........... | C09K 9/02 |
| | | | | 156/332 |
| 2006/0235114 A1* | 10/2006 | Kitazono | ........... | C08L 71/02 |
| | | | | 524/27 |
| 2012/0214638 A1 | 8/2012 | Hart et al. | | |
| 2014/0027668 A1* | 1/2014 | Poncelet | ........... | C09K 5/20 |
| | | | | 252/73 |
| 2014/0190644 A1* | 7/2014 | Townsend | ........... | D21H 21/146 |
| | | | | 162/111 |
| 2015/0291868 A1* | 10/2015 | Rajagopalan | ....... | F28D 20/0056 |
| | | | | 252/73 |
| 2017/0267538 A1 | 9/2017 | Novek | | |
| 2019/0143260 A1 | 5/2019 | Novek | | |
| 2019/0233697 A1* | 8/2019 | Novek | ........... | C09K 5/047 |

FOREIGN PATENT DOCUMENTS

| | | | | |
|---|---|---|---|---|
| JP | 2012214638 A | 11/2012 | | |
| WO | WO-0170900 A1 * | 9/2001 | ........... | C09K 5/10 |

OTHER PUBLICATIONS

Cheluget et al. ("Liquid-liquid equilibrium of aqueous mixtures of poly(propylene glycol) with NaCl", J. Chem. Eng. Data, 1994, 39, 127-130) (Year: 1994).*
Ho-Gutierrez et al. ("Liquid-liquid equilibrium of aqueous mixtures of poly(ethylene glycol) with Na2SO4 or NaCl", J. Chem. Eng. Data, 1994, 39, 245-248) (Year: 1994).*
Regupathi et al. ("Liquid-liquid equilibrium of poly(ethylene glycol) 6000 + triammonium citrate + water systems at different temperatures," J. Chem. Eng. Data, 2009, 54, 1094-1097) (Year: 2009).*
Lee et al. ("UCST and LCST phase behavior of poly(trimethylene ether) glycol in water," Journal of Polymer Science Part A: Polymer Chemistry, 2012, 50,4311-4315) (Year: 2012).*
Yao et al. ("Tuning phase behavior of PEG-functionalized ionic liquids from UCST to LCST in alcohol-water mixtures," Phys. Chen. Chem. Phys., 2016, 18, 29192-29198) (Year: 2016).*
Grozdanic, Nikola E. et al, Liquid-liquid phase equilibria in nicotine (aqueous) solutions, Fluid Phase Equilibria, 310 (2011) pp. 198-206.
Elbert, Donald L. Liquid-liquid two-phase systems for the production of porous hydrogels and hydrogel Microspheres for biomedical Applications: A Tutorial Review, Acta Biomaterialia, 7 (2011) pp. 31-56.
International Search Report and Written Opinion dated Aug. 30, 2021 issued in International Application No. PCT/US2021/021874.

* cited by examiner

*Primary Examiner* — Matthew R Diaz
(74) *Attorney, Agent, or Firm* — Hunton Andrews Kurth LLP

(57) ABSTRACT

The present application pertains to liquid-liquid phase transition compositions and processes. In one embodiment a liquid-liquid phase transition process comprises first forming a composition comprising a glycol polymer and water and then phase transitioning the composition at or above the composition's cloud point temperature to form at least two liquid phases. The enthalpy of liquid-liquid phase transition may be greater than 5 kJ per kg as measured by a calorimeter and each liquid phase may have unique and advantageous properties. In another embodiment the application pertains to compositions suitable for liquid-liquid phase transition compositions.

18 Claims, 2 Drawing Sheets

LIQUID-LIQUID PHASE TRANSITION COMPOSITIONS AND PROCESSES

CROSS-REFERENCE TO RELATED APPLICATIONS

The present application claims priority to U.S. provisional application 62/987,972 filed Mar. 11, 2020 which application is incorporated herein by reference.

BACKGROUND AND SUMMARY OF INVENTION

The present application pertains to compositions for liquid-liquid phase transition liquids. Embodiments include novel classes of liquids and novel liquid-liquid phenomena. Applications may include, but are not limited to, one or more or a combination of the following: heat transfer, cool transfer, refrigeration cycles, osmotic heat engines, HVAC, drilling fluids, oil & gas drilling, forward osmosis, osmotically assisted reverse osmosis, osmotically assisted nanofiltration, osmotic processes, gas separation, separations, extractions, thermal storage, thermal transport, district heating, or sensors. Desirable properties may include, but are not limited to, one or more or a combination of the following: a large enthalpy of phase transition, an enthalpy of phase transition in the temperature range of an application, a large total heat capacity in temperature range of an application, density difference between liquid phases, separability of liquid phases, a low viscosity, or a reversible liquid-liquid phase transition.

DETAILED DESCRIPTION

Example Definitions

Figure 1:
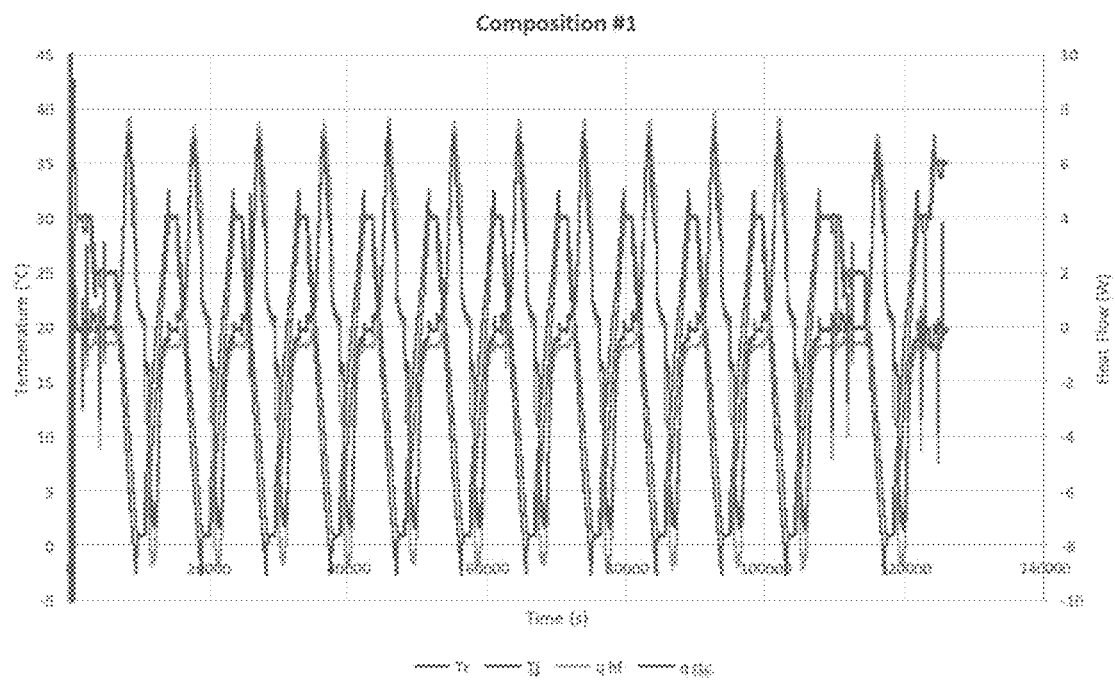
FIG. 1 is RC1 Graph all cycles for Composition #1. Tr is the Composition temperature, Tj is the instrument jacket temperature, q hf is the heat flow, q rtc is the heat flux. The enthalpy of phase transition of Composition #1 was fully reversible and repeatable. Composition #1 showed consistent enthalpy of phase transition and specific heat capacity throughout 12 consecutive heating+cooling cycles, with no degradation and less than 0.8% standard deviation (within the expected noise of the RC1 instrument). Heating enthalpies of phase transition absorbed the same amount of heat as was released during cooling enthalpies of phase transition with a less than 0.8% standard deviation (within the expected noise of the RC1 instrument).
Figure 2:
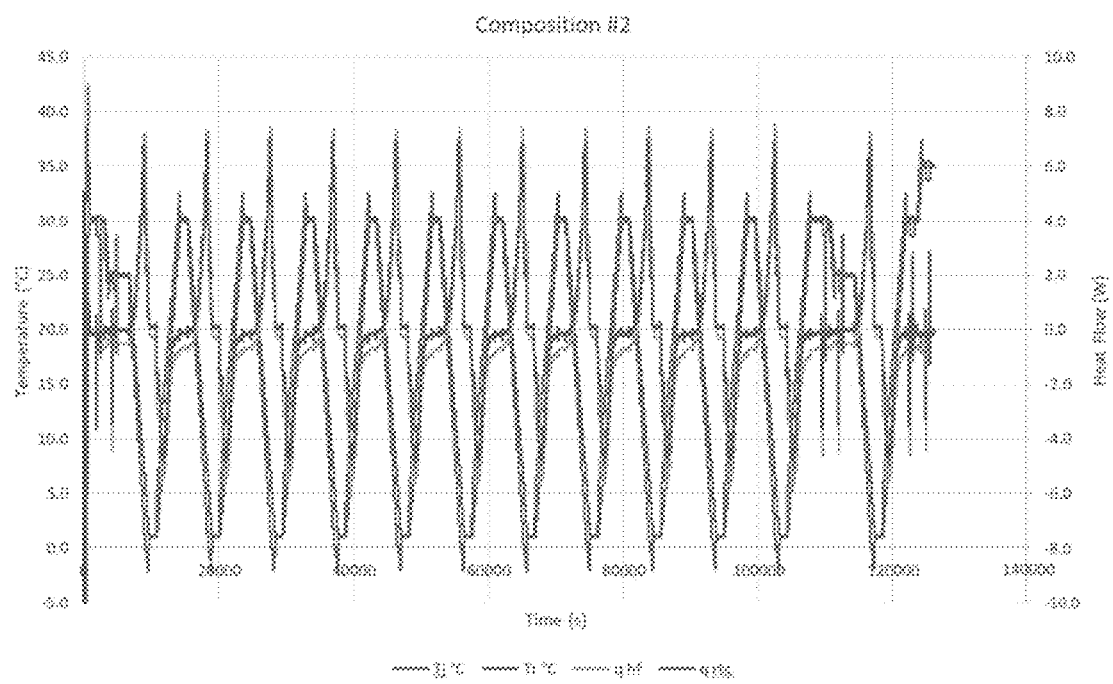
FIG. 2 is RC1 Graph all cycles for Composition #2. Tr is the Composition temperature, Tj is the instrument jacket temperature, q hf is the heat flow, q rtc is the heat flux. The enthalpy of phase transition of Composition #2 was fully reversible and repeatable. Composition #2 showed consistent enthalpy of phase transition and specific heat capacity throughout 12 consecutive heating+cooling cycles, with no degradation and less than 0.8% standard deviation (within the expected noise of the RC1 instrument). Heating enthalpies of phase transition absorbed the same amount of heat as was released during cooling enthalpies of phase transition with a less than 0.8% standard deviation (within the expected noise of the RC1 instrument).
Figure 3:
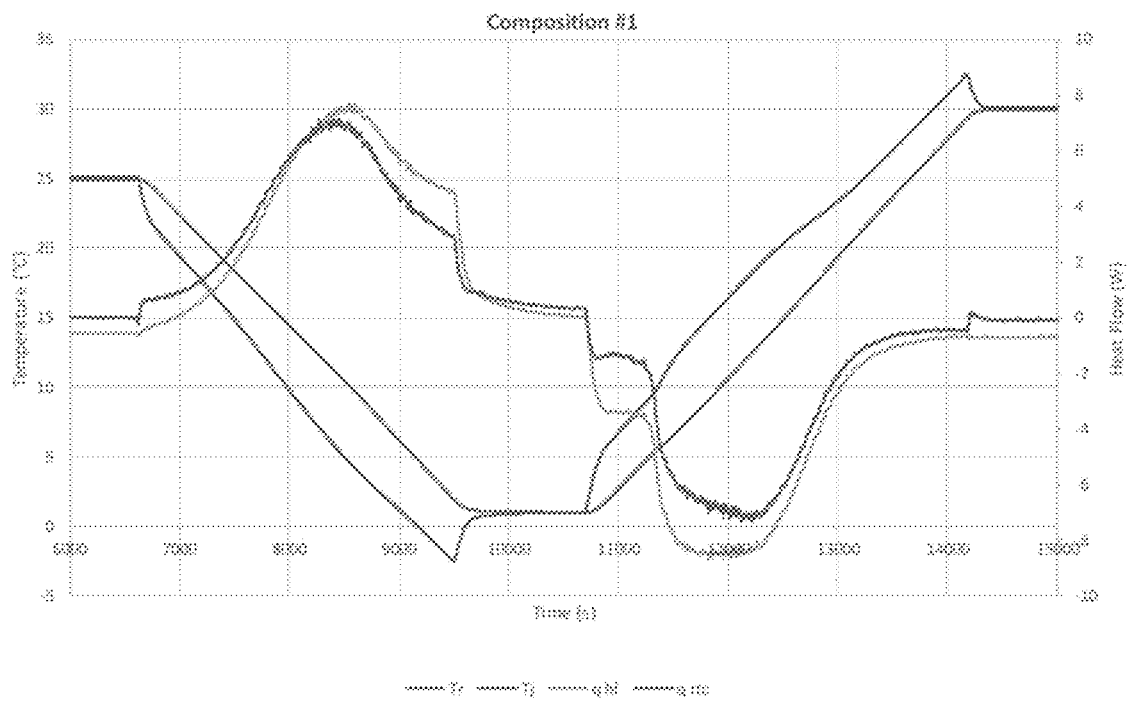
FIG. 3 is RC1 Graph one cycle for Composition #1. Tr is the Composition temperature, Tj is the instrument jacket temperature, q hf is the heat flow, q rtc is the heat flux. Tr represents the temperature of the reactor and Tj represents the jacket temperature, Tr and Tj reference the left side Y-axis labels ('Temperature'). The q hf and q rtc represent the heat flow and heat flux, respectively, and are represented by the right-side Y-axis labels ('Heat Flow')
Figure 4:
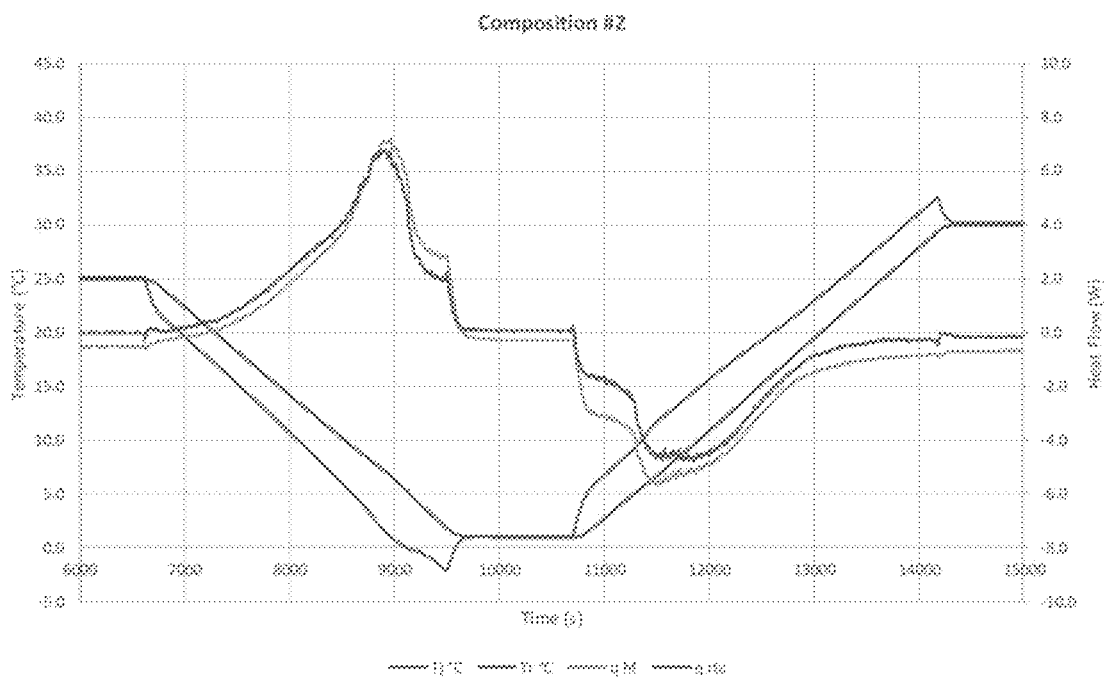
FIG. 4 is RC1 Graph one cycle for Composition #2. Tr is the Composition temperature, Tj is the instrument jacket temperature, q heat flow, q rtc is the heat flux. Tr represents the temperature of the reactor and Tj represents the jacket temperature, Tr and Tj reference the left side Y-axis labels ('Temperature'). The q hf and q rtc represent the heat flow and heat flux, respectively, and are re represented by the right-side Y-axis labels ('Heat Flow')

Liquid-Liquid Phase Transition: A "liquid-liquid phase transition" may comprise when a composition undergoes an absorption of heat (endotherm) or release of heat (exotherm) while remaining at a liquid phase. One or more aspects or characteristics of the composition may change during a liquid-liquid phase transition, such as the number, or viscosity, or composition, or concentration, or distribution of one or more or a combination of liquid phases.

Liquid-Liquid Phase Transition Reagent: A reagent which possesses a liquid-liquid phase transition in a binary solution comprising said reagent and a solvent reagent or water.

Liquid-Liquid Phase Transition Composition: A composition exhibiting a liquid phase liquid-liquid phase transition, or an enthalpy of liquid-liquid phase transition, or a cloud point temperature, or a combination thereof Organic Liquid Phase: By "organic liquid phase" is meant a liquid phase which forms at or above a liquid-liquid phase transition cloud point comprising a greater concentration of one or more or a combination of organic reagents than of water or a greater concentration of an organic liquid phase than another liquid phase in the same composition. For example, an organic liquid phase may comprise a concentration of one or more or a combination of organic reagents at least 0.1%, or 1%, or 5%, or 10%, or 15%, or 20%, or 25%, or 30%, or 35%, or 40%, or 45%, or 50%, or 60%, or 70% greater than another liquid phase in the same composition. For example, an organic liquid phase may comprise a concentration of water at least 0.1%, or 1%, or 5%, or 10%, or 15%, or 20%, or 25%, or 30%, or 35%, or 40%, or 45%, or 50%, or 60%, or 70% less than another liquid phase in the same composition.

Organic Reagent: A reagent comprising at least a portion of carbon. A reagent comprising a carbon-based substance.

Water Liquid Phase: By "water liquid phase" is meant a liquid phase which forms at or above a liquid-liquid phase transition cloud point comprising a greater concentration of water than of one or more or a combination of organic reagents or a greater concentration of water than another liquid phase in the same composition. For example, a water liquid phase may comprise a concentration of water at least 0.1%, or 1%, or 5%, or 10%, or 15%, or 20%, or 25%, or 30%, or 35%, or 40%, or 45%, or 50%, or 60%, or 70% greater than another liquid phase in the same composition above a cloud point. For example, an water liquid phase may comprise a concentration of one or more or a combination of organic reagents at least 0.1%, or 1%, or 5%, or 10%, or 15%, or 20%, or 25%, or 30%, or 35%, or 40%, or 45%, or 50%, or 60%, or 70% less than another liquid phase in the same composition above a cloud point.

Following Reagent: A "following reagent" may comprise reagents which follow either a liquid-liquid phase transition reagent or water during a cloud point into two or more liquid phases. Following reagents which 'follow' an organic liquid phase or a liquid phase comprising a liquid-liquid phase transition reagent during a cloud point into multiple liquid phases, said organic liquid phase or a liquid phase comprising a liquid-liquid phase transition reagent may comprise greater than 50% of said 'following reagent' in the composition. Following reagents which 'follow' a water liquid phase during a cloud point into multiple liquid phases, said water liquid phase may comprise greater than 50% of said 'following reagent' in the composition. In some instances, a following reagent may comprise a reagent without a liquid-liquid phase transition in a binary mixture with water and said following reagent. In some instances, a following reagent may comprise a reagent with a liquid-liquid phase transition in a binary mixture with water and said following reagent.

Density Reducing Reagent: A reagent which may reduce the density of one or more liquid phases in a liquid-liquid phase transition composition while enabling the composition to retain a liquid-liquid phase transition, or one or more or a combination of other desired properties, or a combination thereof.

Density Enhancing Reagent or Density Increasing Reagent: A reagent which may increase the density of one or more liquid phases in a liquid-liquid phase transition composition while enabling the composition to retain a liquid-liquid phase transition, or one or more or a combination of other desired properties, or a combination thereof.

Phase Transition Type Modifier: Phase transition modifiers are reagents which may adjust or change one or more attributes or properties of a liquid-liquid phase transition solution. Said properties may include, but are not limited to, density, or viscosity, or cloud-point type, or cloud point temperature, or enthalpy of liquid-liquid phase transition temperature range, or enthalpy of liquid-liquid phase transition, or vapor pressure, or solubility. In some embodiments, it may be desirable for a Phase Transition Type Modifier to adjust or change one or more attributes or properties, while retaining one or more other desirable attributes.

Particle Count: The number of particles in a solution as measured by a laser particle counting method, wherein the solution is consistently mixing or turbulent. A particle count may determine the existence and/or formation of new phases, such as new liquid phases, in a liquid composition.

Particle Density: The number of particles in a solution per 1 mL as measured by a laser particle counting method, wherein the solution is consistently mixing or turbulent. A particle count may determine the existence and/or formation of new phases, such as new liquid phases, in a liquid composition.

Combined Cloud Point: By "combined cloud point" is meant a temperature at which a mixture of three or more different liquid substances begins to phase-separate such that two phases appear and/or the mixture becomes cloudy. As used herein a combined cloud point of the three or more different liquid substances is typically different from the cloud point of any combination of two of the three or more different liquid substances. That is, like an azeotrope the three or more substance mixture acts differently with respect to cloud point than respective binary mixtures of its individual components would predict. For example, two or more non-water reagents may be combined in a composition with water and the resulting solution may possess a single cloud point temperature ("combined cloud point") as opposed to either of two cloud point temperatures based on potential binary combinations of its individual substances. Similarly, two or more non-solvent reagents may be combined in a composition with a solvent and the resulting solution may possess a single cloud point temperature ("combined cloud point") as opposed to either of two cloud point temperatures based on potential binary combinations of its individual substances. The two or more non-water or non-solvent reagents may exhibit a different cloud point temperature than either of the individual reagents in solution with water or solvent.

Combined Liquid-Liquid Phase Transition: By "combined liquid-liquid phase transition" is meant a temperature at which a mixture of three or more different liquid substances absorb heat, or release heat, or both in a liquid-liquid phase transition. As used herein a combined liquid-liquid phase transition temperature range of the three or more different liquid substances is typically different from the cloud point of any combination of two of the three or more different liquid substances. That is, like an azeotrope, the three or more substance mixture acts differently with respect to liquid-liquid phase transition temperature range than respective binary mixtures of its individual components would predict. For example, two or more non-water reagents may be combined in a composition with water and the resulting solution may possess a single liquid-liquid phase transition temperature range ("combined liquid-liquid phase transition") as opposed to either of two liquid-liquid phase transition temperatures based on potential binary combinations of its individual substances. Similarly, two or more non-solvent reagents may be combined in a composition with a solvent and the resulting solution may possess a single liquid-liquid phase transition temperature range ("combined liquid-liquid phase transition") as opposed to either of two liquid-liquid phase transition temperatures based on potential binary combinations of its individual substances. The two or more non-water or non-solvent reagents may exhibit a different liquid-liquid phase transition temperatures than either of the individual reagents in solution with water or solvent. In some instances, 'combined liquid-liquid phase transition' may be employed interchangeably with 'combined cloud point'.

Cloud Point or Initial Cloud Point: The temperature or temperature range wherein a sharp increase in the particle count in solution occurs. The temperature which a liquid solution may exhibit a significant formation of a new phase, which may be indicated by a particle counting. It may be desirable for the solution to be mixing while undergoing the particle counting method.

Enthalpy of Liquid-Liquid Phase Transition: Total heat absorbed (endotherm) or released (exotherm) by a liquid-liquid phase transition composition. In some instances, may comprise the total heat absorbed (endotherm) or released (exotherm) by a liquid-liquid phase transition composition in a defined temperature range.

Enthalpy of Liquid-Liquid Phase Transition Temperature Range: The temperature range wherein heat is absorbed or released by a liquid-liquid phase transition in a solution in excess of said solution's baseline specific heat capacity.

Initial Enthalpy of Liquid-Liquid Phase Transition Temperature: The temperature wherein heat begins to be absorbed or released by a liquid-liquid phase transition in a solution in excess of said solution's baseline specific heat capacity.

Peak Enthalpy of Liquid-Liquid Phase Transition: The temperature which a composition possesses the maximum effective specific heat capacity. Temperature or point which the enthalpy of liquid-liquid phase transition possesses the greatest rate of heat absorbance (endothermic) or heat release (exothermic). Temperature where a liquid has the greatest specific heat capacity or specific heat capacity enhancement due to a liquid-liquid phase transition.

Peak Effective Specific Heat Capacity: The maximum effective specific heat capacity of a composition.

Baseline Specific Heat Capacity: Baseline specific heat capacity comprises the specific heat capacity of the solution when it is not undergoing a liquid-liquid phase transition. Baseline specific heat capacity may comprise the aggregate specific heat capacity of the individual isolated reagents, calculated by multiplying the specific heat capacity of each reagent with each reagent's respective decimal weight percent concentration in the composition and adding the resulting calculated values.

Reversibility: In some compositions, reversibility may involve a liquid with an enthalpy of phase transition which absorbs an amount of heat when heated in a certain temperature and releases about the same amount of heat when cooled through the same temperature range. In some compositions, reversibility may involve a composition capable of forming a Phase B from a Phase A by changing a parameter, such as temperature or concentration, then returning said composition to Phase A by returning said parameter to its previous level.

Viscosity Reducing Reagent: A reagent which may reduce the dynamic viscosity of one or more liquid phases in a liquid-liquid phase transition composition while enabling the composition to retain a liquid-liquid phase transition, or one or more or a combination of other desired properties, or a combination thereof Viscosity Increasing Reagent: A reagent which may increase the dynamic viscosity of one or more liquid phases in a liquid-liquid phase transition composition while enabling the composition to retain a liquid-liquid phase transition, or one or more or a combination of other desired properties, or a combination thereof Density Reducing Reagent: A density reducing reagent may comprise reagents which may be employed to reduce the density of a liquid phase. For example, density reducing reagents may involve reagents which are added to reduce the density of a liquid phase in a composition possessing a liquid-liquid phase transition while enabling a liquid-liquid phase transitioning composition to maintain a high enthalpy of liquid-liquid phase transition, such as an enthalpy of liquid-liquid phase transition greater than 2.5 kJ/kg. For example, density reducing reagents may involve reagents which are added to reduce the density of a liquid phase and may have affinity for one of two or more liquid phases resulting from a liquid-liquid phase transition at or above a cloud point temperature. Affinity for a liquid phase may be defined as a reagent wherein greater than 10 wt %, or 20 wt %, or 30 wt %, or 40 wt %, or 50 wt %, or 60 wt %, or 70 wt %, or 80 wt %, or 90 wt %, or 95 wt % of said reagent in a liquid-liquid phase transition solution is in one of the two or more liquid phases existing above a cloud point temperature. Affinity for a liquid phase may be defined as a reagent wherein greater than 50 wt %, or 60 wt %, or 70 wt %, or 80 wt %, or 90 wt %, or 95 wt % of said reagent in a liquid-liquid phase transition solution is in one of the two or more liquid phases existing above a cloud point temperature. For example, methanol (density 0.792 g/mL) may have affinity for water or a liquid phase comprising greater than 50 wt % water in a liquid-liquid phase transition composition comprising glycol polymer and water above a cloud point temperature. For example, 2-butoxyethanol (density 0.9 g/mL) may have affinity for glycol polymer or a liquid phase comprising glycol polymer in a liquid-liquid phase transition composition comprising glycol polymer and water above a cloud point temperature.

Density Enhancing Reagent: A density enhancing reagent may comprise reagents which may be employed to increase the density of a liquid phase. For example, density enhancing reagents may involve reagents which are added to increase the density of a liquid phase in a composition possessing a liquid-liquid phase transition while enabling a liquid-liquid phase transitioning composition to maintain a high enthalpy of liquid-liquid phase transition, such as an enthalpy of liquid-liquid phase transition greater than 2.5 kJ/kg. For example, density enhancing reagents may involve reagents which are added to increase the density of a liquid phase and may have affinity for one of two or more liquid phases resulting from a liquid-liquid phase transition at or above a cloud point temperature. Affinity for a liquid phase may be defined as a reagent wherein greater than 10 wt %, or 20 wt %, or 30 wt %, or 40 wt %, or 50 wt %, or 60 wt %, or 70 wt %, or 80 wt %, or 90 wt %, or 95 wt % of said reagent in a liquid-liquid phase transition solution is in one of the two or more liquid phases existing above a cloud point temperature. Affinity for a liquid phase may be defined as a reagent wherein greater than 50 wt %, or 60 wt %, or 70 wt %, or 80 wt %, or 90 wt %, or 95 wt % of said reagent in a liquid-liquid phase transition solution is in one of the two or more liquid phases existing above a cloud point temperature. For example, dipotassium phosphate (density 2.44 g/mL) may have affinity for water or a liquid phase comprising greater than 50 wt % water in a liquid-liquid phase transition composition comprising glycol polymer and water above a cloud point temperature. For example, propylene carbonate (density 1.2 g/mL) may have affinity for glycol polymer or a liquid phase comprising glycol polymer in a liquid-liquid phase transition composition comprising glycol polymer and water above a cloud point temperature.

Solvent Reagent: A liquid substance capable of dissolving or dispersing one or more other substances. In some embodiments, a reagent which comprises the greatest weight percent concentration of the composition. In some embodiments, the solvent reagent may comprise water. In some embodiments, the solvent reagent may comprise a low molecular weight organic, such as methanol or $CO_2$, or a low molecular weight inorganic, such as ammonia or sulfur dioxide.

Non-Water Reagent: A reagent other than water.

Single Liquid Phase Combined Solution: A single liquid phase solution comprising the entire composition. A solution comprising the reagents of a liquid-liquid phase transition composition or the liquid-liquid phase transition composition dissolved together in a single liquid phase.

Non-Contiguously Separate: 'Non-Contiguously Separate' may comprise when a liquid phase is isolated and not in physical contact with other liquid phases.

Some embodiments disclosed pertain to liquid-liquid phase transition compositions with a reversible enthalpy of phase transition occurring over a temperature range. Liquid-liquid phase transition compositions may have a cloud point at a particular temperature, which may be defined by a temperature which the particle count or particle density of a liquid solution changes due to change in temperature. In some liquid-liquid phase transition compositions introduced herein, the cloud point temperature may comprise a narrow part or narrow range of the enthalpy of liquid-liquid phase transition. For example, the enthalpy of liquid-liquid phase transition may occur over a temperature range broader or different from the cloud point temperature. For example, greater than 50%, or 60%, or 70%, or 80%, or 90% of an enthalpy of liquid-liquid phase transition temperature range may be outside the cloud point temperature. For example, greater than 50%, or 60%, or 70%, or 80%, or 90% of the heat absorbed or released in an enthalpy of liquid-liquid phase transition temperature range may occur outside the cloud point temperature.

In the enthalpy of liquid-liquid phase transition temperature range, some embodiments of the liquid-liquid phase transition compositions introduced herein may show reversible enthalpies of liquid-liquid phase transition, even if heated and cooled through only a portion of an enthalpy of liquid-liquid phase transition temperature range. For example, if the enthalpy of liquid-liquid phase transition temperature range is 5° C. to 17° C., the composition may be heated from 6.67° C. to 12.78° C. and then cooled from 12.78° C. to 6.67° C., and the enthalpy of liquid-liquid phase transition during said heating may be similar to and opposite the enthalpy of liquid-liquid phase transition during said cooling. For example, if the enthalpy of liquid-liquid phase transition temperature range is 5° C. to 17° C., the composition may be heated from 8° C. to 10° C. and then cooled from 10° C. to 8° C., and the enthalpy of liquid-liquid phase transition during said heating may be similar to and opposite the enthalpy of liquid-liquid phase transition during said cooling. For example, if the enthalpy of liquid-liquid phase transition temperature range is 5° C. to 17° C., the composition may be heated from 5.5° C. to 7° C. and then cooled from 7° C. to 5.5° C., and the enthalpy of liquid-liquid phase transition during said heating may be similar to and opposite the enthalpy of liquid-liquid phase transition during said cooling. For example, if the enthalpy of liquid-liquid phase transition temperature range is 5° C. to 17° C., the composition may be heated from 13° C. to 15° C. and then cooled from 15° C. to 13° C., and the enthalpy of liquid-liquid phase transition during said heating may be similar to and opposite the enthalpy of liquid-liquid phase transition during said cooling. For example, if the enthalpy of liquid-liquid phase transition temperature range is 5° C. to 17° C., the composition may be heated from 15° C. to 17° C. and then cooled from 17° C. to 15° C., and the enthalpy of liquid-liquid phase transition during said heating may be similar to and opposite the enthalpy of liquid-liquid phase transition during said cooling. For example, if the enthalpy of liquid-liquid phase transition temperature range is 5° C. to 17° C., the composition may be heated from 5° C. to 7° C. and then cooled from 7° C. to 5° C., and the enthalpy of liquid-liquid phase transition during said heating may be similar to and opposite the enthalpy of liquid-liquid phase transition during said cooling.

In some compositions, it has been found the enthalpy of phase transition can be broadened or narrowed by adjusting concentration of one or more reagents. For example, the temperature range of an enthalpy of liquid-liquid phase transition of polypropylene glycol 2000 increases with concentration in water from about 0.01 wt % to about 35 wt %, with the greatest enthalpy of liquid-liquid phase transition occurring generally in the range of 20-30 wt %. For example, the presence of some organic reagents, such as, for example, glycol ethers or diethylene glycol hexyl ether, may narrow the temperature range of the enthalpy of liquid-liquid phase transition, or may enable a greater proportion of an enthalpy of liquid-liquid phase transition to occur at a lower temperature, or both. Note that in some compositions, concentrations greater than 35 wt % of a glycol polymer may result in a larger temperature range enthalpy of liquid-liquid phase transition than concentrations below 35 wt % of a glycol polymer.

The cloud point temperature may comprise a temperature practically distinct from the temperature of the enthalpy of liquid-liquid phase transition, or the peak enthalpy of liquid-liquid phase transition, or both. In key instances, a significant difference in temperature between the peak enthalpy of liquid-liquid phase transition and the cloud point temperature can be indicative of the presence of a high enthalpy of liquid-liquid phase transition. In some instances, a composition with a peak enthalpy of liquid-liquid phase transition different from a cloud point temperature may be fashioned by employing a concentration of a liquid-liquid phase transition reagent such that the composition possesses a multi-liquid phase to multi-liquid phase transition. In some instances, a composition with a peak enthalpy of liquid-liquid phase transition different from a cloud point temperature may be fashioned by employing a concentration of a liquid-liquid phase transition reagent such that the composition possesses a multi-liquid phase to multi-liquid phase transition. In some instances, a composition with a peak enthalpy of liquid-liquid phase transition different from a cloud point temperature may be fashioned by employing a concentration of a liquid-liquid phase transition reagent such that the composition possesses a multi-liquid phase state below the enthalpy of liquid-liquid phase transition temperature range, or below a cloud point temperature, or a combination thereof. In some instances, it may be desirable to employ a phase transition type modifier to enable a liquid-liquid phase transition composition to possess a single liquid phase below the enthalpy of liquid-liquid phase transition temperature range, or below a cloud point temperature, or a combination thereof, while possessing a greater enthalpy of liquid-liquid phase transition realized by a peak enthalpy of liquid-liquid phase transition temperature distinct from a cloud point temperature.

For example, during heating from 0° C. to 30° C., the cloud point temperature of a solution was 4.7° C. based on a particle counting method. Notably, according to measurements from a RC1 calorimeter, during heating up from 0° C. to 30° C., the peak enthalpy of phase transition of the same solution is at 12.51° C., or a 7.81° K different temperature than the cloud point temperature. Additionally, the enthalpy of phase transition was not detectable until at least 5.3° C., or a 0.6° K different temperature than the cloud point temperature. The average specific heat capacity of the solution from 5.5° C. to 15.5° C. was 7.42 J/g° C., or 177% the specific heat capacity of water or 190% the baseline specific heat capacity of 3.9 J/g° C. In the present example, greater than 90% of the heat absorbed in enthalpy of liquid-liquid phase transition during heating up from 0° C. to 30° C. occurred at a temperature different than the cloud point temperature.

Some liquid-liquid phase transition compositions may possess multiple liquid phases below the cloud point temperature. Possessing more than one liquid phase below a cloud point temperature may pose challenges in some applications. For example, in thermal storage, a multi-liquid phase liquid below a cloud point temperature may result in challenges in separating or storing liquid phases of the composition with different temperatures or states, especially if liquid phases are stored in or separated by density gradients. For example, in heat transfer, the convective heat transfer rate or convective heat transfer rate enhancement of a composition with multiple liquid phases below a cloud point temperature may be less than the convective heat transfer rate of composition with a single liquid phase below a cloud point temperature due to, for example, the potential greater mass transfer, or mass movement during a cloud point. Some embodiments may pertain to transforming compositions with multiple liquid phases below a cloud point temperature into compositions possessing a single liquid phase below a cloud point temperature.

For example, Polypropylene Glycol 2000+Water possesses multiple liquid phases or a multi-liquid phase mixture below its cloud point temperature. For example, Polypropylene Glycol 1200+Water possesses multiple liquid phases or a multi-liquid phase mixture below its cloud point temperature. For example, Polypropylene Glycol 2700+Water possesses multiple liquid phases or a multi-liquid phase mixture below its cloud point temperature. Introducing certain glycol ethers to the composition enables the aforementioned compositions to possess a single liquid phase solution below a cloud point temperature, and a multi-liquid phase solution above a cloud point temperature. For example, introducing at least a portion of diethylene glycol hexyl ether to a Polypropylene Glycol 2000+Water composition transforms the composition into one with a single liquid phase below a cloud point temperature and a multi-liquid phase mixture above a cloud point temperature and/or wherein the composition exhibits an enthalpy of liquid-liquid phase transition greater than 2.5 kJ/kg, or greater than 5 kJ/kg, or greater than 7.5 kJ/kg, or greater than 10 kJ/kg, or greater than 12.5 kJ/kg, or greater than 15 kJ/kg, or greater than 17.5 kJ/kg, or greater than 20 kJ/kg.

Disclosed herein is the existence of a common cloud point in certain mixtures of three or more components. By "combined cloud point" is meant a temperature at which a mixture of three or more different liquid substances begins to phase-separate such that two phases appear and the mixture becomes cloudy. As used herein, a combined cloud point of the three or more different liquid substances is typically different from the cloud point of any combination of two of the three or more different liquid substances. That is, like an azeotrope, the three or more substance mixture acts differently with respect to cloud point than respective binary mixtures of its individual components would predict. For example, two or more non-water reagents may be combined in a composition with water and the resulting solution may possess a single cloud point temperature ("combined cloud point") as opposed to either of two cloud point temperatures based on potential binary combinations of its individual substances. Similarly, two or more non-solvent reagents may be combined in a composition with a solvent and the resulting solution may possess a single cloud point temperature ("combined cloud point") as opposed to either of two cloud point temperatures based on potential binary combinations of its individual substances. The two or more non-water or non-solvent reagents may exhibit a different cloud point temperature than either of the individual reagents in solution with water or solvent. Some common cloud points are in a temperature range between the cloud point temperatures of two or more non-water reagents. Some common cloud points are similar to azeotropes in that the common cloud point is greater than the cloud points of the respective binary mixtures of its individual components (may be similar to a negative azeotrope). Some common cloud points are similar to azeotropes in that the common cloud point is greater than the cloud points of the respective binary mixtures of its individual components (may be similar to a positive azeotrope).

'Common cloud points' have been demonstrated with glycol polymers, including, but not limited to, polypropylene glycol, or block co-polymers of PEG and PPG, or block co-polymers of PEG and PG, or PEG, Polyethylene Glycol Ethers, Polypropylene Glycol Ethers; mixed with certain glycol ethers and esters. Example glycol ethers and esters may include, but are not limited to, one or more or a combination of the following: Diethylene Glycol Ether, or Diethylene Glycol Ethyl Ether, or Diethylene Glycol Hexyl Ether, or Diethylene Glycol Mono Butyl Ether, or Diethylene Glycol Mono Ethyl Ether, or Diethylene Glycol Mono Hexyl Ether, or Diethylene Glycol Mono Methyl Ether, or Diethylene Glycol Mono N-Butyl Ether, or Diethylene Glycol Mono N-Butyl Ether Acetate, or Diethylene Glycol N-Butyl Ether, or Diethylene Glycol N-Butyl Ether Acetate, or Diethylene Glycol Phenyl Ether, or Diisobutyl Ketone, or Dioctyl Sulfosuccinate, or Dipropylene Glycol Dimethyl Ether, or Dipropylene Glycol Methyl Ether, or Dipropylene Glycol Methyl Ether Acetate, or Dipropylene Glycol Mono Methyl Ether, or Dipropylene Glycol Mono Methyl Ether Acetate, or Dipropylene Glycol Mono N-Butyl Ether, or Dipropylene Glycol Mono Propyl Ether, or Dipropylene Glycol N-Butyl Ether, or Dipropylene Glycol N-Propyl Ether, or Dipropylene Glycol Phenyl Ether, or Eo/Po Block Polyether, or Ethylene Glychol Mono Phenyl Ether, or Ethylene Glycol Hexyl Ether, or Ethylene Glycol Isopropyl Ether, or Ethylene Glycol Mono Butyl Ether, or Ethylene Glycol Mono Ethyl Ether, or Ethylene Glycol Mono Hexyl Ether, or Ethylene Glycol Mono Methyl Ether, or Ethylene Glycol Mono N-Butyl Ether, or Ethylene Glycol Mono N-Butyl Ether Acetate, or Ethylene Glycol Mono Propyl Ether, or Ethylene Glycol N-Butyl Ether, or Ethylene Glycol N-Butyl Ether Acetate, or Ethylene Glycol Phenyl Ether, or Ethylene Glycol Propyl Ether, or Glycol Ether Coalescent, or Heptaoxyethylene Dodecyl Ether, or Mono And Di Ethylene Glycol Phenyl Ether, or Natural Plant Oil Polyether, or N-Butyl Propionate, or N-Pentyl Propionate, or Poly(Oxy-1,2-Ethanediyl), Alpha-Phenyl-Omega-Hydroxy, or Propylene Glycol Diacetate, or Propylene Glycol Methyl Ether, or Propylene Glycol Methyl Ether Acetate, or Propylene Glycol Mono Methyl Ether, or Propylene Glycol Mono Methyl Ether Acetate, or Propylene Glycol Mono N-Butyl Ether, or Propylene Glycol Mono N-Propyl Ether, or Propylene Glycol Mono Propyl Ether, or Propylene Glycol N-Butyl Ether, or Propylene Glycol N-Propyl Ether, or Propylene Glycol Phenyl Ether, or Tri Ethylene Glycol Mono Butyl Ether, or Tripropylene Glycol Methyl Ether, or Tripropylene Glycol Mono Methyl Ether, or Tripropylene Glycol Mono N-Butyl Ether, Alkylphenol Polyether, or Branched Secondary Alcohol Polyether.

It is important to note that glycol ethers must be carefully selected and matched with each glycol polymer at the appropriate concentration relative to glycol polymer and water. Combining the majority of glycol ethers with the majority of glycol polymers generally will not yield a composition with a common cloud point in water.

It is important to note that glycol esters must be carefully selected and matched with each glycol polymer at the appropriate concentration relative to glycol polymer and water. Combining the majority of glycol esters with the majority of glycol polymers generally will not yield a composition with a common cloud point in water.

In some embodiments, it may be desirable to be able to adjust the density of one or more liquid phases in a liquid-liquid phase transition composition, while enabling the resulting 'adjusted' liquid-liquid phase transition to retain advantageous properties, such as a high enthalpy of liquid-liquid phase transition. For example, it may be desirable to adjust the density of one or more liquid phases in a liquid-liquid phase transition composition to facilitate separation of liquid phases. For example, separation of liquid phases may be particularly useful in including, but not limited to, one or more or a combination of the following: thermal storage, or heat transfer, or long distance heat transfer, or temperature independent thermal storage, or thermal storage in density tanks with density gradients, or extractions, or separations, or liquid phase only refrigeration cycles. Increasing the density difference between liquid phases may facilitate separations. Increasing the density difference between liquid phases in a liquid-liquid phase transitioning liquid may increase the rate of convective heat transfer or heat transfer enhancement when, for example, liquid-liquid phase transition liquids are employed in a heat transfer application where the temperatures overlap with a cloud point temperature.

For example, glycol polymers and glycol ether polymers generally have densities greater than or about equal to the density of water. For example, polypropylene glycols generally have densities from 1-1.02 g/mL at 20° C. For example, polyethylene glycols generally have densities greater than 1.02 g/mL at 20° C. Polyethylene glycol and other glycol polymers with densities greater than water can be difficult to separate or layer due to their limited density difference relative to aqueous solutions with salts, or sugar alcohols, or other relatively high density reagents. Polyethylene glycols can be difficult to separate or layer due to their limited density difference relative to water. Changing the density of a liquid phase while maintaining a high enthalpy of liquid-liquid phase transition is not possible with the majority of water soluble or organic soluble or both reagents significantly reduce or practically eliminate the enthalpy of liquid-liquid phase transition of a composition.

Some embodiments relate to compositions for modifying or adjusting the density of glycol polymer and glycol polymer ether based liquid-liquid phase transition liquids. Specifically, some embodiments relate to compositions with reduced the density of an organic liquid phase in a liquid-liquid phase transition composition, or increased the density of an organic liquid phase in a liquid-liquid phase transition composition, or both, and/or compositions exhibiting a high enthalpy of liquid-liquid phase transition, which may include, but is not limited to, greater than 2.5 kJ/kg, or greater than 5 kJ/kg, or greater than 7.5 kJ/kg, or greater than 10 kJ/kg, or greater than 12.5 kJ/kg, or greater than 15 kJ/kg, or greater than 17.5 kJ/kg, or greater than 20 kJ/kg. Reagents which reduce density while enabling a composition to exhibit high enthalpy of liquid-liquid phase transition may be referred to as density reducing reagents. Reagents which reduce density while enabling a composition to exhibit high enthalpy of liquid-liquid phase transition may be referred to as density enhancing reagents. For example, some compositions may reduce the density of an organic phase comprising glycol polymer to be a lower density than an aqueous liquid phase comprising water, while maintaining said high enthalpy of liquid-liquid phase transition. For example, some compositions may increase the density of an organic phase comprising glycol polymer to be a greater density than an aqueous liquid phase comprising water, while maintaining said high enthalpy of liquid-liquid phase transition. For example, some compositions may increase the density of an aqueous liquid phase comprising water to be a greater density than an organic phase comprising glycol polymer, while maintaining said high enthalpy of liquid-liquid phase transition. For example, some compositions may reduce the density of an aqueous liquid phase comprising water to be a lower density than an organic phase comprising glycol polymer, while maintaining said high enthalpy of liquid-liquid phase transition. For example, some compositions may include glycol polymer or glycol polymer ethers mixed with a low density organic reagent soluble in glycol polymers or glycol polymer ethers. For example, some compositions may include glycol polymer or glycol polymer ethers mixed with glycol ethers soluble in glycol polymers or glycol polymer ethers. For example, some compositions may include, but are not limited to, the compositions exhibiting a combined cloud point described herein.

Some embodiments relate to compositions for modifying or adjusting the enthalpy of liquid-liquid phase transition temperature range, or cloud point temperature, or both and/or while maintain a composition exhibiting an enthalpy of liquid-liquid phase transition greater than 2.5 kJ/kg, or greater than 5 kJ/kg, or greater than 7.5 kJ/kg, or greater than 10 kJ/kg, or greater than 12.5 kJ/kg, or greater than 15 kJ/kg, or greater than 17.5 kJ/kg, or greater than 20 kJ/kg. In some embodiments, liquid-liquid phase transition temperature or cloud point temperature may be adjusted by adjusting the concentration of reagents in an organic liquid phase. For example, in some embodiments, liquid-liquid phase transition temperature or cloud point temperature may be adjusted by adjusting the relative concentration of a glycol polymer or a glycol polymer ether relative to the concentration of a glycol ether. For example, in some embodiments, liquid-liquid phase transition temperature or cloud point temperature may be adjusted by adjusting the relative concentration of a glycol polymer or a glycol polymer ether relative to the concentration of an ester or glycol ester. In some embodiments, liquid-liquid phase transition temperature may be adjusted by adjusting the concentration of reagents in an aqueous liquid phase. For example, in some embodiments, liquid-liquid phase transition temperature or cloud point temperature may be adjusted by adjusting the concentration of a glycol polymer in the aqueous phase. For example, a liquid-liquid phase transition reagent may comprise polypropylene glycol, while the aqueous phase may comprise a polyethylene glycol, wherein the concentration of the polyethylene glycol may influence the enthalpy of liquid-liquid phase transition or cloud point temperature or both of the polypropylene glycol+water solution. Some glycol polymers or glycol polymer ethers can adjust the liquid-liquid phase transition properties of other glycol polymers, and some glycol polymers or glycol polymer ethers with remain in different liquid phases during a cloud point into two or more liquid phases. Some polypropylene glycols are insoluble in some polyethylene glycols and/or some polyethylene glycols or polyethylene glycol polymer ethers can adjust the cloud point temperature or enthalpy of liquid-liquid phase transition temperature range of polypropylene glycol+water compositions. For example, in some embodiments, liquid-liquid phase transition temperature or cloud point temperature may be adjusted by adjusting the concentration of a sugar, sugar alcohol, a diol, or ester, or aldehyde, or ether. For example, maltose, or mannitol, or sucrose, or glucose, or fructose has shown ability to adjust cloud point temperature. In some embodiments, said adjustment in liquid-liquid phase transition temperature may be reversible, using, for example, a separation method or a membrane-based separation method. In some embodiments, said adjustment in liquid-liquid phase transition temperature may be intended to remain permanent. Similar reagents may be employed to adjust density, or reduce viscosity, or other applications described herein.

In some embodiments, it may be desirable to be able to adjust the viscosity of one or more liquid phases in a liquid-liquid phase transition composition, while enabling the resulting 'adjusted' liquid-liquid phase transition to retain advantageous properties, such as a high enthalpy of liquid-liquid phase transition. Reducing viscosity of a liquid phase may improve heat transfer performance, improve heat transfer coefficient, minimize cavitation, prevent pumping challenges, reduce pumping energy consumption, enable more efficient or lower cost or simpler separations, or a combination thereof. It may be desirable for viscosity reducing reagents to reduce the viscosity of a liquid phase while enabling the liquid-liquid phase transition composition to retain a high enthalpy of liquid-liquid phase transition and while enabling the composition to continue to possess an enthalpy of liquid-liquid phase transition temperature range.

In some embodiments, it may be desirable to accomplish one or more or a combination of the desirable properties or characteristics described herein simultaneously with certain compositions or types of compositions disclosed herein.

Low temperature liquid-liquid phase transitions may comprise liquid-liquid phase transitions which may occur at relatively low temperatures. Relatively low temperatures may be defined as temperatures near or at or less than room temperature (for example: less than or equal to 50° C., or less than or equal to 40° C., or less than or equal to 35° C., or less than or equal to 30° C., or less than or equal to 25° C.). Example applications in relatively cool temperature ranges may include, but are not limited to, one or more or a combination of the following: HVAC, chilling, thermal storage, heat transfer, chiller condenser side heat exchanging, chiller evaporator side heat exchanger, liquid-liquid phase transition based chiller, liquid-liquid phase transition based air conditioner, liquid-liquid phase transition based heat pump, osmotic heat engines, forward osmosis, osmotically assisted reverse osmosis, gas separation. Desirable properties may include, but are not limited to, one or more or a combination of the following: a large enthalpy of phase transition, an enthalpy of phase transition in the temperature range of a application, a large total heat capacity in temperature range of an application, a low viscosity, or a reversible liquid-liquid phase transition.

High temperature liquid-liquid phase transitions may comprise liquid-liquid phase transitions which may occur at relatively high temperatures. Relatively high temperatures may be defined as temperatures near or equal to or at or greater than room temperature (for example: greater than or equal to 25° C., or greater than or equal to 30° C., or greater than or equal to 35° C., or greater than equal to 40° C., or greater than or equal to 45° C., or greater than or equal to 50° C., or greater than or equal to 55° C., or greater than or equal to 60° C., or greater than or equal to 70° C., or greater than or equal to 80° C., or greater than or equal to 90° C., or greater than or equal to 100° C.). Example applications in relatively high temperature ranges may include, but are not limited to, one or more or a combination of the following: HVAC, heating, district heating, thermal storage, heat transfer, liquid-liquid phase transition based heat pump, liquid-liquid phase transition based heater, osmotic heat engines, forward osmosis, osmotically assisted reverse osmosis, gas separation, heat supply, heat supply for absorption heat pump. Desirable properties may include, but are not limited to, one or more or a combination of the following: a large enthalpy of phase transition, an enthalpy of phase transition in the temperature range of an application, a large total heat capacity in temperature range of an application, a low viscosity, or a reversible liquid-liquid phase transition.

Large Heat Capacity in Temperature Range of Application(s):

In liquid-liquid phase transitioning solutions for heat transfer, there are two properties which may influence specific heat capacity—baseline specific heat capacity and specific heat capacity enhancement due to the liquid-liquid phase transition. Baseline specific heat capacity comprises the specific heat capacity of the solution when it is not undergoing a liquid-liquid phase transition. Specific heat capacity enhancement comprises the increase in effective specific heat capacity due to the enthalpy of liquid-liquid phase transition in a specific temperature range which the liquid-liquid phase transition occurs. Maximizing specific heat capacity or total heat capacity in a specific temperature range may involve maximizing or optimizing both baseline specific heat capacity and specific heat capacity enhancement.

Baseline specific heat capacity is important because the total heat capacity involves the enthalpy of phase transition and the baseline specific heat capacity. Enthalpy of phase transition or specific heat capacity enhancement is important as it is the driving force of the larger heat capacity or large effective specific heat capacity relative to water (or other conventional heat transfer liquids).

Maximizing baseline specific heat capacity may involve maximizing the concentration of reagents with a large baseline specific heat capacity. Among liquids, water generally possesses the greatest baseline specific heat capacity at room temperature and pressure. In applications which can use water-based liquids, an objective may be to maximize the concentration of water (or other high baseline specific heat capacity liquid) without or while minimally sacrificing the enthalpy of phase transition or specific heat capacity enhancement.

Maximizing enthalpy of phase transition may involve the specific reagents employed and the concentration of those reagents.

Properties of Reagents and Concentration of Reagents—
Harnessing novel liquid-liquid phenomena: The present invention introduces new liquid-liquid phenomena which may enable enthalpies of phase transition orders of magnitude greater than liquid-liquid phase transitions in prior art.

Multi-liquid phase to multi-liquid phase liquid-liquid phase transitions

In some liquid-liquid phase transitions introduced herein, liquid-liquid phase transitions from multiple-liquid phases to multiple-liquid phases possess significantly greater effective specific heat capacity and enthalpy of phase transition.

In some liquid-liquid phase transitions introduced herein, liquid-liquid phase transitions from multiple liquid phases to multiple liquid phases have shown significantly greater enthalpy of phase transition than an initial liquid-liquid phase transition from a single liquid phase to a multi-liquid phase in the same composition.

Multi-step or multi-part liquid-liquid phase transitions

Some liquid-liquid phase transitions introduced herein occur in multiple liquid-liquid phase transition steps or parts. Each 'step' or 'part' occurs in a specific temperature range and may be reversible by increasing or decreasing the temperature through that temperature range. Each 'step' or 'part' may occur consecutively or sequentially during heat-up or cool-down. Each 'step' or 'part' may exhibit its own enthalpy of phase transition. Each step or part may exhibit a specific concentration of reagents in each liquid phase or ratio of reagents in each liquid phase or may involve the formation or combination or disappearance of one or more liquid phases.

Wider temperature range liquid-liquid phase transitions

Some liquid-liquid phase transition compositions in the present invention are optimized to possess a wider temperature range liquid-liquid phase transition. In some liquid-liquid phase transitions, increasing the total temperature range of the liquid-liquid phase transition has been demonstrated to increase the total enthalpy of phase transition and increase the temperature range of specific heat capacity enhancement.

Dehydrated mostly non-water or organic phase

One indicator of some high enthalpy of phase transition liquid-liquid phase transitions is a low weight percent concentration of water in a mostly non-water phase resulting from a final or near final liquid-liquid phase transition step. A final or near final liquid-liquid phase transition step may be a portion of a liquid-liquid phase transition where the effective specific heat capacity is decreasing, or the effective specific heat capacity is approaching baseline specific heat capacity or the effective specific heat capacity in near the baseline specific heat capacity.

Mutual phenomena and phase transition modifiers

Combining certain glycol ethers with liquid-liquid phase transitions with certain polymers with liquid phase transitions results in a mutual depression or increase in liquid-liquid phase transition temperature, or cloud point temperature, or both. The glycol ethers and polymers which experience said mutual depression or mutual increase, or both may 'follow' each other between liquid phases and may be referred to as a combined cloud point or combined liquid-liquid phase transition or both. The mutual depression in liquid-liquid phase transition temperature may have similarities to azeotropes in liquid-gas phase transitions.

Examples:
PPG 425+2-Butoxyethanol+Water: The combination of both PPG 425 and Butoxyethanol at certain ratios and concentrations can reduce the overall liquid-liquid phase transition temperature by over 5° C. compared to the liquid-liquid phase transition temperature of each reagent in a solution with water independently.

PPG 2000+Diethylene Glycol Mono Hexyl Ether+Water: The combination of both PPG 2000 and Diethylene Glycol Mono Hexyl Ether at certain ratios and concentrations can reduce the overall liquid-liquid phase transition temperature by over 5° C. compared to the liquid-liquid phase transition temperature of each reagent in a solution with water independently. The presence of Diethylene Glycol Mono Hexyl Ether can function as a phase transition type modifier because, for example, it may convert a multi-liquid phase to multi-liquid phase liquid-liquid phase transition into a single liquid phase to multi-liquid phase liquid-liquid phase transition.

Combining certain glycol ethers with liquid-liquid phase transitions with certain polymers with liquid phase transitions results in a mutual increase in liquid-liquid phase transition temperature. The glycol ethers and polymers which experience said mutual increase in phase transition temperature may 'follow' each other between liquid phases. The mutual increase in liquid-liquid phase transition temperature may have similarities to azeotropes in liquid-gas phase transitions.

Examples:
2-Butoxyethanol+Polyethylene Glycol Dimethyl Ether+Water. The Polyethylene Glycol Dimethyl Ether may 'follow' the 2-Butoxyethanol during liquid-liquid phase transition into a multi-liquid phase mixture, depending on the concentration and ratios of the reagents. Polyethylene Glycol Dimethyl Ether can significantly increase the phase transition temperature of 2-Butoxyethanol with small concentration increases of Polyethylene Glycol Dimethyl Ether. Advantageously, the molecular weight of Polyethylene Glycol Dimethyl Ether is significantly greater than 2-Butoxyethanol and water, so the concentration of Polyethylene Glycol Dimethyl Ether may be adjusted using a membrane based process or other means, enabling easy phase transition temperature adjustment. Polyethylene Glycol Dimethyl Ether may exist at various molecular weights, which may include, but is not limited to, less than, equal to, or greater than, one or more or a combination of the following: 250 g/mole, or 500 g/mole.

2-Butoxyethanol+Polyethylene Glycol Monomethyl Ether+Water. The Polyethylene Glycol Monomethyl Ether may 'follow' the 2-Butoxyethanol during liquid-liquid phase transition into a multi-liquid phase mixture, depending on the concentration and ratios of the reagents. Polyethylene Glycol Monomethyl Ether can significantly increase the phase transition temperature of 2-Butoxyethanol with small concentration increases of Polyethylene Glycol Monomethyl Ether. Advantageously, the molecular weight of Polyethylene Glycol Monomethyl Ether is significantly greater than 2-Butoxyethanol and water, so the concentration of Polyethylene Glycol Monomethyl Ether can be adjusted using a membrane-based process, enabling easy liquid-liquid phase transition temperature adjustment. Polyethylene Glycol Monomethyl Ether may exist at various molecular weights, which may include, but is not limited to, less than, equal to, or greater than, one or more or a combination of the following: 350 g/mole, or 550 g/mole.

Narrowing liquid-liquid phase transition temperature range: Combining certain reagents with a liquid-liquid phase transitioning reagent can narrow the temperature range of the liquid-liquid phase transition. For example, Diethylene Glycol Mono Hexyl Ether can narrow the liquid-liquid phase transition temperature range when combined with PPG 2000 in water.

Modifying multi-liquid phase to multi-liquid phase liquid-liquid phase transitions to possess a single liquid phase combined solution at one temperature region or end of the liquid-liquid phase transition: Combining certain reagents with a liquid-liquid phase transitioning reagent can enable a multi-liquid phase to multi-liquid phase liquid-liquid phase transition to possess a temperature range where a single liquid phase combined solution may form. For example, 2-Butoxyethanol when added to PPG 1000+Water can enable a single liquid phase combined solution at temperatures below the temperature of the enthalpy of phase transition or near the low temperature range or beginning portion of the liquid-liquid phase transition. For example, Diethylene Glycol Hexyl Ether, when added to PPG 1000+Water, or PPG 1200+Water, or PPG 2000+Water, can enable a single liquid phase combined solution to form at temperatures below the temperature of the enthalpy of phase transition or near the low temperature range or beginning portion of the liquid-liquid phase transition.

Viscosity reduction:

The viscosity of a mostly organic or mostly non-water liquid phase may be reduced, for example, by the introduction of lower viscosity 'following' reagents. For example, increasing the concentration of diethylene glycol mono hexyl ether can reduce the viscosity of an organic liquid phase comprising PPG 1000, or PPG 1200, or PPG 2000 or a combination thereof in, for example, a composition with water above the composition's liquid-liquid phase transition temperature. For example, increasing the concentration of propylene carbonate may reduce the viscosity of an organic liquid phase comprising PPG 1000, or PPG 1200, or PPG 2000 or a combination thereof. Furthermore increasing the concentration of propylene carbonate may increase the density of an organic liquid phase comprising PPG 1000, or PPG 1200, or PPG 2000 or a combination thereof, in, for example, a composition with water above the composition's liquid-liquid phase transition temperature.

Widening liquid-liquid phase transition temperature range: Wider or greater temperature range liquid-liquid phase transitions may be advantageous as they may possess larger enthalpies of phase transition. Wider or greater temperature range liquid-liquid phase transitions may be advantageous as they may enable a wider range of application temperatures without or with less required liquid-liquid phase transition temperature adjustment as the application changes.

Adjusting overall phase transition temperature or phase transition temperature range to match or to nearly match temperature range required by application Minimal Liquid-Liquid Phase Transition After Separation—

In some applications, it may be desirable for the liquid-liquid phase transition to be minimal after constituent liquid phases are separated.

For example, if a solution has phase transitioned into a two liquid phase solution following a LCST liquid-liquid phase transition and above the LCST liquid-liquid phase transition temperature range, it may be desirable to separate said two liquid phases into two non-contiguous liquid phases. It may be desirable for said non-contiguously separated liquid phases to not undergo or minimally undergo a liquid-liquid phase transition or an enthalpy of liquid-liquid phase transition if said liquid phases are not in contact with each other and are separately cooled to below the LCST temperature. Example applications for the present property may include, but are not limited to, liquid phase only refrigeration cycles, long term thermal storage or district heating or thermal transport or osmotic power generation or osmotic processes or forward osmosis, or absorption refrigeration cycles, or refrigeration cycles.

Example liquid-liquid phase transition compositions which possess one or more or a combination of the above unique properties may be described herein. Said compositions may exhibit said properties under certain concentrations, compositions, or conditions. Example chemicals may include, but are not limited to, one or more or a combination of the following: PPG 1000, PPG 1200, PPG 2000, PPG 2700, Water, Polypropylene glycols, PEG-PPG-PEG polymers, PEG-ran-PG polymers, PPG-PEG-PPG polymers, Polyethylene Glycol Dimethyl Ethers, Polyethylene Glycol Monomethyl Ethers, 2-Butoxyethanol, Diethylene Glycol Monohexyl Ether, Propylene glycol propyl ether, various glycol ethers, Propylene Carbonate, Glycerol, Propylene Glycol, various glycols, various glycol polymers, various glycol ether polymers, other reagents described herein, or phase transition modifiers. Below are specific examples of some liquid-liquid phase transitioning compositions and their novel potentially advantageous properties under certain concentrations, compositions, or conditions.

TABLE 1

| PPG 2000-Water: Average Effective Specific Heat Capacity (J/g ° C.) in 7-14° C. | | | | | | | | | | |
|---|---|---|---|---|---|---|---|---|---|---|
| PPG 2000 wt % | 7-13° C. | 7-12° C. | 8-12° C. | 9-12° C. | 10-12° C. | 9-13° C. | 10-13° C. | 9-14° C. | 10-14° C. | 11-14° C. | 12-14° C. |
| 17.31% | 5.36 | 5.11 | 5.24 | 5.51 | 5.87 | 6.36 | 6.12 | 6.04 | 6.36 | 6.84 | 6.89 |
| 19.23% | 5.59 | 5.41 | 5.80 | 6.15 | 6.64 | 6.25 | 6.65 | 6.49 | 6.85 | 7.01 | 7.09 |
| 21.15% | 5.96 | 5.78 | 6.07 | 6.38 | 6.47 | 6.67 | 6.62 | 6.57 | 6.67 | 6.61 | 6.98 |
| 23.08% | 6.19 | 6.04 | 6.41 | 6.67 | 6.83 | 6.75 | 6.90 | 6.85 | 6.99 | 6.70 | 7.10 |
| 25% | 6.35 | 6.41 | 6.67 | 6.66 | 6.83 | 6.87 | 6.63 | 6.75 | 6.87 | 7.04 | 7.13 |
| 26.90% | 6.44 | 6.49 | 6.69 | 6.62 | 6.57 | 6.66 | 6.47 | 6.68 | 6.66 | 6.93 | 7.04 |
| 28.85% | 6.21 | 6.15 | 6.36 | 6.44 | 6.36 | 6.65 | 6.41 | 6.65 | 6.65 | 6.72 | 6.80 |

Table 1 (above) Table 1 shows the effective total specific heat capacity of solutions containing PPG 2000 and Deionized Water at various PPG 2000 wt % concentrations. Table 1 shows the average effective total specific heat capacity in various temperature ranges within a 7-14° C. temperature range. Bold, underline figures in cells in the above table possess an effective specific heat capacity greater than or equal to 6.35 J/g° C.

TABLE 2

PPG 2000-Water: Average Effective Specific Heat Capacity (J/g ° C.) in 10-16° C.

| PPG 2000 wt % | 10-14° C. | 11-14° C. | 12-14° C. | 12-15° C. | 3-115° C. | 2-116° C. | 13-16° C. | 14-16° C. |
|---|---|---|---|---|---|---|---|---|
| 17.31% | 6.36 | 6.84 | 6.90 | 6.98 | 7.14 | 6.93 | 7.04 | 7.10 |
| 19.23% | 6.85 | 7.01 | 7.09 | 7.19 | 7.26 | 6.89 | 6.87 | 6.93 |
| 21.15% | 6.67 | 6.61 | 6.98 | 6.94 | 6.91 | 6.72 | 6.64 | 6.50 |
| 23.08% | 6.99 | 7.00 | 7.10 | 6.90 | 6.92 | 6.88 | 6.89 | 6.82 |
| 25% | 6.87 | 7.04 | 7.13 | 7.06 | 6.90 | 6.92 | 6.76 | 7.01 |
| 26.90% | 6.66 | 6.93 | 7.04 | 6.96 | 6.77 | 6.80 | 6.62 | 6.77 |
| 28.85% | 6.65 | 6.72 | 6.80 | 6.70 | 6.86 | 6.48 | 6.53 | 6.53 |

Table 2 (Above)

Summary Table 1 and Table 2: Table 1 and Table 2 shows the effective specific heat capacity of solutions containing PPG 2000 and Deionized Water at various PPG 2000 wt % concentrations. Specific heat capacity was measured using an in-house constructed digital mixing calorimeter. Table 1 shows the average effective total specific heat capacity in various temperature ranges within a 7-14° C. temperature range. Table 2 shows the average effective total specific heat capacity in various temperature ranges within a 10-16° C. temperature range. Cells with bold, underlined figures possess an effective specific heat capacity greater than 6.35 J/g° C. In Table 2, all cells are bolded/underlined because all data in Table 2 possess an effective specific heat capacity greater than or equal to 6.35 J/g° C. The effective specific heat capacity of PPG 2000 solutions with concentrations of 17.31-28.85 wt % are generally greater in the 10-16° C. temperature range than the 7-10° C. temperature range. Solutions of lesser PPG 2000 weight percent concentration, 17.31 wt % and 19.23 wt %, possess greater or peak effective specific heat capacity in the 13-16° C. and 12-15° C. temperature ranges, respectively. Solutions of greater PPG 2000 weight percent concentration (23.08 wt %, 25 wt %, and 26.8 wt %) possess greater or peak effective specific heat capacity in the 12-14° C. 25 wt % and 26.8 wt % solutions possess an effective specific heat capacity of greater than 6.35 J/g° C. throughout the 7-16° C. temperature range. Solutions with the greatest total heat capacity across all temperature ranges are the 25 wt % and 26.8 wt % solutions.

shows the average effective total specific heat capacity of these solutions in various temperature ranges within a 12-20° C. temperature range. Cells with bold, underlined figures in the Table 3 possess an effective specific heat capacity greater than 5.80 J/g° C. As shown in Table 3, 25 wt % PPG 2000+water possesses an enthalpy of phase transition primarily below 16° C. As shown in Table 3, 25 wt % PPG 1200+water possesses an enthalpy of phase transition primarily below 20° C. and a peak enthalpy of phase transition at about 15-16° C. As shown in Table 3, 25 wt % PPG 1000+water possesses an enthalpy of phase transition primarily above 17° C. and a peak enthalpy of phase transition at about 18-19° C. At a 25 wt % concentration, the phase transition temperature or the temperature of enthalpy of phase transition increases with decreasing molecular weight. The total enthalpy of phase transition is greater for PPG 2000 than it is for PPG 1200, and the enthalpy of phase transition of PPG 1200 is greater than it is for PPG 1000. Advantageously, the enthalpy of phase transition temperature range or specific heat capacity enhancement of the compositions in Tables 1, 2 and 3 are in the full temperature range of chilled water in most chilled water applications, which may include, but are not limited to, heat transfer, or as a coolant, or for thermal storage, or a combination thereof.

Enthalpy of Phase Transition Occurring Over a Wide Temperature Range

Literature/prior art generally views liquid-liquid phase transitions as possessing a phase transition at a specific

TABLE 3

Average Effective Specific Heat Capacity (J/g ° C.) in 12-20° C. with PPG 2000, 1200, and 1000

| Comp. | 12-14° C. | 14-16° C. | 14-17° C. | 15-16° C. | 15-17° C. | 15-18° C. | 16-18° C. | 16-19° C. | 17-19° C. | 18-19° C. | 18-20° C. |
|---|---|---|---|---|---|---|---|---|---|---|---|
| 25 wt % PPG 2000 | 7.13 | 7.01 | 6.76 | 6.61 | 6.42 | 5.97 | 5.67 | 5.49 | 5.20 | 4.78 | 4.49 |
| 25 wt % PPG 1200 | 5.36 | 6.28 | 6.21 | 6.91 | 6.60 | 6.49 | 6.18 | 6.16 | 6.08 | 6.13 | 6.07 |
| 25 wt % PPG 1000 | 4.06 | 4.36 | 4.66 | 4.32 | 4.73 | 5.18 | 5.49 | 5.48 | 5.85 | 6.00 | 5.85 |

Table 3 (Above)

Table 3 Summary: Table 3 shows the effective specific heat capacity of solutions containing PPG 1000, PPG 1200, and PPG 2000. Each PPG molecular weight (1000, 1200, and 2000) was separately at a 25 wt % concentration in Deionized Water. Specific heat capacity was measured using an in-house constructed digital mixing calorimeter. Table 3 temperature, which is true about the few liquid-liquid phase transitions with their enthalpies of phase transition studied in literature/prior art. However, a new phenomena introduced herein involves liquid-liquid phase transitions which occur not just at a specific temperature, but over a wider temperature range, which may include, but is not limited to, greater than, or less than, or equal to, one or more or a combination of the following: a 1° K temperature range, or a 2° K temperature range, or a 3° K temperature range, or a 4° K temperature range, or a 5° K temperature range, or a 6° K temperature range, or a 7° K temperature range. Advantageously, liquid-liquid phase transitions which occur over a wider temperature range may enable greater enthalpies of phase transition and/or specific heat capacity enhancement. Advantageously, liquid-liquid phase transitions which occur over a wider temperature range may be applicable to a wider range of temperature applications without require phase transition temperature adjustment.

Reversible Liquid-Liquid Phase Transition:

It may be desirable for the liquid-liquid phase transition to be reversible or fully reversible. Furthermore, it may be desirable for the liquid-liquid phase transition to relatively spontaneously reversible, which may mean that it liquid-liquid phase transitions in a specific temperature range while heating up and liquid-liquid phase transitions at or near said same specific temperature range while cooling down. Furthermore, it may be desirable for the amplitude or scale of the enthalpy of phase transition during heating up to be the same or nearly the same as the enthalpy of phase transition during cooling down. Furthermore, it may be desirable for the heat absorbed or released during a liquid-liquid phase transition while heating up to be the same as the heat released or absorbed during a liquid-liquid phase transition while cooling down.

Furthermore, it may be desirable for the enthalpy of phase transition to remain the same or largely the same during multiple consecutive heat up and cool down cycles. Multiple heat up and cool down cycles may comprise more than 2 cycles, or more than 5 cycles, or more than 10 cycles, or more than 25 cycles, or more than 50 cycles, or more than 100 cycles, or more than 250 cycles, or more than 500 cycles, or more than 1000 cycles, or more than 2500 cycles, or more than 5000 cycles, or more than 10000 cycles, or more than 25000 cycles, or more than 50000 cycles, or more than 100000 cycles, or more than 250000 cycles, or more than 500000 cycles, or more than 1000000 cycles.

Physical phase transition. Physical phenomena. Fully reversible, Spontaneously reversible at the temperature ranges of phase transition. May comprise multiple consecutive liquid-liquid phase transitions. May comprise multiple consecutive liquid-liquid phase transitions. May require mixing. Enthalpy of phase transition may be desirably fully reversible.

High Temperature Compositions (1 of 2)

High temperature phase transitions may be considered 'high temperature' based on the temperature range of a liquid-liquid phase transition which occurs in a solution comprising the polymer and freshwater. Temperature ranges of high temperature phase transitions may be described herein. Temperature ranges of high temperature phase transitions may involve temperatures above 0° C., or 5° C., or 10° C., or 15° C., or 20° C., or 25° C., and may overlap with the definition of low temperature phase transitions depending on the context or application.

Example 'high temperature' liquid-liquid phase transition component reagents may include, but are not limited to, PEG-Ran-PG, PPG-PEG-PPG, and PEG-PPG-PEG block polymers.

TABLE 4

Example Block Polymers

| Molecular Weight | Label |
|---|---|
| 2500 | PEG-Ran-PG |
| 3300 | PPG-PEG-PPG |
| 2700 | PPG-PEG-PPG |
| 1100 | PEG-PPG-PEG |
| 2000 | PEG-PPG-PEG |
| 2800 | PEG-PPG-PEG |
| 2900 | PEG-PPG-PEG |

Block glycol polymer reagents may exhibit a wide array of liquid-liquid phase transition temperature ranges in an aqueous solution. The phase transition temperature and properties of the block glycol polymer alone may be adjusted or tuned based on the relative amount of PEG or PG or PPG in the polymer, or the molecular weight of the polymer, or the types of functional groups or connective functional groups in the polymer, or a combination thereof. For example, based on experiments with an in-house built mixing calorimeter, the polymers shown in Table 4 possess various liquid-liquid phase transition temperature ranges from about 5° C. to above 65° C. when present in a freshwater solution at a concentration of 20 wt %. Based on experiments with an in-house built mixing calorimeter, the enthalpy of phase transition of some Block glycol polymers in water solutions possess enthalpy of phase transition greater than 10 kJ/kg when in concentration ranges from 13-40 wt %. Based on experiments with an in-house built mixing calorimeter, the enthalpy of phase transition and specific heat capacity enhancement may increase with increasing molecular weight of the polymer.

Block glycol polymers are generally viscous. In liquid-liquid phase transitions, the mostly block glycol polymer liquid phase generally contains a low concentration of water, which can result in the mostly block glycol polymer liquid phase to be highly viscous. Said high viscosity may be problematic in applications requiring the pumping, moving, or separation of said mostly block glycol polymer liquid phase. 'Following reagents' or 'phase transition modifiers' may be employed to, for example, including, but not limited to, reduce the organic liquid phase viscosity, adjust liquid-liquid phase transition temperature, or improve other liquid-liquid phase transition properties, including those described herein. Introduced herein, the presence of certain esters and/or glycol ethers as 'following reagents' or 'phase transition modifiers' have been found to reduce organic liquid phase viscosity, or improve liquid-liquid phase separation properties, or increase enthalpy of phase transition, or function as a method of adjusting liquid-liquid phase transition temperature, or provide other beneficial properties, or a combination thereof.

High Temperature Compositions (2 of 2)

Ethers of polyethylene glycol and/or polypropylene glycol may be employed as liquid-liquid phase transition reagents which may possess solubility at high temperatures in freshwater and/or high temperature liquid-liquid phase transitions. For example, Polyethylene Glycol Dimethyl Ethers of various molecular weights and Polyethylene Glycol Monomethyl Ethers of various molecular weights may exhibit high liquid-liquid phase transition temperatures and large enthalpies of phase transition. For example, in solutions with freshwater alone, the present organic may possess ultra-high liquid-liquid phase transition temperature ranges, with liquid-liquid phase transition temperature ranges greater than or equal to, one or more or a combination of the following: 70° C., or 80° C., or 90° C., or 100° C., or 110° C., or 120° C., or 130° C., or 140° C., or 150° C. or a combination thereof. Enthalpies of mixing or enthalpies of liquid-liquid phase transition of ethers of glycol polymers may be substantial. For example, based on adiabatic temperature change and calorimetry measurements, the enthalpy of phase transition of Polyethylene Glycol Dimethyl Ethers and/or Polyethylene Glycol Monomethyl Ethers may by greater than or equal to one or more or a combination of the following: 5 kJ/kg total solution, or 10 kJ/kg total solution, or 15 kJ/kg total solution, or 20 kJ/kg total solution, or 25 kJ/kg total solution, or 30 kJ/kg total solution, or 35 kJ/kg total solution, or 40 kJ/kg total solution, or 45 kJ/kg total solution, or 50 kJ/kg total solution, or 55 kJ/kg total solution, or 60 kJ/kg total solution, or 65 kJ/kg total solution, or 70 kJ/kg total solution, or 75 kJ/kg total solution, or 80 kJ/kg total solution, or 85 kJ/kg total solution, or 90 kJ/kg total solution, or 95 kJ/kg total solution, or 100 kJ/kg total solution.

In some solutions, Polyethylene Glycol Dimethyl Ethers, such as PEGDME 250 or 500, and/or Polyethylene Glycol Monomethyl Ethers, such as PEGMME 350, may possess liquid-liquid phase transition temperature rages greater than the boiling point of an aqueous solution at standard pressure. It may be desirable to reduce said liquid-liquid phase transition temperature for various reasons, which may include, but are not limited to, ensuring the liquid-liquid phase transition occurs at a temperature below the boiling point of the liquid composition at standard pressure conditions and/or to enable heat transfer or thermal storage applications at lower temperatures.

'Following reagents' or liquid-liquid phase transition modifiers may be added to the present compositions to enable, for example, including, but not limited to, one or more or a combination of the following: liquid-liquid phase transition temperature adjustment, and/or more favorable liquid-liquid phase transition properties described herein, and/or a combination thereof.

For example, ethers may be employed as following reagents and/or liquid-liquid phase transition modifiers. For example, the liquid-liquid phase transition properties of ether glycol polymers, such as Polyethylene Glycol Dimethyl Ether and Polypropylene Glycol Monomethyl Ether, can be significantly modified by the presence of 2-Butoxyethanol. 2-Butoxyethanol can modify the properties of Polyethylene Glycol Dimethyl Ethers (PEGDME) and/or Polypropylene Glycol Monomethyl Ethers (PEGMME) in, including, but not limited to, one or more or a combination of the following ways:

Depending on the relative concentration of the constituent reagents and water, at least a portion of PEGDME and/or PEGMME may 'follow' 2-Butoxyethanol during a liquid-liquid phase transition into a multi-liquid phase mixture, and may form a mostly organic liquid phase and a mostly water liquid phase.

The ratio of PEGDME and/or PEGMME to 2-Butoxyethanol in an aqueous solution may have a significant influence on the liquid-liquid phase transition temperature range of a solution. The greater the relative concentration of 2-Butoxyethanol to PEGDME and/or PEGMME, the lesser the liquid-liquid phase transition temperature of the solution. Liquid-liquid phase transition temperature may be adjusted by adjusted the concentration of 2-Butoxyethanol relative to PEGDME and/or PEGMME.

The ratio of PEGDME and/or PEGMME to 2-Butoxyethanol in an aqueous solution may have a significant influence on the required salt or 'salting-out reagent' concentration to 'salt-out' the at least a portion of the organic liquid phase or adjust liquid-liquid phase transition temperature. The greater relative 2-Butoxyethanol concentration, the lesser the concentration of 'salting-out' reagent or phase transition temperature adjustment reagent required to form a multi-liquid phase mixture or 'salt-out' an organic into an organic liquid phase or reduce liquid-liquid phase transition temperature.

The ratio of PEGDME and/or PEGMME to 2-Butoxyethanol in an aqueous solution may have a significant influence on the concentration of water in a mostly organic liquid phase resulting from a liquid-liquid phase transition or 'salting-out' or a combination thereof. The greater the relative concentration of 2-Butoxyethanol to PEGDME and/or PEGMME, generally the lesser the concentration of water in a mostly organic liquid phase resulting from a liquid-liquid phase transition or 'salting-out' or a combination thereof.

2-Butoxyethanol may reduce the density of the organic liquid phase, and/or may reduce the viscosity of an organic liquid phase, and/or a combination thereof.

Similarly, PEGDME and/or PEGMME may have a significant influence on the liquid-liquid phase transition properties of 2-Butoxyethanol. For example, 30 wt % 2-Butoxyethanol may have a liquid-liquid phase transition temperature range in the temperature range of −45° C. when in a solution 70 wt % freshwater. In a solution with 30 wt % 2-Butoxyethanol, 5 wt % PEGDME 500, and 65 wt % freshwater, the liquid-liquid phase transition temperature is in a temperature range of −73° C.

Alternatively or additionally, the liquid-liquid phase transition properties of water and polyol ether polymers, such as PEGDME and PEGMME, may be significantly influenced by 'salting-out' reagents or phase transition temperature adjustment reagents. For example, 'salting-out' reagents or phase transition temperature adjustment reagents may include, but are not limited to, salts and/or organic reagents with appreciable solubility in water and minimal solubility or limited solubility or insolubility in the liquid-liquid phase transitioning organic reagents. Due to, for example, the strong solubility of polyol ether polymers in water, 'salting-out' or liquid-liquid phase transition temperature adjustment may require highly soluble reagents, or reagents with significant ionic strength, or salts high on the Hofmeister series, or a combination thereof. For example, in some compositions, salts of ammonium, potassium, sodium, fluoride, sulfate, carbonate, sulfite, phosphate, or a combination thereof have been demonstrated to require lesser concentrations or osmotic pressures to achieve phase transition temperature adjustment or 'salting-out' relative to other reagents. For example, in some compositions, dextrin has been proven an effective 'salting-out' reagent or phase transition temperature adjustment reagent. For example, dextrin, or sucrose, or mannitol, or maltose, or fructose, and/or various sugar derivatives or maltodextrin or sugar analogues or sugar substitutes or sugar alcohols or polyols have also been demonstrated to be effective phase transition temperature adjustment or 'salting-out' reagents in some compositions.

Concentration of organic in a mostly organic liquid phase may be another important attribute in determining a desirable 'salting-out' reagent or phase transition temperature adjustment reagent. For example, to employ sodium chloride in phase transition temperature adjustment and/or 'salting-out', significantly greater concentrations or osmotic pressures may be required than with some other salts. However, sodium chloride may possess some desirable properties when liquid-liquid phase transitions do occur, which may include, but is not limited to, a greater concentration of organic in a mostly organic liquid phase and/or greater concentration of water in a mostly water liquid phase.

Liquid-Liquid Separation Enhancing Reagents

Summary: The present embodiments may relate to enhancing the liquid-liquid separation of constituent liquid phases in a liquid-liquid phase transition. The present embodiments may involve compositions or properties or a combination thereof to enhance the rate and/or completeness of liquid-liquid separation and/or isolation of a liquid-liquid separation. The rate of a liquid-liquid phase separation may involve the time required for a multi-liquid phase mixture to separate into its constituent liquid phases as separate liquid layers or separate stratified liquid layers. The completeness of a liquid-liquid separation may involve the concentration of a different liquid phase present in a liquid phase after liquid-liquid separation. The isolation of a liquid-liquid separation may involve the concentration of the desired reagents in liquid layer compared to the concentration of undesired reagents in each liquid layer.

Enhancing Liquid-Liquid separation may involve enhancing properties related to liquid-liquid separation. Properties related to liquid-liquid separation may include, but are not limited to, density, viscosity, hydrophobicity, hydrophilicity, surface tension, self-attractive forces, or a combination thereof.

It may be desirable for any enhancement of liquid-liquid separation properties to minimally reduce the enthalpy of phase transition. Alternatively or additionally, it may be desirable for any enhancement of liquid-liquid separation properties to improve the enthalpy of phase transition or enthalpy of phase transition properties.

Higher Density Mostly Organic or Non-Water Layer or Liquid Phase—In some embodiments, it may be desirable for a mostly organic or non-water liquid phase to possess a greater density than the mostly water or mostly solvent liquid phase. Reagents which enhance density of the mostly organic liquid phase may comprise reagents with a greater density than water or the mostly water liquid phase and may be known as organic phase density enhancing reagents. It may be desirable for organic phase density enhancing reagents to possess a greater affinity or solubility in one or more of the organic reagents in a mostly organic liquid phase than in a mostly water liquid phase. It may be desirable for organic phase density enhancing reagents to comprise following reagents.

Lower Density Mostly Organic or Non-Water Layer or Liquid Phase—In some embodiments, it may be desirable for a mostly organic or non-water liquid phase to possess a lesser density than the mostly water or mostly solvent liquid phase. Reagents which reduce density of the mostly organic liquid phase may comprise reagents with a lesser density than water or the mostly water liquid phase and may be known as organic phase density reducing reagents. It may be desirable for organic phase density reducing reagents to possess a greater affinity or solubility in one or more of the organic reagents in a mostly organic liquid phase than in a mostly water liquid phase. It may be desirable for organic phase density reducing reagents to comprise following reagents.

Higher Density Mostly Water Layer or Liquid Phase—In some embodiments. It may be desirable for a mostly water liquid phase to possess a greater density than a mostly organic or non-water liquid phase. Reagents which enhance density of the mostly water liquid phase may comprise reagents with a greater density than a mostly organic liquid phase and may be known as mostly water liquid phase density enhancing reagents. It may be desirable for mostly water liquid phase density enhancing reagents to possess a greater affinity or solubility in the mostly water liquid phase than in one or more of the organic reagents in a mostly organic liquid phase. It may be desirable for mostly water liquid phase density enhancing reagents to comprise following reagents.

Lower Density Mostly Water Layer or Liquid Phase—In some embodiments. It may be desirable for a mostly water liquid phase to possess a lesser density than a mostly organic or non-water liquid phase. Reagents which reduce density of the mostly water liquid phase may comprise reagents with a lesser density than a mostly organic liquid phase and may be known as mostly water liquid phase density reducing reagents. It may be desirable for mostly water liquid phase density reducing reagents to possess a greater affinity or solubility in the mostly water liquid phase than in one or more of the organic reagents in a mostly organic liquid phase. It may be desirable for mostly water liquid phase density reducing reagents to comprise following reagents.

Glycol Ethers (Examples Below):

Diethylene Glycol Mono Hexyl Ether—Diethylene Glycol Mono Hexyl Ether may function as an organic liquid phase density reducing reagent and/or following reagent. For example, high enthalpy of phase transition organic liquid phase reagents with which Diethylene Glycol Mono Hexyl Ether may function as an organic liquid phase density reducing reagent and/or following reagent may include, but are not limited to, one or more or a combination of the following: PPG, PPG 1000, PPG 1200, PPG 2000, PPG 3000, PPG-PEG-PPG. PEG-PPG-PEG, glycol polymer, or polyols, or a combination thereof. Diethylene Glycol Mono Hexyl Ether may also function to reduce viscosity and increase hydrophobicity. Additionally, Diethylene Glycol Mono Hexyl Ether may convert a liquid-liquid phase transition composition which always exists at a multi-liquid phase state into a solution which can possess a single liquid phase combined solution state below a liquid-liquid phase transition temperature range. Additionally, 2 Diethylene Glycol Mono Hexyl Ether may convert an organic reagent which may not possess a liquid-liquid phase transition temperature range into a reagent with a liquid-liquid phase transition temperature. Said organic reagent which may not possess a liquid-liquid phase transition may not possess a liquid-liquid phase transition, due to, including, but not limited to, low solubility in and/or low affinity for water or strong solubility in and/or affinity for water.

2-Butoxyethanol—2-Butoxyethanol may function as an organic liquid phase density reducing reagent and/or following reagent. For example, high enthalpy of phase transition organic liquid phase reagents with which 2-Butoxyethanol may function as an organic liquid phase density reducing reagent and/or following reagent may include, but are not limited to, one or more or a combination of the following: PPG, PEGs, PEGDME, PEGMME, glycol ethers, PPG-PEG-PPG. PEG-PPG-PEG, glycol polymer, or polyols, or a combination thereof. 2-Butoxyethanol may also function to reduce viscosity and increase hydrophobicity. Additionally, 2-Butoxyethanol may convert a liquid-liquid phase transition composition which always exists at a multi-liquid phase state into a solution which can possess a single liquid phase combined solution state below a liquid-liquid phase transition temperature range. Additionally, 2-Butoxyethanol may convert an organic reagent which may not possess a liquid-liquid phase transition temperature range into a reagent with a liquid-liquid phase transition temperature. Said organic reagent which may not possess a liquid-liquid phase transition may not possess a liquid-liquid phase transition, due to, including, but not limited to, low solubility in and/or low affinity for water or strong solubility in and/or affinity for water.

Propylene Glycol n-Propyl Ether—Propylene Glycol n-Propyl Ether may function as an organic liquid phase density reducing reagent and/or following reagent. For example, high enthalpy of phase transition organic liquid phase reagents with which Propylene Glycol n-Propyl Ether may function as an organic liquid phase density reducing reagent and/or following reagent may include, but are not limited to, one or more or a combination of the following: PPG, PEGs, PEGDME, PEGMME, glycol ethers, PPG-PEG-PPG. PEG-PPG-PEG, glycol polymer, or polyols, or a combination thereof 2 Propylene Glycol n-Propyl Ether may also function to reduce viscosity and increase hydrophobicity. Additionally, Propylene Glycol n-Propyl Ether may convert a liquid-liquid phase transition composition which always exists at a multi-liquid phase state into a solution which can possess a single liquid phase combined solution state below a liquid-liquid phase transition temperature range. Additionally, Propylene Glycol n-Propyl Ether may convert an organic reagent which may not possess a liquid-liquid phase transition temperature range into a reagent with a liquid-liquid phase transition temperature. Said organic reagent which may not possess a liquid-liquid phase transition may not possess a liquid-liquid phase transition, due to, including, but not limited to, low solubility in and/or low affinity for water or strong solubility in and/or affinity for water.

Esters (Example Provided Below):

Propylene Carbonate—Propylene Carbonate may comprise, including, but not limited to, an organic liquid phase density enhancing reagent, or a viscosity reducing reagent or phase transition temperature adjustment reagent, or following reagent, or a combination thereof. Properties of propylene carbonate in liquid-liquid phase transitioning compositions may include, but are not limited to, one or more or a combination of the following: following an organic liquid phase in some liquid-liquid phase transitions ('following reagent'), or reducing viscosity of an organic liquid phase, or increase density relative to water, or adjust properties while having a minimal impact on enthalpy of phase transition at low concentrations, or reduce phase transition temperature range, or increase effective specific heat capacity in narrow temperature. Propylene carbonate may function as an organic liquid phase density reducing reagent and/or following reagent may include, but are not limited to, one or more or a combination of the following: PPG, PPG 1000, PPG 1200, PPG 2000, PPG 3000, PPG-PEG-PPG. PEG-PPG-PEG, glycol polymer, or polyols, or a combination thereof.

Glycerol—Glycerol may comprise a reagent which may, including, but not limited to, one or more or a combination of the following: follow water in some liquid-liquid phase transition solutions, or increase density of water liquid phase, or adjust liquid-liquid phase transition temperature, or reduce solubility of an organic liquid phase, or increase solubility of an organic liquid phase, or reduce freezing point, or increase boiling point. For example, glycerol may 'salt-out' or adjust the liquid-liquid phase transition temperature of PPGs in aqueous solutions.

Polyethylene Glycols—Some polyethylene glycols, such as PEGs with a molecular weight less than 1000 grams per mole, may comprise a reagent which may, including, but not limited to, one or more or a combination of the following: follow water in some liquid-liquid phase transition solutions, or increase density of water liquid phase, or adjust liquid-liquid phase transition temperature, or reduce solubility of an organic liquid phase, or increase solubility of an organic liquid phase. For example, PEGs in an aqueous solution may 'salt-out' or reduce phase transition temperature of PPGs in aqueous solutions.

Propylene Glycol or Ethylene Glycol—Propylene Glycol or Ethylene Glycol may comprise a reagent which may, including, but not limited to, one or more or a combination of the following: follow water in some liquid-liquid phase transition solutions, or increase density of water liquid phase, or adjust liquid-liquid phase transition temperature, or reduce solubility of an organic liquid phase, or increase solubility of an organic liquid phase, or reduce freezing point, or increase boiling point. For example, propylene glycol or ethylene glycol may increase the solubility or liquid-liquid phase transition temperature of PEGs when in aqueous solutions.

Polyols, Sugars, Sugar Alcohols, Sugar Substitutes, or Derivatives Thereof or Combinations thereof may comprise a reagent which may, including, but not limited to, one or more or a combination of the following: follow water in some liquid-liquid phase transition solutions, or increase density of water liquid phase, or adjust liquid-liquid phase transition temperature, or reduce solubility of an organic liquid phase, or increase solubility of an organic liquid phase, or reduce freezing point, or increase boiling point. For example, Dextrin or Maltodextrin or both 'salt-out' or reduce phase transition temperature of PPGs, or glycol ethers, or PEGs, or derivatives thereof, or combinations thereof in aqueous solutions.

Salts—Some salts may function as a reagent which may, including, but not limited to, one or more or a combination of the following: follow water in some liquid-liquid phase transition solutions, or increase density of water liquid phase, or adjust liquid-liquid phase transition temperature, or reduce solubility of an organic liquid phase, or increase solubility of an organic liquid phase, or reduce freezing point, or increase boiling point.

Phase Transition Modifiers—Phase transition modifiers are reagents which may adjust or change one or more attributes or properties of a liquid-liquid phase transition solution. Examples may include, but are not limited to, 'following reagents'. Following reagents may include, but are not limited to, reagents which follow a mostly organic liquid phase in a liquid-liquid phase transition or reagents which follow a mostly water or aqueous liquid phase in a liquid-liquid phase transition.

Note: Specific glycol ethers may be compatible with specific liquid-liquid phase transitioning reagents. For example, diethylene glycol mono hexyl ether may exhibit a 'following reagent' phenomena with PPG 2000, while 2-Butoxyethanol may be insoluble in PPG 2000 or may be possess more affinity for water than PPG 2000. For example, 2-Butoxyethanol a 'following reagent' phenomena with PEGDME or PEGMME, while PPG 2000 may be relatively insoluble in PEGDME or PEGMMME and PPG 425 may be soluble in PEGDME or PEGMME.

Example Properties of Following Reagents Using Specific Examples of Following Reagents Diethylene Glycol Mono Hexyl Ether—Example properties as a liquid-liquid phase transition modifier may include, but are not limited to, one or more or a combination of the following:

- Transforms the liquid-liquid phase transition of PPG 2000 and water from a multi-liquid phase to multi-liquid phase liquid-liquid phase transition to a multi-liquid phase to single liquid phase liquid-liquid phase transition.
- Reduces density of Organic Layer, enabling simpler or faster liquid-liquid separation from water-based layers
- Increases specific heat capacity in a narrow temperature range (for example: a less than 7° K temperature range)
- Narrows the temperature range of the enthalpy of phase transition
- Can reduce total enthalpy of phase transition as weight percent concentration of DEH increases relative to PPG 2000
- Compatible with PPG 2000
- Mutual phase transition temperature reduction when combined with PPG 2000 in water
- Reduces viscosity of the organic layer
- Can reduce or increase or mutually suppress or a combination thereof liquid-liquid phase transition temperatures of liquid-liquid phase transition reagents 2-Butoxyethanol—

- Adjusts liquid-liquid phase transition temperature of some compositions. For example, may enable certain reagents to possess a liquid-liquid phase transition range and/or may reduce the liquid-liquid phase transition temperature range of some reagents. For example, 2-Butoxyethanol may reduce the liquid-liquid phase transitioning temperature of PEGDME or PEGMME or both. For example, 2-Butoxyethanol may enable certain reagents to possess liquid-liquid phase transitions, even if said certain reagents may not possess a liquid-liquid phase transition without 2-Butoxyethanol. Said certain reagents may include, but are not limited to, some ethers or glycol ethers.
- Reduces viscosity
- Reduces density
- Enables liquid-liquid phase transitions to possess a single liquid phase combined solution state under certain temperature conditions
- Can reduce or increase or mutually suppress or a combination thereof liquid-liquid phase transition temperatures of liquid-liquid phase transition reagents. For example, 2-Butoxyethanol and PPG 425

Stabilizers and Inhibitors

Reagents:

Compatibility: It may be important for reagents to be chemically compatible to prevent adverse reagents or degradation.

Stabilizers, Degradation Inhibitors, Corrosion Inhibitors: May include, but are not limited to, stabilizers, or degradation inhibitors, or corrosion inhibitors known in the art or processes for the same known in the art. Reagents may include, but are not limited to, oxygen scavengers, free radical inhibitors, free radical absorbers, pH buffers, antioxidants, sequestrants, ultraviolet stabilizers, basic reagents, acidic reagents, free radical control, biocides, or combinations thereof.

Stabilizer reagents may include, but are not limited to, one or more or a combination of the following: Butylated hydroxytoluene (BHT), phosphite esters, sulfites, nitrites, bisulfites, metabisulfites, silicates, siloxanes, reserve alkalinity, organosiloxanes, organic phosphonates, Ascorbic acid, tocopherols, preservatives, polymer stabilizers, propyl gallate (PG, E310), tertiary butylhydroquinone (TBHQ), butylated hydroxyanisole (BHA, E320), N,N'-di-2-butyl-1,4-phenylenediamine, N,N'-di-2-butyl-1,4-phenylenediamine, 2,6-di-tert-butyl-4-methylphenol, 2,4-dimethyl-6-tert-butylphenol, active antioxidants, active free radical inhibitors, 2,4-dimethyl-6-tert-butylphenol and 2,6-di-tert-butyl-4-methylphenol, 2,6-di-tert-butylphenol, iron (II) salts, copper (I) salts, iron (II, III) salts, biocides, pH buffers, potassium carbonate, sodium carbonate, sodium bicarbonate, basic oxygen scavengers, sodium hydroxide, potassium hydroxide.

In some organic solutions, it may be desirable to have a basic pH and oxygen scavengers or free radical inhibitors. For example, for compositions employing glycols or glycol ethers, inhibitors employed current applications for glycols or glycol ethers or similar classifications of reagents may be employed.

It may be desirable for certain stabilizer chemicals to be following reagents, wherein some stabilizer chemicals may follow a mostly organic liquid phase and/or wherein some stabilizer chemicals may follow a mostly water or aqueous liquid phase.

Some embodiments may involve the active removal of 'spent' or utilized stabilizers and/or active addition of fresh or effective stabilizers. Some embodiments may involve the active regeneration of spent stabilizers into fresh or effective stabilizers.

Influence on Phase Transition Properties: The presence of chemical stabilizers may have a detrimental or beneficial influence on various liquid-liquid phase transition properties. It may be desirable to optimize the use of chemical stabilizers to maximize potential beneficial influences while minimizing potential negative influences and effectively achieving the objectives of the chemical stabilization.

Process Materials: It may be desirable for process materials to be compatible with the liquid-liquid phase transitioning compositions employed in or in contact with said process materials. For example, in embodiments employing ammonia salts or acidic salts or basic salts or a combination thereof, it may be desirable for the materials handling said compositions to be compatible with said compositions. It may also be desirable for corrosion inhibitors or other reagent or precautions or process limitations to be utilized to improve or ensure compatibility with process materials.

Two liquid phases to two liquid phases—different liquid states and different ratios of liquids, however remaining two or more liquid phases A multi-liquid phase to multi-liquid phase transition may involve a change in, for example, including, but not limited to, one or more or a combination of the following: the relative concentration or ratio of reagents in each liquid phase, total mass ratio of each liquid phase, total volume ratio of each liquid phase, the number of liquid phases, the handedness of one or more reagents in one or more liquid phases, or the orientation of one or more reagents in one or more liquid phases.

Some liquid-liquid phase transition may involve phase transitioning from a mixture of multiple liquid phases to another mixture of multiple liquid phases. Some liquid-liquid phase transitions may involve a mixture comprising X number of liquid phases phase transitioning into a mixture with the same number of liquid phases. Although the number of liquid phases may not change, the composition of each constituent liquid phase and the relative weight % reagent concentration or mass or volume of each liquid phase may change. The phase transition may also exhibit a significant endotherm or exotherm and may be reversible.

For example:

An example liquid-liquid phase transitioning composition:
- At 5° C.—comprises liquid phases A and B
  - Liquid Phase A:
    - Total Mass: 5 g
    - Mass Percent Organic: 90%
    - Mass Percent Water: 10%
  - Liquid Phase B:
    - Total Mass: 95 g
    - Mass Percent Organic: 21.58%
    - Mass Percent Water: 78.42%
- At 15° C.—comprises liquid phases Y and Z
  - Liquid Phase Y:
    - Total Mass: 23 g
    - Mass Percent Organic: 95.65%
    - Mass Percent Water: 4.35%
  - Liquid Phase Z:
    - Total Mass: 77 g
    - Mass Percent Organic: 1.3%
    - Mass Percent Water: 98.7%

Intermediary Liquid Phases

Liquid-liquid mixture comprising liquid phase A and Liquid phase B transforms into liquid phase Y and liquid phase Z with a certain Enthalpy of phase transition Intermediate steps may exist with different enthalpies of phase transition associated with each step. For example: A and B may transform to C and D, and C and D to E and F, and E and F to G and H and so on. The phase transition may continue to undergo intermediate phase transitions until a final phase transition state. Alternatively or additionally, a process may be designed to only reach a temperature which a partial phase transition or intermediate phase transition occurs, which may involve phase transitioning the liquid between a partial phase transition state and a full phase transition state or between partial phase transition state and another partial phase transition state. Each intermediary phase transition may occur in a specific or subset temperature range within, for example, the total phase transition temperature range of the composition. Each intermediary phase transition may be reversible. Each intermediary phase transition may possess its own enthalpy of phase transition.

Example Compositions:

PPG 2000+Water: Possesses a high energy density reversibly temperature driven liquid-liquid phase transition (>30 kJ per kg of solution), which involves a liquid-liquid phase transition from two liquid phases, A and B, to two liquid phases, C and D.

PPG 2000+Diethylene Glycol Hexyl Ether+Water: The presence of Diethylene Glycol Hexyl Ether at a sufficient concentration or ratio to PPG 2000 converts a reversible liquid-liquid phase transitioning composition which phase transitions from multiple liquid phases to multiple liquid phases into a reversibly liquid-liquid phase transitioning composition which phase transitions from a two liquid phases to a single liquid phase. Advantageous, the present composition may continue to have the significant enthalpy of phase transition of PPG 2000+Water, despite the presence of Diethylene Glycol Hexyl Ether. Advantageously, Diethylene Glycol Hexyl Ether may also reduce viscosity. Advantageously, depending on its concentration and the ratio of reagents, Diethylene Glycol Hexyl Ether may have a minimal impact on the enthalpy of phase transition. Advantageously, Diethylene Glycol Hexyl Ether may enhance the liquid-liquid separation when at a multi-liquid phase state by, for example, increasing the density difference between liquid phases. Other glycol ethers may also act as reagents which transform a reversible liquid-liquid phase transitioning composition which phase transitions from multiple liquid phases to multiple liquid phases into a reversibly liquid-liquid phase transitioning composition which phase transitions from a two liquid phases to a single liquid phase. Other glycol ethers may also facilitate reducing viscosity while minimally impacting the enthalpy of phase transition or while enhancing the enthalpy of phase transition.

Wherein the enthalpy of phase transition of the liquid-liquid phase transition is greater than 2.5 kJ/kg, 5 kJ/kg, or 10 kJ/kg, or 15 kJ/kg, or 20 kJ/kg, or 25 kJ/kg, or 30 kJ/kg, or 35 kJ/kg Wherein the effective specific heat capacity of the composition is greater than 5.5 kJ/kg ° C. in at least 1° C. of the temperature range of the chiller A liquid-liquid phase transitioning composition comprising:
- Component A, Component B, and Water;
- Wherein component 'a' has a liquid-liquid phase transition at 'X' ° C. when at a concentration of 'Y' weight percent (wt %) in water and water is at a concentration of 'Z' wt %;
- Wherein component 'b' has a liquid-liquid phase transition at 'G' ° C. or 'X' ° C. when at a concentration of 'Y' weight percent (wt %) in water and water is at a concentration of 'Z' wt %;
- Wherein a solution comprising 'a' and 'b'; with a 'Y' wt % concentration of 'a+b' and 'z' wt % water has a liquid-liquid phase transition temperature at less than X° C., G° C., or both A liquid-liquid phase transitioning composition comprising:
- Component A, Component B, and Water;
- Wherein component 'a' has a liquid-liquid phase transition at 'X' ° C. when at a concentration of 'Y' weight percent (wt %) in water and water is at a concentration of 'Z' wt %;
- Wherein component 'b' has a liquid-liquid phase transition at 'G' ° C. or 'X' ° C. when at a concentration of 'Y' weight percent (wt %) in water and water is at a concentration of 'Z' wt %;
- Wherein a solution comprising 'a' and 'b'; with a 'Y' wt % concentration of 'a+b' and 'z' wt % water has a liquid-liquid phase transition temperature at greater than X° C., G° C., or both Example Experimental Results and Heat Flow Calorimetry Procedures calorimetry testing, including the enthalpy of phase transition, effective specific heat capacity, and reversibility of the liquid-liquid phase transition, may be conducted with a Mettler Toledo RC1.

In the present example, Composition #1 is 25 wt % polypropylene glycol 2000 (P2000 available from Sigma-Aldrich with Mn 1513, refractive index n20/D 1.451, viscosity 450 mPa·s (20° C.), density 1.00 g/mL at 20° C., and CAS Number 25322-69-4), and 75 wt % deionized water. In the present example, Composition #2 is 4.9 wt % diethylene glycol mono hexyl ether (available from Sigma Aldrich with assay 95%, refractive index n20/D 1.4381 (lit.), bp 260° C. (lit), mp (−40° C. (lit), and density 0.935 g/ml at 25° C. (lit)), 20.1 wt % polypropylene glycol 2000 (P2000 available from Sigma-Aldrich with Mn 1513, refractive index n20/D 1.451, viscosity 450 mPa·s (20° C.), density 1.00 g/mL at 20° C., and CAS Number 25322-69-4), and 75 wt % deionized water. In Composition #2, the density of the organic liquid phase above the cloud point temperature may be about 0.987 to 0.995 grams per liter at 20° C.

The enthalpy of phase transition of Composition #1 and Composition #2 were fully reversible and repeatable. Composition #1 and Composition #2 showed consistent enthalpy of phase transition and specific heat capacity throughout all heating+cooling cycles, with no degradation and less than 0.8% standard deviation (within the expected noise of the RC1 instrument). Heating enthalpies of phase transition absorbed the same amount of heat as was released during cooling enthalpies of phase transition with a less than 0.8% deviation (within the expected noise of the RC1 instrument).

The enthalpy of phase transition of Composition #1 was 33.62 kJ/kg (from 1° C. to 25° C.) and the enthalpy of phase transition of Composition #2 was 21.20 kJ/kg (from 1° C. to 25° C.). The adiabatic temperature rise of Composition #1 was 9.3° C. and the adiabatic temperature rise of Composition #2 was 5.7° C.

The peak specific heat capacity of Composition #1 was 7.715 J/g° C. or 184% of the specific heat capacity of water. The peak specific heat capacity of Composition #2 was 7.109 J/g° C. or 169% of the specific heat capacity of water.

| Mettler Toledo RS1 Key Data | | |
|---|---|---|
| Property | Value | Notes |
| Effective Specific Heat Capacity | Composition #1:<br>7.715 J/g° C. (7.2° C.-9.3° C.)<br>Composition #2:<br>7.110 J/g° C. (5.52° C.-7.57° C.) | Measured with RC1. These are peak values over a ≈2° C. temperature range. |
| Total Enthalpy of Phase Transition | Composition #1:<br>33.624 kJ per kg<br>33.624 kJ per L<br>12.51° C. peak phase transition temperature<br>Composition #2:<br>21.20 kJ per kg<br>21.20 kJ per L<br>6.6° C. peak phase transition temperature | Measured with RC1 |
| Reversibility of Liquid-Liquid Phase Transition | Composition #1:<br>Completely Reversible<br>Composition #2:<br>Completely Reversible | RC1 Enthalpy of phase transition measurements were conducted over 12 heating + cooling cycles over a 36-hour period and showed full reversibility with no performance degradation. |

RC1 Testing Procedure:
1. The sample was poured into the RC1 and closed RC1 vessel. The mass of the sample container was measured before and after pouring the sample into the RC1 and the sample mass in the RC1 was recorded.
2. The sample was heated to 30° C.
3. A baseline specific heat capacity measurement was conducted from 30° C. to 25° C. 30° C. to 25° C. is outside the temperature range of the enthalpy of liquid-liquid phase transition and provides the specific heat capacity of the sample without the enthalpy of phase transition.
4. The sample was cooled from 25° C. to 1° C. at a 0.5° C./minute rate and heat flux and heat flow were measured simultaneously.
5. The sample temperature was maintained at 1° C. for 10 minutes.
6. The sample was heated from 1° C. to 25° C. at a 0.5° C./minute rate and heat flux and heat flow were measured simultaneously.
7. A baseline specific heat capacity measurement was conducted from 25° C. to 30° C. 25° C. to 30° C. is outside the temperature range of the enthalpy of liquid-liquid phase transition and provides the specific heat capacity of the sample without the enthalpy of phase transition.
8. The sample temperature was maintained at 30° C. for 10 minutes.
9. Steps 3-8 were repeated consecutively for 12 cooling and heating cycles.

RC1 Testing Parameters:

| RC1 Testing Parameters for Composition #1 | |
|---|---|
| Parameter | Value (Heat Flux) |
| Version of RC1 iControl used for Evaluation | 5.0 |
| Type of Baseline | Linear |
| Initial U Determination at 30° C.-25° C. | 168.00 W/K * m² |
| Final U Determination at 30° C.-25° C. | 169.86 W/K * m² |
| Mass of Sample | 258.35 g |
| Stirring Rate | 300 rpm |
| Sample Phase | Liquid |

| RC1 Testing Parameters for Composition #2 | |
|---|---|
| Parameter | Value (Heat Flux) |
| Version of RC1 iControl used for Evaluation | 5.0 |
| Type of Baseline | Linear |
| Initial U Determination at 30° C.-25° C. | 177.11 W/K * m² |
| Final U Determination at 30° C.-25° C. | 179.84 W/K * m² |
| Mass of Sample | 205.37 g |
| Stirring Rate | 300 rpm |
| Sample Phase | Liquid |

The enthalpy of phase transition and specific heat capacity of Composition #1 and Composition #2 were measured in a RC1 following the 'RC1 Testing Procedure' described above and were measured consecutively for 12 cooling+heating cycles. The enthalpy of phase transition of Composition #1 and Composition #2 were fully reversible and repeatable. Composition #1 and Composition #2 showed consistent enthalpy of phase transition and specific heat capacity throughout all heating+cooling cycles, with no degradation and less than 0.8% standard deviation (within the expected noise of the RC1 instrument). Heating enthalpies of phase transition absorbed the same amount of heat as was released during cooling enthalpies of phase transition with a less than 0.8% standard deviation (within the expected noise of the RC1 instrument).

No mass was lost during the experiment. Composition #1 and Composition #2 remained at a liquid phase for the full duration of testing (e.g., no solid phase or gas phase evolved). The mass of the Composition #1 and Composition #2 samples were unchanged (no gain or loss) for the full duration of testing.

The enthalpy of phase transition of Composition #1 was 33.62 kJ/kg (from 1° C. to 25° C.) and the enthalpy of phase transition of Composition #2 was 21.20 kJ/kg (from 1° C. to 25° C.). The adiabatic temperature rise of Composition #1 was 9.3° C. and the adiabatic temperature rise of Composition #2 was 5.7° C.

| | Specific Heat Capacity and Total Heat Capacity in Temperature Range of Maximum Average Specific Heat Capacity Composition #1 | | | | | |
|---|---|---|---|---|---|---|
| Column [A] Temperature Delta (° K) | Column [B] Temperature (° C.) Range with Max. Avg. Specific HeatCap. | | | Column [C] Total Heat Capacity (kJ/kg) | Column [D] Total Heat Capacity (kJ/L) | Column [E] Specific Heat Capacity in Temperature Range(J/g ° C.) | Column [F] Heat Capacity Relative to Water |
| 2.1 | 7.2 | to | 9.3 | 15.8 | 15.8 | 7.715 | 184% |
| 3.0 | 6.2 | to | 9.2 | 23.4 | 23.4 | 7.693 | 183% |
| 4.0 | 6.2 | to | 10.2 | 31.0 | 31.0 | 7.658 | 182% |
| 5.0 | 5.9 | to | 11.0 | 38.5 | 38.5 | 7.644 | 182% |
| 6.0 | 5.9 | to | 12.0 | 46.0 | 46.0 | 7.620 | 181% |
| 7.0 | 5.7 | to | 12.7 | 53.4 | 53.4 | 7.604 | 181% |
| 8.0 | 5.6 | to | 13.7 | 60.8 | 60.8 | 7.567 | 180% |
| 9.0 | 5.5 | to | 14.5 | 67.8 | 67.8 | 7.501 | 178% |
| 10.0 | 5.5 | to | 15.5 | 74.4 | 74.4 | 7.415 | 176% |

| | Specific Heat Capacity and Total Heat Capacity in Temperature Range of Maximum Average Specific Heat Capacity Composition #2 | | | | | |
|---|---|---|---|---|---|---|
| Column [A] Temperature Delta (° K) | Column [B] Temperature (° C.) Range with Max. Avg. Specific HeatCap. | | | Column [C] Total Heat Capacity (kJ/kg) | Column [D] Total Heat Capacity (kJ/L) | Column [E] Specific Heat Capacity in Temperature Range(J/g ° C.) | Column [F] Heat Capacity Relative to Water |
| 2.1 | 5.5 | to | 7.6 | 14.6 | 14.6 | 7.109 | 169% |
| 3.1 | 5.4 | to | 8.5 | 21.4 | 21.4 | 7.003 | 167% |
| 4.1 | 5.4 | to | 9.4 | 28.1 | 28.1 | 6.941 | 165% |
| 5.0 | 5.3 | to | 10.3 | 34.8 | 34.8 | 6.892 | 164% |
| 6.1 | 5.3 | to | 11.3 | 41.3 | 41.3 | 6.830 | 163% |
| 7.1 | 5.0 | to | 12.0 | 47.6 | 47.6 | 6.758 | 161% |
| 8.1 | 5.2 | to | 13.2 | 53.8 | 53.8 | 6.682 | 159% |
| 9.1 | 4.7 | to | 13.7 | 59.7 | 59.7 | 6.599 | 157% |
| 10.0 | 4.3 | to | 14.7 | 65.3 | 65.3 | 6.518 | 155% |

| | Specific Heat Capacity and Total Heat Capacity in Standard Temperature Ranges of Chilled Water Composition #1 | | | | |
|---|---|---|---|---|---|
| Column [A] Temperature Delta | Column [B] Temperature Range with Max. Avg. Specific Heat Cap. | Column [C] Total Heat Capacity (kJ/kg) | Column [D] Total Heat Capacity (kJ/L) | Column [E] Specific Heat Capacity in Temperature Range | Column [F] Heat Capacity Relative to Water |
| 8.3° K | 4.5° C. to 12.8° C. | 61.17 kJ/kg | 61.17 kJ/L | 7.335 J/g° C. | 175% |
| 5.6° K | 6.7° C. to 12.3° C. | 42.38 kJ/kg | 42.38 kJ/L | 7.614 J/g° C. | 181% |

| | | | | | |
|---|---|---|---|---|---|
| Specific Heat Capacity and Total Heat Capacity in Standard Temperature Ranges of Chilled Water Composition #2 | | | | | |
| Column [A] Temperature Delta | Column [B] Temperature Range with Max. Avg. Specific Heat Cap. | Column [C] Total Heat Capacity (kJ/kg) | Column [D] Total Heat Capacity (kJ/L) | Column [E] Specific Heat Capacity in Temperature Range | Column [F] Heat Capacity Relative to Water |
| 8.4° K | 4.4° C. to 12.8° C. | 55.58 kJ/kg | 55.58 kJ/L | 6.649 J/g° C. | 158% |
| 5.4° K | 6.7° C. to 12.2° C. | 36.92 kJ/kg | 36.92 kJ/L | 6.686 J/g° C. | 159% |

EXAMPLE EXEMPLARY EMBODIMENTS

A polypropylene glycol composition comprising:
  From about 1 percent (by weight of total composition) to about 60 percent (by weight of total composition) of at least one polypropylene glycol having a number average molecular weight greater than or equal to 1,800
  From about 1 percent (by weight of total composition) to about 99 percent (by weight of total composition) of water
  Wherein the number of particles per mL of is less than 200 at a temperature less than or equal to the cloud point temperature A polypropylene glycol composition comprising:
  From about 1 percent (by weight of total composition) to about 60 percent (by weight of total composition) of at least one polypropylene glycol having a number average molecular weight greater than or equal to 1,000, or 1,100, or 1,200, or 1,300, or 1,400, or 1,500, or 1,600, or 1,700, or 1,800, or a combination thereof
  From about 1 percent (by weight of total composition) to about 99 percent (by weight of total composition) of water
  Wherein the number of particles per mL of is less than 10, or 20, or 30, or 40, or 50, or 60, or 70, or 80, or 90, or 100, or 110, or 120, or 130, or 140, or 150, or 160, or 170, or 180, or 190, or 200, or 250, or 300, or 350, or 400, or 450, or 500, or a combination thereof at a temperature less than or equal to the cloud point temperature A polypropylene glycol composition comprising:
  From about 1 percent (by weight of total composition) to about 60 percent (by weight of total composition) of at least one polypropylene glycol having a number average molecular weight greater than or equal to 1,000, or 1,100, or 1,200, or 1,300, or 1,400, or 1,500, or 1,600, or 1,700, or 1,800, or a combination thereof
  From about 1 percent (by weight of total composition) to about 99 percent (by weight of total composition) of water
  Wherein the number of particles per mL of is less than 10, or 20, or 30, or 40, or 50, or 60, or 70, or 80, or 90, or 100, or 110, or 120, or 130, or 140, or 150, or 160, or 170, or 180, or 190, or 200, or 250, or 300, or 350, or 400, or 450, or 500, or a combination thereof at a temperature within +/−1° K, or +1-1.5° K, or +/−2° K, or +/−2.5° K, or +1-3° K, or +1-3.5° K, or +/−4° K, or +1-4.5° K, or +/−5° K, or +/−5.5° K or +1-6° K, or +1-6.5° K, or +/−7° K, or +/−7.5° K, or +/−8° K, or +/−8.5° K, or +/−9° K, or +/−9.5° K, or +/−10° K of the cloud point temperature A glycol polymer composition comprising:
  From about 1 percent (by weight of total composition) to about 60 percent (by weight of total composition) of at least one glycol polymer having a number average molecular weight greater than or equal to 1,000, or 1,100, or 1,200, or 1,300, or 1,400, or 1,500, or 1,600, or 1,700, or 1,800, or a combination thereof
  From about 1 percent (by weight of total composition) to about 99 percent (by weight of total composition) of water
  Wherein the number of particles per mL of is less than 10, or 20, or 30, or 40, or 50, or 60, or 70, or 80, or 90, or 100, or 110, or 120, or 130, or 140, or 150, or 160, or 170, or 180, or 190, or 200, or 250, or 300, or 350, or 400, or 450, or 500, or a combination thereof at a temperature within +/−1° K, or +/−1.5° K, or +/−2° K, or +/−2.5° K, or +/−3° K, or +/−3.5° K, or +/−4° K, or +1-4.5° K, or +/−5° K, or +/−5.5° K or +1-6° K, or +1-6.5° K, or +/−7° K, or +/−7.5° K, or +/−8° K, or +/−8.5° K, or +/−9° K, or +/−9.5° K, or +/−10° K of the cloud point temperature A glycol composition comprising:
  From about 1 percent (by weight of total composition) to about 60 percent (by weight of total composition) of at least one glycol having a number average molecular weight greater than or equal to 1,000, or 1,100, or 1,200, or 1,300, or 1,400, or 1,500, or 1,600, or 1,700, or 1,800, or a combination thereof
  From about 1 percent (by weight of total composition) to about 99 percent (by weight of total composition) of water
  Wherein the number of particles per mL of is less than 10, or 20, or 30, or 40, or 50, or 60, or 70, or 80, or 90, or 100, or 110, or 120, or 130, or 140, or 150, or 160, or 170, or 180, or 190, or 200, or 250, or 300, or 350, or 400, or 450, or 500, or a combination thereof at a temperature within +/−1° K, or +/−1.5° K or +1-2° K or +1-2.5° K, or +/−3° K, or +/−3.5° K, or +/−4° K, or +1-4.5° K, or +/−5° K, or +/−5.5° K or +1-6° K, or +1-6.5° K, or +/−7° K, or +/−7.5° K, or +/−8° K, or +/−8.5° K, or +/−9° K, or +/−9.5° K, or +/−10° K of the cloud point temperature A polyalkylene oxides composition comprising:
  From about 1 percent (by weight of total composition) to about 60 percent (by weight of total composition) of at least one polyalkylene oxide having a number average molecular weight greater than or equal to 1,000, or 1,100, or 1,200, or 1,300, or 1,400, or 1,500, or 1,600, or 1,700, or 1,800, or a combination thereof
  From about 1 percent (by weight of total composition) to about 99 percent (by weight of total composition) of water Wherein the number of particles per mL of is less than 10, or 20, or 30, or 40, or 50, or 60, or 70, or 80, or 90, or 100, or 110, or 120, or 130, or 140, or 150, or 160, or 170, or 180, or 190, or 200, or 250, or 300, or 350, or 400, or 450, or 500, or a combination thereof at a temperature within +/−1° K, or +/−1.5° K, or +/−2° K, or +/−2.5° K, or +/−3° K, or +/−3.5° K, or +/−4° K, or +1-4.5° K, or +/−5° K, or +/−5.5° K or +1-6° K, or +1-6.5° K, or +/−7° K, or +/−7.5° K, or +/−8° K, or +/−8.5° K, or +/−9° K, or +/−9.5° K, or +/−10° K of the cloud point temperature A polyalkylene oxides composition comprising:
From about 1 percent (by weight of total composition) to about 60 percent (by weight of total composition) of at least one polyalkylene oxides having a number average molecular weight greater than or equal to 1,000, or 1,100, or 1,200, or 1,300, or 1,400, or 1,500, or 1,600, or 1,700, or 1,800, or a combination thereof
From about 1 percent (by weight of total composition) to about 99 percent (by weight of total composition) of water
Wherein the number of particles per mL of is less than 10, or 20, or 30, or 40, or 50, or 60, or 70, or 80, or 90, or 100, or 110, or 120, or 130, or 140, or 150, or 160, or 170, or 180, or 190, or 200, or 250, or 300, or 350, or 400, or 450, or 500, or a combination thereof at a temperature within +/−1° K, or +1-1.5° K, or +/−2° K, or +/−2.5° K, or +1-3° K, or +1-3.5° K, or +/−4° K, or +1-4.5° K, or +/−5° K, or +/−5.5° K or +1-6° K, or +1-6.5° K, or +/−7° K, or +/−7.5° K, or +/−8° K, or +/−8.5° K, or +/−9° K, or +/−9.5° K, or +/−10° K of the cloud point temperature
Wherein the cloud point temperature is less than or equal to 0° C., or 2.5° C., or 5° C., 7.5° C., or 10° C., or 12.5° C., or 15° C., or 17.5° C., or 20° C., or 22.5° C., or 25° C., or 27.5° C., or 30° C., or 35° C., or 40° C., or 45° C., or 50° C., or 55° C., or 60° C., or 65° C., or 70° C., or 75° C., or 80° C., or 85° C., or 90° C., or 95° C., or 100° C., or 105° C., or 110° C., or 150° C., or 200° C.
Wherein the enthalpy of liquid-liquid phase transition is greater than 2.5 kJ per kg, or 5 kJ per kg, or 7.5 kJ per kg, or 10 kJ per kg, or a combination thereof A polyalkylene oxides composition comprising:
From about 1 percent (by weight of total composition) to about 60 percent (by weight of total composition) of at least one polyalkylene oxides having a number average molecular weight greater than or equal to 1,000, or 1,100, or 1,200, or 1,300, or 1,400, or 1,500, or 1,600, or 1,700, or 1,800, or a combination thereof
From about 1 percent (by weight of total composition) to about 99 percent (by weight of total composition) of water
Wherein the number of particles per mL of is less than 10, or 20, or 30, or 40, or 50, or 60, or 70, or 80, or 90, or 100, or 110, or 120, or 130, or 140, or 150, or 160, or 170, or 180, or 190, or 200, or 250, or 300, or 350, or 400, or 450, or 500, or a combination thereof at a temperature within +/−1° K, or +/−1.5° K or +1-2° K or +1-2.5° K, or +/−3° K, or +/−3.5° K, or +/−4° K, or +1-4.5° K, or +/−5° K, or +/−5.5° K or +1-6° K, or +1-6.5° K, or +/−7° K, or +/−7.5° K, or +/−8° K, or +/−8.5° K, or +/−9° K, or +/−9.5° K, or +/−10° K of the cloud point temperature
Wherein the cloud point temperature is less than or equal to 0° C., or 2.5° C., or 5° C., 7.5° C., or 10° C., or 12.5° C., or 15° C., or 17.5° C., or 20° C., or 22.5° C., or 25° C., or 27.5° C., or 30° C., or 35° C., or 40° C., or 45° C., or 50° C.

A polyalkylene oxides composition comprising:
From about 1 percent (by weight of total composition) to about 60 percent (by weight of total composition) of at least one polyalkylene oxides having a number average molecular weight greater than or equal to 1,000, or 1,100, or 1,200, or 1,300, or 1,400, or 1,500, or 1,600, or 1,700, or 1,800, or a combination thereof
From about 1 percent (by weight of total composition) to about 99 percent (by weight of total composition) of water
From about 1 percent (by weight of total composition) to about 30 percent (by weight of total composition) of an ether
Wherein the number of particles per mL of is less than 10, or 20, or 30, or 40, or 50, or 60, or 70, or 80, or 90, or 100, or 110, or 120, or 130, or 140, or 150, or 160, or 170, or 180, or 190, or 200, or 250, or 300, or 350, or 400, or 450, or 500 or a combination thereof at a temperature within +/−1° K, or +1-1.5° K, or +/−2° K, or +/−2.5° K or +1-3° K, or +1-3.5° K, or +/−4° K, or +1-4.5° K, or +/−5° K, or +/−5.5° K or +1-6° K, or +1-6.5° K, or +/−7° K, or +/−7.5° K, or +/−8° K, or +/−8.5° K, or +/−9° K, or +/−9.5° K, or +/−10° K of the cloud point temperature
Wherein the cloud point temperature is less than or equal to 0° C., or 2.5° C., or 5° C., 7.5° C., or 10° C., or 12.5° C., or 15° C., or 17.5° C., or 20° C., or 22.5° C., or 25° C., or 27.5° C., or 30° C., or 35° C., or 40° C., or 45° C., or 50° C.

A polyalkylene oxides composition comprising:
From about 1 percent (by weight of total composition) to about 60 percent (by weight of total composition) of at least one polyalkylene oxides having a number average molecular weight greater than or equal to 1,000, or 1,100, or 1,200, or 1,300, or 1,400, or 1,500, or 1,600, or 1,700, or 1,800, or a combination thereof
From about 1 percent (by weight of total composition) to about 99 percent (by weight of total composition) of water
From about 1 percent (by weight of total composition) to about 30 percent (by weight of total composition) of a glycol ether
Wherein the number of particles per mL of is less than 10, or 20, or 30, or 40, or 50, or 60, or 70, or 80, or 90, or 100, or 110, or 120, or 130, or 140, or 150, or 160, or 170, or 180, or 190, or 200, or 250, or 300, or 350, or 400, or 450, or 500 or a combination thereof at a temperature within +/−1° K, or +1-1.5° K, or +/−2° K, or +/−2.5° K, or +1-3° K, or +1-3.5° K, or +/−4° K, or +1-4.5° K, or +/−5° K, or +/−5.5° K or +1-6° K, or +1-6.5° K, or +/−7° K, or +/−7.5° K, or +/−8° K, or +/−8.5° K, or +/−9° K, or +/−9.5° K, or +/−10° K of the cloud point temperature
Wherein the cloud point temperature is less than or equal to 0° C., or 2.5° C., or 5° C., 7.5° C., or 10° C., or 12.5° C., or 15° C., or 17.5° C., or 20° C., or 22.5° C., or 25° C., or 27.5° C., or 30° C., or 35° C., or 40° C., or 45° C., or 50° C.

A polypropylene glycol composition comprising:
  From about 1 percent (by weight of total composition) to about 80 percent (by weight of total composition) of at least one polypropylene glycol having a number average molecular weight less than or equal to 10,000
  From about 1 percent (by weight of total composition) to about 99 percent (by weight of total composition) of water
  Wherein the density of the liquid phase comprising the polypropylene glycol which forms above a cloud point temperature due to a liquid-liquid phase transition possesses a density less than 0.999 grams per mL, or 0.99 g/mL, or 0.98 g/mL
  Wherein the enthalpy of liquid-liquid phase transition is greater than 2.5 kJ per kg, or 5 kJ per kg, or 7.5 kJ per kg, or 10 kJ per kg, or a combination thereof A polypropylene glycol composition comprising:
  From about 1 percent (by weight of total composition) to about 60 percent (by weight of total composition) of at least one polypropylene glycol having a number average molecular weight less than or equal to 5,000
  From about 1 percent (by weight of total composition) to about 99 percent (by weight of total composition) of water
  Wherein the density of the liquid phase comprising the organic liquid phase which forms above a cloud point temperature due to a liquid-liquid phase transition into two liquid phases possesses a density less than 0.999 grams per mL, or 0.99 g/mL, or 0.98 g/mL
  Wherein the enthalpy of liquid-liquid phase transition is greater than 2.5 kJ per kg, or 5 kJ per kg, or 7.5 kJ per kg, or 10 kJ per kg, or a combination thereof A polypropylene glycol composition comprising:
  From about 1 percent (by weight of total composition) to about 60 percent (by weight of total composition) of at least one polypropylene glycol having a number average molecular weight less than or equal to 5,000
  From about 1 percent (by weight of total composition) to about 99 percent (by weight of total composition) of water
  Wherein the density of the organic liquid phase which forms above a cloud point temperature due to a liquid-liquid phase transition into two liquid phases possesses a density greater than 0.999 g/mol A polypropylene glycol composition comprising:
  From about 1 percent (by weight of total composition) to about 60 percent (by weight of total composition) of at least one polypropylene glycol having a number average molecular weight less than or equal to 5,000
  From about 1 percent (by weight of total composition) to about 99 percent (by weight of total composition) of water
  Wherein the composition comprises at least two liquid phases when at a temperature above a cloud point temperature and wherein:
    At least one of said at least two liquid phases comprises a mostly organic liquid phase, or a mostly polypropylene glycol liquid phase, or a combination thereof
    At least one of said at least two liquid phases comprises a mostly water liquid phase
    Wherein the density of the mostly organic liquid phase is less than the mostly water liquid phase A polypropylene glycol composition comprising:
  From about 1 percent (by weight of total composition) to about 60 percent (by weight of total composition) of at least one polypropylene glycol having a number average molecular weight less than or equal to 5,000
  From about 1 percent (by weight of total composition) to about 99 percent (by weight of total composition) of water
  Wherein the composition comprises at least two liquid phases when at a temperature above a cloud point temperature and wherein:
    At least one of said at least two liquid phases comprises a mostly organic liquid phase, or a mostly polypropylene glycol liquid phase, or a combination thereof
    At least one of said at least two liquid phases comprises a mostly water liquid phase
    Wherein the density of the mostly organic liquid phase is greater than the mostly water liquid phase A process for liquid-liquid phase transitioning a liquid comprising:
  Phase transitioning a composition comprising polypropylene glycol and water into two liquid phases
    Wherein at least one of said two liquid phases comprises mostly water
    Wherein at least one of said two liquid phases comprises polypropylene glycol
    Wherein the liquid phase comprising polypropylene glycol has a density less than 0.999 g/mL, or 0.99 g/mL, or 0.98 g/mL, or 0.97 g/mL, or 0.96 g/mL, or 0.95 g/mL, or 0.94 g/mL, or 0.93 g/mL, or 0.92 g/mL, or 0.91 g/mL, or 0.90 g/mL
    Wherein the enthalpy of liquid-liquid phase transition is greater than 2.5 kJ per kg, or 5 kJ per kg, or 7.5 kJ per kg, or 10 kJ per kg, or a combination thereof A process for liquid-liquid phase transitioning a liquid comprising:
  Phase transitioning a composition comprising polyalkylene oxide and water into two liquid phases
    Wherein at least one of said two liquid phases comprises water
    Wherein at least one of said two liquid phases comprises polyalkylene oxide
    Wherein the liquid phase comprising polyalkylene oxide has a density less than 0.999 g/mL, or 0.99 g/mL, or 0.98 g/mL, or 0.97 g/mL, or 0.96 g/mL, or 0.95 g/mL, or 0.94 g/mL, or 0.93 g/mL, or 0.92 g/mL, or 0.91 g/mL, or 0.90 g/mL A process for liquid-liquid phase transitioning a liquid comprising:
  Phase transitioning a composition comprising polyalkylene oxide and water into two liquid phases
    Wherein at least one of said two liquid phases comprises mostly water
    Wherein at least one of said two liquid phases comprises mostly organic liquid phase, or mostly polyalkylene oxide, or a combination thereof
    Wherein the liquid phase comprising mostly organic liquid phase, or mostly polyalkylene oxide, or a combination thereof has a density less than 0.999 g/mL, or 0.99 g/mL, or 0.98 g/mL, or 0.97 g/mL, or 0.96 g/mL, or 0.95 g/mL, or 0.94 g/mL, or 0.93 g/mL, or 0.92 g/mL, or 0.91 g/mL, or 0.90 g/mL A process for liquid-liquid phase transitioning a liquid comprising:
Phase transitioning a composition comprising glycol polymer and water into two liquid phases
Wherein at least one of said two liquid phases comprises mostly water
Wherein at least one of said two liquid phases comprises mostly organic liquid phase, or mostly glycol polymer, or a combination thereof
Wherein the liquid phase comprising mostly organic liquid phase, or mostly glycol polymer, or a combination thereof has a density less than 0.999 g/mL, or 0.99 g/mL, or 0.98 g/mL, or 0.97 g/mL, or 0.96 g/mL, or 0.95 g/mL, or 0.94 g/mL, or 0.93 g/mL, or 0.92 g/mL, or 0.91 g/mL, or 0.90 g/mL A process for liquid-liquid phase transitioning a liquid comprising:
Phase transitioning a composition comprising polypropylene glycol and water into two liquid phases
Wherein at least one of said two liquid phases comprises mostly water
Wherein at least one of said two liquid phases comprises polypropylene glycol
Wherein the liquid phase comprising polypropylene glycol has a density less than the density of water A process for liquid-liquid phase transitioning a liquid comprising:
Phase transitioning a composition comprising a glycol polymer and water into two liquid phases
Wherein at least one of said two liquid phases comprises mostly water
Wherein at least one of said two liquid phases comprises glycol polymer
Wherein the liquid phase comprising glycol polymer has a density less than the density of water A process for liquid-liquid phase transitioning a liquid comprising:
Heating a composition comprising a glycol polymer and water above a cloud point temperature to form two liquid phases
Wherein at least one of said two liquid phases comprises mostly water
Wherein at least one of said two liquid phases comprises glycol polymer
Wherein the liquid phase comprising glycol polymer has a density less than the density of water A process for liquid-liquid phase transitioning a liquid comprising:
Phase transitioning a composition comprising a glycol polymer and water into two liquid phases
Wherein at least one of said two liquid phases comprises mostly water
Wherein at least one of said two liquid phases comprises glycol polymer
Wherein the liquid phase comprising glycol polymer has a density greater than the density of water A process for liquid-liquid phase transitioning a liquid comprising:
Phase transitioning a composition comprising a glycol polymer and water into two liquid phases
Wherein at least one of said two liquid phases comprises mostly water
Wherein at least one of said two liquid phases comprises glycol polymer
Wherein the liquid phase comprising glycol polymer has a density less than the density of pure or isolated glycol polymer A process for liquid-liquid phase transitioning a liquid comprising:
Phase transitioning a composition comprising a glycol polymer and water into two liquid phases
Wherein at least one of said two liquid phases comprises mostly water
Wherein at least one of said two liquid phases comprises glycol polymer
Wherein the liquid phase comprising glycol polymer has a density greater than the density of pure or isolated glycol polymer A process for liquid-liquid phase transitioning a liquid comprising:
Phase transitioning a composition comprising a polyalkylene oxide and water into two liquid phases
Wherein at least one of said two liquid phases comprises mostly water
Wherein at least one of said two liquid phases comprises polyalkylene oxide
Wherein the liquid phase comprising polyalkylene oxide has a density less than the density of pure or isolated polyalkylene oxide A process for liquid-liquid phase transitioning a liquid comprising:
Phase transitioning a composition comprising a polyalkylene oxide and water into two liquid phases
Wherein at least one of said two liquid phases comprises mostly water
Wherein at least one of said two liquid phases comprises polyalkylene oxide
Wherein the liquid phase comprising polyalkylene oxide has a density greater than the density of pure or isolated polyalkylene oxide
Wherein the enthalpy of liquid-liquid phase transition is greater than 2.5 kJ per kg, or 5 kJ per kg, or 7.5 kJ per kg, or 10 kJ per kg, or a combination thereof A polypropylene glycol composition comprising:
From about 1 percent (by weight of total composition) to about 60 percent (by weight of total composition) of at least one polypropylene glycol having a number average molecular weight less than or equal to 5,000
From about 1 percent (by weight of total composition) to about 99 percent (by weight of total composition) of water
Wherein the composition comprises at least two liquid phases when at a temperature above a cloud point temperature and wherein:
At least one of said at least two liquid phases comprises polypropylene glycol
At least one of said at least two liquid phases comprises water
Wherein the liquid phase comprising polypropylene glycol has a viscosity less than 100 cP at 20° C.
Wherein the enthalpy of liquid-liquid phase transition is greater than 2.5 kJ per kg, or 5 kJ per kg, or 7.5 kJ per kg, or 10 kJ per kg, or a combination thereof A polypropylene glycol composition comprising:
From about 1 percent (by weight of total composition) to about 60 percent (by weight of total composition) of at least one polypropylene glycol having a number average molecular weight less than or equal to 5,000
From about 1 percent (by weight of total composition) to about 99 percent (by weight of total composition) of water Wherein the composition comprises at least two liquid phases when at a temperature above a cloud point temperature and wherein:
  At least one of said at least two liquid phases comprises polypropylene glycol
  At least one of said at least two liquid phases comprises water
  Wherein the liquid phase comprising polypropylene glycol has a viscosity less than 50 cP at 20° C.

A polypropylene glycol composition comprising:
  From about 1 percent (by weight of total composition) to about 60 percent (by weight of total composition) of at least one polypropylene glycol having a number average molecular weight greater than or equal to 1,000 and less than or equal to 5,000
  From about 1 percent (by weight of total composition) to about 99 percent (by weight of total composition) of water
  Wherein the composition comprises at least two liquid phases when at a temperature above a cloud point temperature and wherein:
    At least one of said at least two liquid phases comprises polypropylene glycol
    At least one of said at least two liquid phases comprises water
    Wherein the liquid phase comprising polypropylene glycol has a viscosity less than 100 cP at 20° C.

A polypropylene glycol composition comprising:
  From about 1 percent (by weight of total composition) to about 60 percent (by weight of total composition) of at least one polypropylene glycol having a number average molecular weight less than or equal to 5,000
  From about 1 percent (by weight of total composition) to about 99 percent (by weight of total composition) of water
  Wherein the composition comprises at least two liquid phases when at a temperature above a cloud point temperature and wherein:
    At least one of said at least two liquid phases comprises polypropylene glycol
    At least one of said at least two liquid phases comprises water
    Wherein the liquid phase comprising polypropylene glycol has a viscosity (in cP) less than one or more or a combination of the following at 20° C.: 10 cP, or 20 cP, or 30 cP, or 40 cP, or 50 cP, or 60 cP, or 70 cP, or 80 cP, or 90 cP, or 100 cP, or 110 cP, or 120 cP, or 130 cP, or 140 cP, or 150 cP, or 160 cP, or 170 cP, or 180 cP, or 190 cP, or 200 cP, or 300 cP, or 400 cP, or 500 cP A polypropylene glycol composition comprising:
  From about 1 percent (by weight of total composition) to about 80 percent (by weight of total composition) of at least one polypropylene glycol having a number average molecular weight less than or equal to 5,000
  From about 1 percent (by weight of total composition) to about 99 percent (by weight of total composition) of water
  Wherein the composition comprises at least two liquid phases when at a temperature above a cloud point temperature and wherein:
    At least one of said at least two liquid phases comprises polypropylene glycol
    At least one of said at least two liquid phases comprises water A process for liquid-liquid phase transitioning a liquid comprising:
  Phase transitioning a composition comprising a polyalkylene oxide and water into two liquid phases
    Wherein at least one of said two liquid phases comprises mostly water
    Wherein at least one of said two liquid phases comprises polyalkylene oxide
    Wherein the liquid phase comprising polyalkylene oxide has a viscosity less than 60 cP at 20° C.

A process for liquid-liquid phase transitioning a liquid comprising:
  Phase transitioning a composition comprising a polyalkylene oxide and water into two liquid phases
    Wherein at least one of said two liquid phases comprises mostly water
    Wherein at least one of said two liquid phases comprises polyalkylene oxide
    Wherein the liquid phase comprising polyalkylene oxide has a viscosity (in cP) less than one or more or a combination of the following at 20° C.: 10 cP, or 20 cP, or 30 cP, or 40 cP, or 50 cP, or 60 cP, or 70 cP, or 80 cP, or 90 cP, or 100 cP, or 110 cP, or 120 cP, or 130 cP, or 140 cP, or 150 cP, or 160 cP, or 170 cP, or 180 cP, or 190 cP, or 200 cP, or 300 cP, or 400 cP, or 500 cP A process for liquid-liquid phase transitioning a liquid comprising:
  Phase transitioning a composition comprising a polypropylene glycol and water into two liquid phases
    Wherein at least one of said two liquid phases comprises mostly water
    Wherein at least one of said two liquid phases comprises polypropylene glycol
    Wherein the liquid phase comprising polypropylene glycol has a viscosity (in cP) less than one or more or a combination of the following at 20° C.: 10 cP, or 20 cP, or 30 cP, or 40 cP, or 50 cP, or 60 cP, or 70 cP, or 80 cP, or 90 cP, or 100 cP, or 110 cP, or 120 cP, or 130 cP, or 140 cP, or 150 cP, or 160 cP, or 170 cP, or 180 cP, or 190 cP, or 200 cP, or 300 cP, or 400 cP, or 500 cP A process for liquid-liquid phase transitioning a liquid comprising:
  Phase transitioning a composition comprising a glycol polymer and water into two liquid phases
    Wherein at least one of said two liquid phases comprises water
    Wherein at least one of said two liquid phases comprises a glycol polymer
    Wherein the liquid phase comprising glycol polymer has a viscosity (in cP) less than one or more or a combination of the following at 20° C.: 10 cP, or 20 cP, or 30 cP, or 40 cP, or 50 cP, or 60 cP, or 70 cP, or 80 cP, or 90 cP, or 100 cP, or 110 cP, or 120 cP, or 130 cP, or 140 cP, or 150 cP, or 160 cP, or 170 cP, or 180 cP, or 190 cP, or 200 cP, or 300 cP, or 400 cP, or 500 cP, or 600 cP, or 700 cP, or 800 cP, or 900 cP, or 1000 cP A process for liquid-liquid phase transitioning a liquid comprising:
  Phase transitioning a composition comprising a glycol polymer and water into two liquid phases
    Wherein at least one of said two liquid phases comprises water
    Wherein at least one of said two liquid phases comprises a glycol polymer with an average molecular number greater than or equal to 1000

Wherein the liquid phase comprising a glycol polymer with an average molecular number greater than or equal to 1000 has a viscosity (in cP) less than one or more or a combination of the following at 20° C.: 10 cP, or 20 cP, or 30 cP, or 40 cP, or 50 cP, or 60 cP, or 70 cP, or 80 cP, or 90 cP, or 100 cP, or 110 cP, or 120 cP, or 130 cP, or 140 cP, or 150 cP, or 160 cP, or 170 cP, or 180 cP, or 190 cP, or 200 cP, or 300 cP, or 400 cP, or 500 cP, or 600 cP, or 700 cP, or 800 cP, or 900 cP, or 1000 cP A process for liquid-liquid phase transitioning a liquid comprising:
Phase transitioning a composition comprising a polyalkylene oxide and water into two liquid phases
Wherein at least one of said two liquid phases comprises water
Wherein at least one of said two liquid phases comprises a polyalkylene oxide with an average molecular number greater than or equal to 400
Wherein the liquid phase comprising a glycol polymer with an average molecular number greater than or equal to 400 has a viscosity (in cP) less than one or more or a combination of the following at 20° C.: 10 cP, or 20 cP, or 30 cP, or 40 cP, or 50 cP, or 60 cP, or 70 cP, or 80 cP, or 90 cP, or 100 cP, or 110 cP, or 120 cP, or 130 cP, or 140 cP, or 150 cP, or 160 cP, or 170 cP, or 180 cP, or 190 cP, or 200 cP, or 300 cP, or 400 cP, or 500 cP, or 600 cP, or 700 cP, or 800 cP, or 900 cP, or 1000 cP A liquid-liquid phase transition composition comprising:
From about 1 percent (by weight of total composition) to about 70 percent (by weight of total composition) of at least one reagent
From about 1 percent (by weight of total composition) to about 99 percent (by weight of total composition) of water
Wherein the enthalpy of liquid-liquid phase transition is greater than 2.5 kJ per kg, or 5 kJ per kg, or 7.5 kJ per kg, or 10 kJ per kg, or 12.5 kJ per kg, or 15 kJ per kg, or 17.5 kJ per kg, or 20 kJ per kg, or a combination thereof A liquid-liquid phase transition composition comprising:
From about 1 percent (by weight of total composition) to about 70 percent (by weight of total composition) of a polyalkylene oxide
From about 1 percent (by weight of total composition) to about 99 percent (by weight of total composition) of water
Wherein the enthalpy of liquid-liquid phase transition is greater than 2.5 kJ per kg, or 5 kJ per kg, or 7.5 kJ per kg, or 10 kJ per kg, or 12.5 kJ per kg, or 15 kJ per kg, or 17.5 kJ per kg, or 20 kJ per kg, or a combination thereof A liquid-liquid phase transition composition comprising:
From about 1 percent (by weight of total composition) to about 70 percent (by weight of total composition) of a glycol polymer
From about 1 percent (by weight of total composition) to about 99 percent (by weight of total composition) of water
Wherein the enthalpy of liquid-liquid phase transition is greater than 2.5 kJ per kg, or 5 kJ per kg, or 7.5 kJ per kg, or 10 kJ per kg, or 12.5 kJ per kg, or 15 kJ per kg, or 17.5 kJ per kg, or 20 kJ per kg, or a combination thereof A liquid-liquid phase transition composition comprising:
From about 1 percent (by weight of total composition) to about 70 percent (by weight of total composition) of a glycol polymer
From about 1 percent (by weight of total composition) to about 99 percent (by weight of total composition) of water
Wherein the enthalpy of liquid-liquid phase transition is greater than 2.5 kJ per kg, or 5 kJ per kg, or 7.5 kJ per kg, or 10 kJ per kg, or 12.5 kJ per kg, or 15 kJ per kg, or 17.5 kJ per kg, or 20 kJ per kg, or a combination thereof
Wherein at least a portion of the enthalpy of phase transition temperature range is different than the cloud point temperature A liquid-liquid phase transition composition comprising:
From about 1 percent (by weight of total composition) to about 70 percent (by weight of total composition) of a reagent
From about 1 percent (by weight of total composition) to about 99 percent (by weight of total composition) of water
Wherein the enthalpy of liquid-liquid phase transition is greater than 2.5 kJ per kg, or 5 kJ per kg, or 7.5 kJ per kg, or 10 kJ per kg, or 12.5 kJ per kg, or 15 kJ per kg, or 17.5 kJ per kg, or 20 kJ per kg, or a combination thereof
Wherein at least a portion of the enthalpy of phase transition temperature range is different than the cloud point temperature A liquid-liquid phase transition composition comprising:
From about 1 percent (by weight of total composition) to about 70 percent (by weight of total composition) of a reagent
From about 1 percent (by weight of total composition) to about 99 percent (by weight of total composition) of water
Wherein the enthalpy of liquid-liquid phase transition is greater than 2.5 kJ per kg, or 5 kJ per kg, or 7.5 kJ per kg, or 10 kJ per kg, or 12.5 kJ per kg, or 15 kJ per kg, or 17.5 kJ per kg, or 20 kJ per kg, or a combination thereof
Wherein at least a portion of the heat absorbed or released by the enthalpy of phase transition occurs at a different than the cloud point temperature A liquid-liquid phase transition composition comprising:
From about 1 percent (by weight of total composition) to about 70 percent (by weight of total composition) of a reagent
From about 1 percent (by weight of total composition) to about 99 percent (by weight of total composition) of water
Wherein the enthalpy of liquid-liquid phase transition is greater than 2.5 kJ per kg, or 5 kJ per kg, or 7.5 kJ per kg, or 10 kJ per kg, or 12.5 kJ per kg, or 15 kJ per kg, or 17.5 kJ per kg, or 20 kJ per kg, or a combination thereof Wherein at least 10%, or 20%, or 30%, or 40%, or 50%, or 60%, or 70%, or 80%, or 90% of the heat absorbed or released by the enthalpy of phase transition occurs at a different than the cloud point temperature A liquid-liquid phase transition composition comprising:
From about 1 percent (by weight of total composition) to about 70 percent (by weight of total composition) of a reagent
From about 1 percent (by weight of total composition) to about 99 percent (by weight of total composition) of water
Wherein the enthalpy of liquid-liquid phase transition is greater than 2.5 kJ per kg, or 5 kJ per kg, or 7.5 kJ per kg, or 10 kJ per kg, or 12.5 kJ per kg, or 15 kJ per kg, or 17.5 kJ per kg, or 20 kJ per kg, or a combination thereof
Wherein at least 50% of the heat absorbed or released by the enthalpy of phase transition occurs at a different than the cloud point temperature A liquid-liquid phase transition composition comprising:
From about 1 percent (by weight of total composition) to about 70 percent (by weight of total composition) of a reagent
From about 1 percent (by weight of total composition) to about 99 percent (by weight of total composition) of water
Wherein the enthalpy of liquid-liquid phase transition is greater than 2.5 kJ per kg, or 5 kJ per kg, or 7.5 kJ per kg, or 10 kJ per kg, or 12.5 kJ per kg, or 15 kJ per kg, or 17.5 kJ per kg, or 20 kJ per kg, or a combination thereof
Wherein the peak enthalpy of liquid-liquid phase transition occurs at a different temperature than the cloud point temperature A liquid-liquid phase transition composition comprising:
From about 1 percent (by weight of total composition) to about 70 percent (by weight of total composition) of a reagent
From about 1 percent (by weight of total composition) to about 99 percent (by weight of total composition) of water
Wherein the enthalpy of liquid-liquid phase transition is greater than 2.5 kJ per kg, or 5 kJ per kg, or 7.5 kJ per kg, or 10 kJ per kg, or 12.5 kJ per kg, or 15 kJ per kg, or 17.5 kJ per kg, or 20 kJ per kg, or a combination thereof
Wherein the peak enthalpy of liquid-liquid phase transition temperature is different from the cloud point temperature by greater than 0.5° K A liquid-liquid phase transition composition comprising:
From about 1 percent (by weight of total composition) to about 70 percent (by weight of total composition) of a reagent
From about 1 percent (by weight of total composition) to about 99 percent (by weight of total composition) of water
Wherein the enthalpy of liquid-liquid phase transition is greater than 2.5 kJ per kg, or 5 kJ per kg, or 7.5 kJ per kg, or 10 kJ per kg, or 12.5 kJ per kg, or 15 kJ per kg, or 17.5 kJ per kg, or 20 kJ per kg, or a combination thereof
Wherein the peak enthalpy of liquid-liquid phase transition temperature is different from the cloud point temperature by greater than 0.5° K, or 1° K, or 1.5° K, or 2° K, or 2.5° K, or 3° K, or 3.5° K, or 4° K, or 4.5° K, or 5° K, or 5.5° K, or 6° K, or 6.5° K, or 7° K, or 7.5° K, or 8° K, or 8.5° K, or 9° K, or 9.5° K, or 10° K, or a combination thereof A liquid-liquid phase transition composition comprising:
From about 0.5 percent (by weight of total composition) to about 70 percent (by weight of total composition) of a polypropylene glycol
From about 0.5 percent (by weight of total composition) to about 70 percent (by weight of total composition) of a glycol ether
From about 0.5 percent (by weight of total composition) to about 99 percent (by weight of total composition) of a water
Wherein the enthalpy of liquid-liquid phase transition is greater than 2.5 kJ per kg, or 5 kJ per kg, or 7.5 kJ per kg, or 10 kJ per kg, or 12.5 kJ per kg, or 15 kJ per kg, or 17.5 kJ per kg, or 20 kJ per kg, or a combination thereof A liquid-liquid phase transition composition comprising:
From about 0.5 percent (by weight of total composition) to about 70 percent (by weight of total composition) of a polypropylene glycol
From about 0.5 percent (by weight of total composition) to about 70 percent (by weight of total composition) of a glycol ether
From about 0.5 percent (by weight of total composition) to about 99 percent (by weight of total composition) of a water
Wherein the number of particles per mL of is less than 10, or 20, or 30, or 40, or 50, or 60, or 70, or 80, or 90, or 100, or 110, or 120, or 130, or 140, or 150, or 160, or 170, or 180, or 190, or 200, or 250, or 300, or 350, or 400, or 450, or 500, or 550, or 600, or a combination thereof at a temperature 0.25° K, or 0.5° K, or 0.75° K, or 1° K, or 1.5° K, or 2° K, or 2.5° K, or 3° K, or 3.5° K, or 4° K, or 4.5° K, or 5° K, or 5.5° K, or 6° K, or 6.5° K, or 7° K, or 7.5° K, or 8° K, or 8.5° K, or 9° K, or 9.5° K, or 10° K below the cloud point temperature
Wherein the enthalpy of liquid-liquid phase transition is greater than 2.5 kJ per kg, or 5 kJ per kg, or 7.5 kJ per kg, or 10 kJ per kg, or 12.5 kJ per kg, or 15 kJ per kg, or 17.5 kJ per kg, or 20 kJ per kg, or a combination thereof A liquid-liquid phase transition composition comprising:
From about 0.5 percent (by weight of total composition) to about 70 percent (by weight of total composition) of a glycol polymer
From about 0.5 percent (by weight of total composition) to about 70 percent (by weight of total composition) of a glycol ether
From about 0.5 percent (by weight of total composition) to about 99 percent (by weight of total composition) of a water
Wherein the number of particles per mL of is less than 10, or 20, or 30, or 40, or 50, or 60, or 70, or 80, or 90, or 100, or 110, or 120, or 130, or 140, or 150, or 160, or 170, or 180, or 190, or 200, or 250, or 300, or 350, or 400, or 450, or 500, or 550, or 600, or a combination thereof at a temperature 0.25° K, or 0.5° K, or 0.75° K, or 1° K, or 1.5° K, or 2° K, or 2.5° K, or 3° K, or 3.5° K, or 4° K, or 4.5° K, or 5° K, or 5.5° K, or 6° K, or 6.5° K, or 7° K, or 7.5° K, or 8° K, or 8.5° K, or 9° K, or 9.5° K, or 10° K. below the cloud point temperature Wherein the enthalpy of liquid-liquid phase transition is greater than 2.5 kJ per kg, or 5 kJ per kg, or 7.5 kJ per kg, or 10 kJ per kg, or 12.5 kJ per kg, or 15 kJ per kg, or 17.5 kJ per kg, or 20 kJ per kg, or a combination thereof A liquid-liquid phase transition composition comprising:
From about 0.5 percent (by weight of total composition) to about 70 percent (by weight of total composition) of a polypropylene glycol
From about 0.5 percent (by weight of total composition) to about 70 percent (by weight of total composition) of a glycol ether
From about 0.5 percent (by weight of total composition) to about 99 percent (by weight of total composition) of a water
Wherein the number of particles per mL increases by greater than 10%, or 20%, or 30%, or 40%, or 50%, or 60%, or 70%, or 80%, or 90%, or 95%, or 99% at a cloud point temperature
Wherein the enthalpy of liquid-liquid phase transition is greater than 2.5 kJ per kg, or 5 kJ per kg, or 7.5 kJ per kg, or 10 kJ per kg, or 12.5 kJ per kg, or 15 kJ per kg, or 17.5 kJ per kg, or 20 kJ per kg, or a combination thereof A liquid-liquid phase transition composition comprising:
From about 0.5 percent (by weight of total composition) to about 70 percent (by weight of total composition) of a glycol polymer
From about 0.5 percent (by weight of total composition) to about 70 percent (by weight of total composition) of a glycol ether
From about 0.5 percent (by weight of total composition) to about 99 percent (by weight of total composition) of a water
Wherein the number of particles per mL increases by greater than 10%, or 20%, or 30%, or 40%, or 50%, or 60%, or 70%, or 80%, or 90%, or 95%, or 99% at a cloud point temperature
Wherein the enthalpy of liquid-liquid phase transition is greater than 2.5 kJ per kg, or 5 kJ per kg, or 7.5 kJ per kg, or 10 kJ per kg, or 12.5 kJ per kg, or 15 kJ per kg, or 17.5 kJ per kg, or 20 kJ per kg, or a combination thereof A liquid-liquid phase transition composition comprising:
From about 0.5 percent (by weight of total composition) to about 70 percent (by weight of total composition) of a glycol polymer
From about 0.5 percent (by weight of total composition) to about 70 percent (by weight of total composition) of a glycol ether
From about 0.5 percent (by weight of total composition) to about 99 percent (by weight of total composition) of a water
Wherein the viscosity of an organic liquid phase is less than 10 cP, or 20 cP, or 30 cP, or 40 cP, or 50 cP, or 60 cP, or 70 cP, or 80 cP, or 90 cP, or 100 cP, or 110 cP, or 120 cP, or 130 cP, or 140 cP, or 150 cP, or 160 cP, or 170 cP, or 180 cP, or 190 cP, or 200 cP, or 300 cP, or 400 cP, or 500 cP
Wherein the enthalpy of liquid-liquid phase transition is greater than 2.5 kJ per kg, or 5 kJ per kg, or 7.5 kJ per kg, or 10 kJ per kg, or 12.5 kJ per kg, or 15 kJ per kg, or 17.5 kJ per kg, or 20 kJ per kg, or a combination thereof A liquid-liquid phase transition composition comprising:
from about 1 to about 70 percent by weight of total composition of a liquid-liquid phase transitioning reagent;
from about 1 to about 99 percent by weight of total composition of water;
wherein enthalpy of the composition's liquid-liquid phase transition is greater than 5 kJ per kg of composition; and
wherein peak enthalpy of the composition's liquid-liquid phase transition temperature is different from the cloud point temperature by greater than 0.5° K. with cloud point measured by a laser particle counting method and the peak enthalpy of liquid-liquid phase transition as measured by a Mettler Toledo RC1 calorimeter.

A glycol polymer composition comprising:
from about 1 to about 80 percent by weight of total composition of at least one polypropylene glycol having a number average molecular weight greater than or equal to 1,200 and less than or equal to 3,000;
from about 1 to about 99 percent by weight of total composition of water;
from about 0.5 to about 50 percent by weight of a glycol ether
Wherein the number of particles per mL of the composition is less than 200 as measured by a laser particle counting method 1. A glycol polymer composition comprising:
from about 1 to about 80 percent by weight of total composition of at least one polypropylene glycol having a number average molecular weight greater than or equal to 1,200 and less than or equal to 3,000;
from about 1 to about 99 percent by weight of total composition of water;
Wherein (1) the solution comprises a single liquid phase combined solution at a temperature below 5° C. as determined by a laser particle counting method; and
(2) enthalpy of liquid-liquid phase transition is greater than 5 kJ per kg as measured by a Mettler Toledo RC1 calorimeter.

A glycol polymer composition comprising:
from about 1 to about 80 percent by weight of total composition of at least one polypropylene glycol having a number average molecular weight greater than or equal to 2,000 and less than or equal to 3,000;
from about 1 to about 99 percent by weight of total composition of water;
Wherein (1) the number of particles per mL of the composition is less than 200 as measured by a laser particle counting method at a temperature below 5° C. as determined by a laser particle counting method; and
(2) enthalpy of liquid-liquid phase transition is greater than 5 kJ per kg as measured by a Mettler Toledo RC1 calorimeter.

1. A glycol polymer composition comprising:
from about 1 to about 80 percent by weight of total composition of at least one polypropylene glycol having a number average molecular weight greater than or equal to 2,000 and less than or equal to 3,000;
from about 1 to about 99 percent by weight of total composition of water;
Wherein (1) the composition comprises a single liquid phase combined solution at a temperature below 5° C. which may be defined as determined by the number of particles per mL of the composition wherein the number of particles per mL of the composition is less than 10, or 20, or 30, or 40, or 50, or 60, or 70, or 80, or 90, or 100, or 110, or 120, or 130, or 140, or 150, or 160, or 170, or 180, or 190, or 200, or 250, or 300, or 350, or 400, or 450, or 500, or 550, or 600 or a combination thereof as measured by a laser particle counting method at a temperature below 5° C.; and (2) enthalpy of liquid-liquid phase transition is greater than 5 kJ per kg as measured by a Mettler Toledo RC1 calorimeter.

A liquid-liquid phase transition process comprising:
  forming a composition comprising a glycol polymer and water;
  phase transitioning the composition at or above the composition's cloud point temperature to form at least two liquid phases;
  wherein a first liquid phase of said at least two liquid phases comprises greater than 50 wt % water;
  wherein a second liquid phase of said at least two liquid phases comprises a glycol polymer; and
  wherein (1) the second liquid phase comprising a glycol polymer has a density greater than the density of the liquid phase comprising mostly water according to a 'Mettler Toledo Excellence Density Meter'; and
  (2) enthalpy of liquid-liquid phase transition is greater than 5 kJ per kg as measured by a Mettler Toledo RC1 calorimeter.

A liquid-liquid phase transition process comprising:
  forming a composition comprising a glycol polymer and water;
  phase transitioning the composition at or above the composition's cloud point temperature to form at least two liquid phases;
  wherein a first liquid phase of said at least two liquid phases comprises greater than 50 wt % water;
  wherein a second liquid phase of said at least two liquid phases comprises a glycol polymer; and
  wherein (1) the second liquid phase comprising a glycol polymer has a density less than the density of a liquid comprising greater than or equal to 95 wt %, or 96 wt %, or 97 wt %, or 98 wt %, or 99 wt %, or 100% the glycol polymer at the same temperature; and
  (2) enthalpy of liquid-liquid phase transition is greater than 5 kJ per kg as measured by a Mettler Toledo RC1 calorimeter.

A liquid-liquid phase transition process comprising:
  forming a composition comprising a glycol polymer and water;
  phase transitioning the composition at or above the composition's cloud point temperature to form at least two liquid phases;
  wherein a first liquid phase of said at least two liquid phases comprises greater than 50 wt % water;
  wherein a second liquid phase of said at least two liquid phases comprises a glycol polymer; and
  wherein (1) the second liquid phase comprising a glycol polymer has a density less than the density of a liquid comprising greater than or equal to 95 wt %, or 96 wt %, or 97 wt %, or 98 wt %, or 99 wt % glycol polymer at 20° C.; and
  (2) enthalpy of liquid-liquid phase transition is greater than 5 kJ per kg as measured by a Mettler Toledo RC1 calorimeter.

A liquid-liquid phase transition process comprising:
  forming a composition comprising a glycol polymer and water;
  phase transitioning the composition at or above the composition's cloud point temperature to form at least two liquid phases;
  wherein a first liquid phase of said at least two liquid phases comprises greater than 50 wt % water;
  wherein a second liquid phase of said at least two liquid phases comprises a glycol polymer; and
  wherein (1) the second liquid phase comprising a glycol polymer has a density greater than the density of a liquid comprising greater than or equal to 95 wt %, or 96 wt %, or 97 wt %, or 98 wt %, or 99 wt % glycol polymer at the same temperature; and
  (2) enthalpy of liquid-liquid phase transition is greater than 5 kJ per kg as measured by a Mettler Toledo RC1 calorimeter.

A liquid-liquid phase transition process comprising:
  forming a composition comprising a glycol polymer and water;
  phase transitioning the composition at or above the composition's cloud point temperature to form at least two liquid phases;
  wherein a first liquid phase of said at least two liquid phases comprises greater than 50 wt % water;
  wherein a second liquid phase of said at least two liquid phases comprises a glycol polymer; and
  wherein (1) the second liquid phase comprising a glycol polymer has a density greater than the density of a liquid comprising greater than or equal to 95 wt %, or 96 wt %, or 97 wt %, or 98 wt %, or 99 wt %, or 100% glycol polymer at 20° C.; and
  (2) enthalpy of liquid-liquid phase transition is greater than 5 kJ per kg as measured by a Mettler Toledo RC1 calorimeter.

A composition wherein:
  (1) an organic reagent possesses a cloud point temperature in water in the absence of glycol polymer; and
  (2) an glycol polymer possesses a cloud point temperature in water in the absence of the organic reagent
  And/or A composition wherein '(1)' and '(2)' are different temperatures A composition wherein organic reagent and the glycol polymer exhibit a combined cloud point A composition wherein:
  (1) glycol polymer possesses a cloud point temperature in water in the absence of the organic reagent
  (2) composition possesses a combined cloud point
  (3) wherein the temperature of '(1)' is different from the temperature of '(2)' by greater than +/−0.1° K, or +/−0.2° K, or +/−0.3° K, +/−0.4° K, +/−0.5° K, +/−0.6° K, +/−0.7° K, +/−0.8° K, +/−0.9° K, +/−1° K, or +/−1.5° K, or +/−2° K, or +/−2.5° K, or +/−3° K, or +/−3.5° K, or +/−4° K, or +/−4.5° K, or +/−5° K, or +/−5.5° K, or +/−6° K, or +/−6.5° K, or +/−7° K, or +/−7.5° K, or +/−8° K, or +/−8.5° K, or +/−9° K, or +/−9.5° K, or +/−10° K A composition wherein:
  (1) organic reagent possesses a cloud point temperature in water in the absence of the organic reagent
  (2) composition possesses a combined cloud point
  (3) wherein the temperature of '(1)' is different from the temperature of '(2)' by greater than +/−0.1° K, or +/−0.2° K, or +/−0.3° K, +/−0.4° K, +/−0.5° K, +/−0.6° K, +/−0.7° K, +/−0.8° K, +/−0.9° K, +/−1° K, or +/−1.5° K, or +/−2° K, or +/−2.5° K, or +/−3° K, or +/−3.5° K, or +/−4° K, or +/−4.5° K, or +/−5°

K, or +/−5.5° K, or +/−6° K, or +/−6.5° K, or +/−7° K, or +/−7.5° K, or +/−8° K, or +/−8.5° K, or +/−9° K, or +/−9.5° K, or +/−10° K

A composition wherein:
- (1) organic reagent possesses a cloud point temperature in water in the absence of glycol polymer; and
- (2) glycol polymer possesses a cloud point temperature in water in the absence of the organic reagent
- (3) the composition possesses a combined cloud point
- (4) the temperature of '(3)' is different than the temperature of '(1)', or '(2)', or both Wherein organic reagent is insoluble in water in the absence of glycol polymer or possesses a solubility less than 10 g/L at a temperature Example Exemplary Embodiment A cooling process comprising:
A refrigeration cycle and a liquid-liquid phase transition heat transfer liquid
Wherein said refrigeration cycle cools said liquid-liquid phase transition heat transfer liquid
Wherein said cooling comprises cooling said liquid-liquid phase transition heat transfer liquid from a 'return temperature' to a 'supply temperature'
Wherein said 'supply temperature' is less than said 'return temperature'
Wherein there is a temperature difference between said 'supply temperature' and said 'return temperature'
Wherein the heat transferred per kg of heat transfer liquid to cool said liquid-liquid phase transition liquid from said 'return temperature' to said 'supply temperature' is at least 1.3 times greater than if said heat transfer liquid is water A cooling process comprising:
A refrigeration cycle and a liquid-liquid phase transition heat transfer liquid
Wherein said refrigeration cycle cools said liquid-liquid phase transition heat transfer liquid
Wherein said cooling comprises cooling said liquid-liquid phase transition heat transfer liquid from a 'return temperature' to a 'supply temperature'
Wherein said 'supply temperature' is less than said 'return temperature'
Wherein there is a temperature difference between said 'supply temperature' and said 'return temperature'
Wherein the heat transferred per kg of heat transfer liquid to cool said liquid-liquid phase transition liquid from said 'return temperature' to said 'supply temperature' is at least 30% greater than if said heat transfer liquid is water A heating process comprising:
A refrigeration cycle and a liquid-liquid phase transition heat transfer liquid
Wherein said refrigeration cycle heats said liquid-liquid phase transition heat transfer liquid
Wherein said heating comprises heating said liquid-liquid phase transition heat transfer liquid from a 'return temperature' to a 'supply temperature'
Wherein said 'supply temperature' is greater than said 'return temperature'
Wherein there is a temperature difference between said 'supply temperature' and said 'return temperature'
Wherein the heat transferred per kg of heat transfer liquid to heat said liquid-liquid phase transition liquid from said 'return temperature' to said 'supply temperature' is at least 1.3 times greater than if said heat transfer liquid is water A heating process comprising:
A refrigeration cycle and a liquid-liquid phase transition heat transfer liquid
Wherein said refrigeration cycle heats said liquid-liquid phase transition heat transfer liquid
Wherein said heating comprises heating said liquid-liquid phase transition heat transfer liquid from a 'return temperature' to a 'supply temperature'
Wherein said 'supply temperature' is greater than said 'return temperature'
Wherein there is a temperature difference between said 'supply temperature' and said 'return temperature'
Wherein the heat transferred per kg of heat transfer liquid to heat said liquid-liquid phase transition liquid from said 'return temperature' to said 'supply temperature' is at least 30% greater than if said heat transfer liquid is water Example Exemplary Embodiment A liquid-liquid phase transition composition comprising:
A two or more reagent solution
Wherein said solution possesses a peak enthalpy of phase transition at a different temperature than the initial cloud point temperature Initial cloud point temperature may involve the temperature which a solution undergoes an increase in particle count in response to temperature change.

A liquid-liquid phase transition composition comprising:
A two or more reagent solution
Wherein said solution possesses a peak enthalpy of phase transition at a different temperature than the cloud point temperature A liquid-liquid phase transition solution comprising:
A two or more reagent solution
Wherein at least one reagent comprises water
And further comprising one or more other reagents
Wherein said solution possesses a peak enthalpy of phase transition at a different temperature than the initial cloud point temperature A liquid-liquid phase transition solution comprising:
A two or more reagent solution
Wherein said solution possesses a peak enthalpy of phase transition at a different temperature than the initial cloud point temperature
Wherein said solution may comprise a multi-liquid phase solution below said peak enthalpy of phase transition temperature and a multi-liquid phase solution above said peak enthalpy of phase transition temperature A liquid-liquid phase transition solution comprising:
Two or more liquid phases
Wherein said two or more liquid phases liquid-liquid phase transition into two or more different liquid phases
Wherein said phase transition possesses an enthalpy of phase transition A liquid-liquid phase transition solution comprising:
Two or more liquid phases
Wherein said two or more liquid phases liquid-liquid phase transition into two or more different liquid phases
Wherein said phase transition possesses an enthalpy of phase transition greater than 5 kJ per kg of solution A liquid-liquid phase transition comprising:
A liquid-liquid phase transition solution which exhibits a liquid-liquid phase transition in a temperature range, Wherein said liquid-liquid phase transition absorbs or releases heat or exhibits an enthalpy of phase transition, Wherein at least 90% of the said heat absorbed or heat released or enthalpy of phase transition occurs when the liquid-liquid phase transitioning solution is phase transitioning from a multi-liquid phase solution into another multi-liquid phase solution A liquid-liquid phase transition comprising:

A liquid-liquid phase transition solution which exhibits a liquid-liquid phase transition in a temperature range, Wherein said liquid-liquid phase transition exhibits an enthalpy of phase transition, Wherein at least 90% of the said enthalpy of phase transition occurs when the liquid-liquid phase transitioning solution is phase transitioning from a multi-liquid phase solution into a different multi-liquid phase solution A liquid-liquid phase transition comprising:

A liquid-liquid phase transition solution which exhibits a liquid-liquid phase transition in a temperature range, Wherein said liquid-liquid phase transition exhibits an enthalpy of phase transition, Wherein at least 90% of the said enthalpy of phase transition occurs when the liquid-liquid phase transitioning solution is phase transitioning from a multi-liquid phase solution into a different multi-liquid phase solution A liquid-liquid phase transition comprising:

A liquid-liquid phase transition solution which exhibits a liquid-liquid phase transition in a temperature range, Wherein said liquid-liquid phase transition exhibits an enthalpy of phase transition, Wherein at least 80% of the said enthalpy of phase transition occurs when the liquid-liquid phase transitioning solution is phase transitioning from a multi-liquid phase solution into a different multi-liquid phase solution A liquid-liquid phase transition comprising:

A liquid-liquid phase transition solution which exhibits a liquid-liquid phase transition in a temperature range, Wherein said liquid-liquid phase transition exhibits an enthalpy of phase transition, Wherein at least 70% of the said enthalpy of phase transition occurs when the liquid-liquid phase transitioning solution is phase transitioning from a multi-liquid phase solution into a different multi-liquid phase solution A liquid-liquid phase transition comprising:

A liquid-liquid phase transition solution which exhibits a liquid-liquid phase transition in a temperature range, Wherein said liquid-liquid phase transition exhibits an enthalpy of phase transition, Wherein at least 60% of the said enthalpy of phase transition occurs when the liquid-liquid phase transitioning solution is phase transitioning from a multi-liquid phase solution into a different multi-liquid phase solution A liquid-liquid phase transition comprising:

A liquid-liquid phase transition solution which exhibits a liquid-liquid phase transition in a temperature range, Wherein said liquid-liquid phase transition exhibits an enthalpy of phase transition, Wherein at least 50% of the said enthalpy of phase transition occurs when the liquid-liquid phase transitioning solution is phase transitioning from a multi-liquid phase solution into a different multi-liquid phase solution A liquid-liquid phase transition comprising:

A liquid-liquid phase transition solution which exhibits a liquid-liquid phase transition in a temperature range, Wherein said liquid-liquid phase transition exhibits an enthalpy of phase transition, Wherein at least 40% of the said enthalpy of phase transition occurs when the liquid-liquid phase transitioning solution is phase transitioning from a multi-liquid phase solution into a different multi-liquid phase solution A liquid-liquid phase transition comprising:

A liquid-liquid phase transition solution which exhibits a liquid-liquid phase transition in a temperature range, Wherein said liquid-liquid phase transition exhibits an enthalpy of phase transition, Wherein at least 30% of the said enthalpy of phase transition occurs when the liquid-liquid phase transitioning solution is phase transitioning from a multi-liquid phase solution into a different multi-liquid phase solution A liquid-liquid phase transition comprising:

A liquid-liquid phase transition solution which exhibits a liquid-liquid phase transition in a temperature range, Wherein said liquid-liquid phase transition exhibits an enthalpy of phase transition, Wherein at least 20% of the said enthalpy of phase transition occurs when the liquid-liquid phase transitioning solution is phase transitioning from a multi-liquid phase solution into a different multi-liquid phase solution A liquid-liquid phase transition comprising:

A liquid-liquid phase transition solution which exhibits a liquid-liquid phase transition in a temperature range, Wherein said liquid-liquid phase transition exhibits an enthalpy of phase transition, Wherein at least 10% of the said enthalpy of phase transition occurs when the liquid-liquid phase transitioning solution is phase transitioning from a multi-liquid phase solution into a different multi-liquid phase solution A liquid-liquid phase transition wherein:

A liquid phase transition from a solution containing one or more liquid phases to a solution containing one or more different liquid phases Wherein said phase transition possess an effective specific heat capacity of greater than 4.5 J/g° C. over a temperature range of 10° K A liquid-liquid phase transition wherein:

A liquid phase transition from a solution containing one or more liquid phases to a solution containing one or more different liquid phases Wherein said phase transition possess an effective specific heat capacity of greater than 5 J/g° C. over a temperature range of 10° K A liquid-liquid phase transition wherein:

A liquid phase transition from a solution containing one or more liquid phases to a solution containing one or more different liquid phases Wherein said phase transition possess an effective specific heat capacity of greater than 5 J/g° C. over a temperature range of 8° K A liquid-liquid phase transition wherein:

A liquid phase transition from a solution containing one or more liquid phases to a solution containing one or more different liquid phases Wherein said phase transition possess an effective specific heat capacity of greater than 5.5 J/g° C. over a temperature range of 10° K A liquid-liquid phase transition wherein:
A liquid phase transition from a solution containing one or more liquid phases to a solution containing one or more different liquid phases
Wherein said phase transition possess an effective specific heat capacity of greater than 5.8 J/g° C. over a temperature range of 10° K A liquid-liquid phase transition wherein:
A liquid phase transition from a solution containing one or more liquid phases to a solution containing one or more different liquid phases
Wherein said phase transition possess an effective specific heat capacity of greater than 6 J/g° C. over a temperature range of 10° K A liquid-liquid phase transition wherein:
A liquid phase transition from a solution containing one or more liquid phases to a solution containing one or more different liquid phases
Wherein said phase transition possess an effective specific heat capacity of greater than 6 J/g° C. over a temperature range of 5° K A liquid-liquid phase transition wherein:
A liquid phase transition from a solution containing one or more liquid phases to a solution containing one or more different liquid phases
Wherein said phase transition possess an effective specific heat capacity of greater than 5 J/g° C. over a temperature range of 5° K A liquid-liquid phase transition wherein:
A liquid phase transition from a solution containing one or more liquid phases to a solution containing one or more different liquid phases
Wherein said phase transition possess an effective specific heat capacity of greater than J/g° C. over a temperature range of ° K Example Exemplary Embodiment 1

A liquid-liquid phase transition composition comprising:
A glycol ether solvent; and
Polypropylene glycol, polyethylene glycol, PEG-PPG-PEG, PEG-PEG-PPG, PPG-PEG-PEG, PPG-PPG-PEG, PPG-PEG-PPG, PPG-PPG-PEG, a polymer with blocks of PEG and PPG, a polymer with PEG and at least one ether group, a polymer with PPG and at least one ether group, or a combination thereof; and
Water
Wherein the enthalpy of phase transition is greater than 30% greater than the heat capacity of water over at least a 3° K temperature range Example Exemplary Embodiment 2

A liquid-liquid phase transition wherein:
A liquid phase transition from a solution containing one or more liquid phases to a solution containing one or more different liquid phases
Wherein said phase transition possess an enthalpy of phase transition which occurs over a temperature range greater than 2° K
Wherein said phase transition occurs at least over a temperature range of 8-10° C., 9-11° C.

1. A liquid-liquid phase transition process comprising:
   forming a composition comprising a glycol polymer and water;
   phase transitioning the composition at or above the composition's cloud point temperature to form at least two liquid phases;
   wherein a first liquid phase of said at least two liquid phases comprises greater than 50 wt % water;
   wherein a second liquid phase of said at least two liquid phases comprises a glycol polymer; and
   wherein (1) the second liquid phase comprising a glycol polymer has a density less than the density of the liquid phase comprising greater than 50 wt % water according to ASTM D1122; and
   (2) enthalpy of liquid-liquid phase transition is greater than 5 kJ per kg as measured by a mixing calorimeter.
2. The process of example embodiment 1 wherein the glycol polymer comprises a polypropylene glycol.
3. The process of example embodiment 1 wherein the glycol polymer comprises a polyethylene glycol.
4. The process of example embodiment 1 wherein the glycol polymer comprises a block co-polymer.
5. The process of example embodiment 4 wherein the block co-polymer is selected from PEG-Ran-PG, or PPG-PEG-PPG, or PPG-PEG-PPG, or PEG-PPG-PEG, or PEG-PPG-PEG, or PEG-PPG-PEG, or PEG-PPG-PEG, or any combination thereof.
6. The process of example embodiment 1 wherein the glycol polymer has an average molecular number greater than or equal to 1,000 and less than or equal to 3,000.
7. The process of example embodiment 1 wherein the second phase comprising a glycol polymer further comprises a glycol ether.
8. The process of example embodiment 7 wherein said glycol ether is selected from an akylene glycol alkyl ether, a dialkylene glycol alkyl ether, a trialkylene glycol alkyl ether, an alkylene glycol dialkyl, or any combination thereof wherein alkyl is a C1-C6 alkyl.
9. The process of example embodiment 7 wherein the cloud point comprises a combined cloud point.
10. A glycol polymer composition comprising:
    from about 1 to about 80 percent by weight of total composition of at least one glycol polymer having a number average molecular weight of less than or equal to 3,000;
    from about 1 to about 99 percent by weight of total composition of water;
    wherein the composition comprises a cloud point temperature above which a liquid phase comprising glycol polymer forms due to a liquid-liquid phase transition and wherein (1) density of the formed liquid phase is less than 1 gram per mL; and
    (2) enthalpy of liquid-liquid phase transition is greater than 5 kJ per kg as measured by a mixing calorimeter. 11. The composition of example embodiment 10 further comprising from about 0.25 to about 30 percent by weight of total composition of an organic reagent with a density less than 1 g/mL at 10° C.
12. The composition of example embodiment 11 wherein (1) said organic reagent possesses a cloud point temperature in water in the absence of glycol polymer; and (2) said glycol polymer possesses a cloud point temperature in water in the absence of the organic reagent.
13. The composition of example embodiment 12 wherein (1) and (2) are different temperatures.

14. The composition of example embodiment 11 wherein said organic reagent and the glycol polymer exhibit a combined cloud point.
15. The composition of example embodiment 11 wherein (1) said glycol polymer possesses a cloud point temperature in water in the absence of the organic reagent; (2) said composition possesses a combined cloud point; and (3) wherein the temperature of '(1)' is different from the temperature of '(2)' by greater than +/−0.3 deg K.
16. The composition of example embodiment 11 wherein: (1) said organic reagent possesses a cloud point temperature in water in the absence of glycol polymer; (2) said glycol polymer possesses a cloud point temperature in water in the absence of the organic reagent; (3) said composition possesses a combined cloud point; and (4) wherein the temperature of '(3)' is different than the temperature of '(1)', or '(2)', or both.
17. A glycol polymer composition comprising:
from about 1 to about 80 percent by weight of total composition of at least one polypropylene glycol having a number average molecular weight greater than or equal to 2,000 and less than or equal to 3,000;
from about 1 to about 99 percent by weight of total composition of water;
wherein (1) the composition comprises a single liquid phase combined solution at a temperature below 5° C. which may be defined as determined by the number of particles per mL of the composition wherein the number of particles per mL of the composition is less than 150 as measured by laser particle counting at a temperature below 5° C.; and
(2) enthalpy of liquid-liquid phase transition is greater than 5 kJ per kg as measured by a mixing calorimeter.
18. The composition of example embodiment 17 further comprising from about 0.5 to about 50 percent by weight of a glycol ether.
19. A liquid-liquid phase transition process comprising:
forming a composition comprising a glycol polymer with an average molecular number greater than or equal to 1000 and water; and
phase transitioning the composition into at least two liquid phases;
wherein a first liquid phase of said at least two liquid phases comprises greater than 50 wt % water;
wherein a second liquid phase of said at least two liquid phases comprises the glycol polymer with an average molecular number greater than or equal to 1000;
wherein the second liquid phase comprising the glycol polymer has a dynamic viscosity less than 100 cP at 25° C. wherein viscosity is measured on the second liquid phase as a non-contiguous separate phase with a viscometer; and
wherein the enthalpy of liquid-liquid phase transition is greater than 5 kJ per kg of composition as measured by a mixing calorimeter.
20. The process of example embodiment 19 wherein the second liquid phase further comprises a density reducing reagent.
21. The process of example embodiment 19 wherein the second liquid phase further comprises a density enhancing reagent.
22. The process of example embodiment 19 wherein the second liquid phase further comprises a viscosity reducing reagent.
23. The process of example embodiment 19 wherein the second liquid phase further comprises a glycol ether.
24. The process of example embodiment 23 wherein the glycol ether and the glycol polymer have a combined cloud point.
25. The process of example embodiment 19 wherein the glycol polymer comprises at least 50 wt. % of the second liquid phase based on the total weight of the second phase.
26. The process of example embodiment 19 wherein the glycol polymer comprises at least 80 wt. % of the second liquid phase based on the total weight of the second phase.
27. The process of example embodiment 19 wherein the second liquid phase comprises less than 20 wt. % water phase based on the total weight of the second phase.
28. The process of example embodiment 19 wherein the cloud point temperature of the composition is greater than 25° C.
29. The process of example embodiment 19 wherein the cloud point temperature of the composition is less than 25° C.
1. A liquid-liquid phase transition process comprising:
forming a composition comprising a glycol polymer and water;
phase transitioning the composition at or above the composition's cloud point temperature to form at least two liquid phases wherein enthalpy of liquid-liquid phase transition is greater than 5 kJ per kg as measured by a calorimeter;
wherein a first liquid phase of said at least two liquid phases comprises greater than 50 wt. % water; and
wherein a second liquid phase of said at least two liquid phases comprises a glycol polymer and wherein:
(1) the second liquid phase comprising a glycol polymer has a density less than the density of the liquid phase comprising greater than 50 wt % water according to ASTM D1122; or
(2) wherein the second liquid phase comprising the glycol polymer has a viscosity less than 100 cP at 25° C. wherein viscosity is measured on the second liquid phase as a non-contiguous separate phase with a viscometer; or
(3) both (1) and (2).
2. The process of example embodiment 1 wherein the glycol polymer has an average molecular number greater than or equal to 1000 and less than or equal to 3,000.
3. The process of example embodiment 1 or example embodiment 2 wherein the glycol polymer comprises a polypropylene glycol.
4. The process of example embodiment 1 or example embodiment 2 wherein the glycol polymer comprises a polyethylene glycol.
5. The process of example embodiment 1 or example embodiment 2 wherein the glycol polymer comprises a block co-polymer selected from PEG-Ran-PG, or PPG-PEG-PPG, or PPG-PEG-PPG, or PEG-PPG-PEG, or PEG-PPG-PEG, or PEG-PPG-PEG, or PEG-PPG-PEG, or any combination thereof
6. The process of example embodiment 1 or example embodiment 2 wherein the second liquid phase comprising a glycol polymer further comprises a glycol ether selected from an akylene glycol alkyl ether, a dialkylene glycol alkyl ether, a trialkylene glycol alkyl ether, an alkylene glycol dialkyl, or any combination thereof wherein alkyl is a C1-C6 alkyl.

7. The process of example embodiment 1 or example embodiment 2 wherein the temperature of phase transitioning comprises a combined cloud point.
8. The process of example embodiment 1 or example embodiment 2 wherein the second liquid phase further comprises a density reducing reagent, a density enhancing reagent, a viscosity reducing reagent, or any combination thereof
9. The process of example embodiment 1 or example embodiment 2 wherein the glycol polymer comprises at least 80 wt. % of the second liquid phase phase based on the total weight of the second phase and wherein the second liquid phase comprises less than 20 wt. % water phase based on the total weight of the second phase.
10. A glycol polymer composition comprising:
   from about 1 to about 80 percent by weight of total composition of at least one glycol polymer having a number average molecular weight of less than or equal to 3,000;
   from about 1 to about 99 percent by weight of total composition of water;
   wherein the composition comprises a cloud point temperature above which a liquid phase comprising glycol polymer forms due to a liquid-liquid phase transition and wherein (1) density of the formed liquid phase is less than 1 gram per mL; and
(2) enthalpy of liquid-liquid phase transition is greater than 5 kJ per kg as measured by a calorimeter.
11. The composition of example embodiment 10 wherein the glycol polymer has a number average molecular weight greater than or equal to 1000.
12. The composition of example embodiment 10 or example embodiment 11 further comprising from about 0.25 to about 30 percent by weight of total composition of an organic reagent with a density less than 1 g/mL at 10° C. and wherein (1) said organic reagent possesses a cloud point temperature in water in the absence of glycol polymer; (2) said glycol polymer possesses a cloud point temperature in water in the absence of the organic reagent; and wherein (1) and (2) are different temperatures by greater than +/−0.3 deg K.
13. The composition of example embodiment 10 or 11 wherein said organic reagent and the glycol polymer exhibit a combined cloud point.
14. The composition of example embodiment 10 or example embodiment 11 further comprising from about 0.5 to about 50 percent by weight of a glycol ether selected from an akylene glycol alkyl ether, a dialkylene glycol alkyl ether, a trialkylene glycol alkyl ether, an alkylene glycol dialkyl, or any combination thereof wherein alkyl is a C1-C6 alkyl.
15. The composition of example embodiment 10 or example embodiment 11 wherein the glycol polymer comprises a block co-polymer selected from PEG-Ran-PG, or PPG-PEG-PPG, or PPG-PEG-PPG, or PEG-PPG-PEG, or PEG-PPG-PEG, or PEG-PPG-PEG, or PEG-PPG-PEG, or any combination thereof.

Notes

Note: Enthalpy of phase transition may be driven by the enthalpy of hydration or dehydration at one or more or a combination of liquid-liquid phase transition temperature ranges. One potentially useful indicator or characteristic of large enthalpy of phase transition reagents may include, but is not limited to, a low water concentration in the non-water reagent(s) or organic(s) which may separate or phase separate following or during a liquid-liquid phase transition. For example, low water concentration in a mostly non-water reagent liquid phase may include, but is not limited to, one or more or a combination of the following: or less than 70 wt % $H_2O$, or less than 65 wt % $H_2O$, less than 60 wt % $H_2O$, or less than 55 wt % $H_2O$, or less than 50 wt % $H_2O$, or less than 45 wt % $H_2O$, or less than 40 wt % $H_2O$, or less than 35 wt % $H_2O$, or less than 30 wt % $H_2O$, or less than 25 wt % $H_2O$, or less than 20 wt % $H_2O$, or less than 15 wt % $H_2O$, or less than 10 wt % $H_2O$, or less than 5 wt % $H_2O$.

Note: A 'different multi-liquid' phase solution may comprise a multi-liquid phase solution with liquid phases comprising different ratios of reagents than another liquid-liquid phase transition solution. The overall composition of the overall multi-liquid phase solutions being compared, when the amount of reagents in all liquid phases are taken into account, may be the same. However, the concentration or distribution or ratio of reagents or level of hydration or morphology or a combination thereof of the reagents in each of the constituent liquid phases may be different.

Note: The effective specific heat capacity of the liquid-liquid phase transitioning solutions introduced herein may be greater than or less than or equal to, including, but not limited to, one or more or a combination of the following: 3.5 J/g° C., 3.6 J/g° C., 3.7 J/g° C., 3.8 J/g° C., 3.9 J/g° C., 4.0 J/g° C., 4.1 J/g° C., 4.2 J/g° C., 4.3 J/g° C., 4.4 J/g° C., 4.5 J/g° C., 4.6 J/g° C., 4.7 J/g° C., 4.8 J/g° C., 4.9 J/g° C., 5.0 J/g° C., 5.1 J/g° C., 5.2 J/g° C., 5.3 J/g° C., 5.4 J/g° C., 5.5 J/g° C., 5.6 J/g° C., 5.7 J/g° C., 5.8 J/g° C., 5.9 J/g° C., 6.0 J/g° C., 6.1 J/g° C., 6.2 J/g° C., 6.3 J/g° C., 6.4 J/g° C., 6.5 J/g° C., 6.6 J/g° C., 6.7 J/g° C., 6.8 J/g° C., 6.9 J/g° C., 7.0 J/g° C., 7.1 J/g° C., 7.2 J/g° C., 7.3 J/g° C., 7.4 J/g° C., 7.5 J/g° C., 7.6 J/g° C., 7.7 J/g° C., 7.8 J/g° C., 7.9 J/g° C., 8.0 J/g° C., 8.1 J/g° C., 8.2 J/g° C., 8.3 J/g° C., 8.4 J/g° C., 8.5 J/g° C., 8.6 J/g° C., 8.7 J/g° C., 8.8 J/g° C., 8.9 J/g° C., 9.0 J/g° C., 9.1 J/g° C., 9.2 J/g° C., 9.3 J/g° C., 9.4 J/g° C., 9.5 J/g° C., 9.6 J/g° C., 9.7 J/g° C., 9.8 J/g° C., 9.9 J/g° C., 10 J/g° C., 10.5 J/g° C., 11 J/g° C., 11.5 J/g° C., 12 J/g° C., 12.5 J/g° C., 13 J/g° C., 13.5 J/g° C., 14 J/g° C., 14.5 J/g° C., 15 J/g° C., 16 J/g° C., 17 J/g° C., 18 J/g° C., 19 J/g° C., 20 J/g° C., 25 J/g° C., 30 J/g° C., 35 J/g° C., 40 J/g° C., 45 J/g° C., 50 J/g° C., 55 J/g° C., 60 J/g° C., 65 J/g° C., 70 J/g° C., 75 J/g° C., 80 J/g° C., 85 J/g° C., 90 J/g° C., 95 J/g° C., 100 J/g° C., 150 J/g° C., 200 J/g° C.

Note: The effective specific heat capacity of a liquid-liquid phase transitioning solution may be greater than or equal to the specific heat capacity of water over a temperature range or temperature difference of greater than or less than or equal to, including, but not limited to, one or more or a combination of the following: 0.5° K, 1° K, 1.5° K, 2° K, 3° K, 3.5° K, 4° K, 4.5° K, 5° K, 5.5° K, 6° K, 6.5° K, 7° K, 7.5° K, 8° K, 8.5° K, 9° K, 9.5° K, 10° K, 10.5° K, 11° K, 11.5° K 12° K, 13° K, 14° K, 15° K, 16° K, 17° K, 18° K, 19° K, 20° K, 25° K, 30° K, 35° K, 40° K, 45° K, 50° K Note: The effective specific heat capacity of a liquid-liquid phase transitioning solution may be greater than or equal to the baseline specific heat capacity of the solution over a temperature range or temperature difference of greater than or less than or equal to, including, but not limited to, one or more or a combination of the following: 0.5° K, 1° K, 1.5° K, 2° K, 3° K, 3.5° K, 4° K, 4.5° K, 5° K, 5.5° K, 6° K, 6.5° K, 7° K, 7.5° K, 8° K, 8.5° K, 9° K, 9.5° K, 10° K, 10.5° K, 11° K, 11.5°

K 12° K, 13° K, 14° K ° K, 15° K ° K, 16° K ° K, 17° K ° K, 18° K ° K, 19° K ° K, 20° K ° K, 25° K ° K, 30° K ° K, 35° K ° K, 40° K ° K, 45° K, 50° K

Note: The effective specific heat capacity of a liquid-liquid phase transitioning solution may be greater than or equal to a specific heat capacity of 3.5 J/g° C., 3.6 J/g° C., 3.7 J/g° C., 3.8 J/g° C., or 3.9 J/g° C., or 4.0 J/g° C., or 4.1 J/g° C., or 4.2 J/g° C., or 4.3 J/g° C., or 4.4 J/g° C., or 4.5 J/g° C., or 4.6 J/g° C., or 4.7 J/g° C., or 4.8 J/g° C., or 4.9 J/g° C., or 5.0 J/g° C., or 5.1 J/g° C., or 5.2 J/g° C., or 5.3 J/g° C., or 5.4 J/g° C., or 5.5 J/g° C., or 5.6 J/g° C., or 5.7 J/g° C., or 5.8 J/g° C., or 5.9 J/g° C., or 6.0 J/g° C., or 6.1 J/g° C., or 6.2 J/g° C., or 6.3 J/g° C., or 6.4 J/g° C., or 6.5 J/g° C., or 6.6 J/g° C., or 6.7 J/g° C., or 6.8 J/g° C., or 6.9 J/g° C., or 7.0 J/g° C., or 7.1 J/g° C., or 7.2 J/g° C., or 7.3 J/g° C., or 7.4 J/g° C., or 7.5 J/g° C., or 7.6 J/g° C., or 7.7 J/g° C., or 7.8 J/g° C., or 7.9 J/g° C., or 8.0 J/g° C. over a temperature range or temperature difference of greater than or less than or equal to, including, but not limited to, one or more or a combination of the following: 0.5° K, or 1° K, or 1.5° K, or 2° K, or 3° K, or 3.5° K, or 4° K, or 4.5° K, or 5° K, or 5.5° K, or 6° K, or 6.5° K, or 7° K, or 7.5° K, or 8° K, or 8.5° K, or 9° K, or 9.5° K, or 10° K, or 10.5° K, or 11° K, or 11.5° K or 12° K, or 13° K, or 14° K, or 15° K, or 16° K, or 17° K, or 18° K, or 19° K, or 20° K, or 25° K, or 30° K, or 35° K, or 40° K, or 45° K, or 50° K Note: Liquid-liquid phase transition facilitator reagents or salting-out reagents may include, but are not limited to, salts, or inorganics, or organics, or other reagents which may improve one or more or a combination of properties which enable or facilitate liquid-liquid phase transition. Said properties may include, but are not limited to, liquid-liquid phase transition temperature range, liquid-liquid phase transition temperature, composition of the constituent liquid phases, water concentration in mostly non-water liquid phase, residual non-water reagent concentration in mostly water liquid phase, enthalpy of liquid-liquid phase transition, toxicity, volatility, flammability, cost, corrosion inhibitors, degradation inhibitors, antiscalants, anti-foulants, anti-biofoulants, oxygen scavengers, pH buffers, density, hydrophobicity, hydrophilicity, surface tension, self-attraction forces, repelling forces, coalescing properties, viscosity, or a combination thereof.

Note: Liquid-liquid phase separation facilitator reagents may include, but are not limited to, salts, or inorganics, or organics, or other reagents which may improve one or more or a combination of properties which enable or facilitate liquid-liquid phase separation. Said properties may include, but are not limited to, density, hydrophobicity, hydrophilicity, surface tension, self-attraction forces, repelling forces, coalescing properties, viscosity, or a combination thereof.

Note: Favorable Properties for Liquid-Liquid Phase Transition may include, but are not limited to, one or more or a combination of the following properties: liquid-liquid phase transition temperature range, liquid-liquid phase transition temperature, composition of the constituent liquid phases, water concentration in mostly non-water liquid phase, residual non-water reagent concentration in mostly water liquid phase, enthalpy of liquid-liquid phase transition, toxicity, volatility, flammability, cost, corrosion inhibitors, degradation inhibitors, antiscalants, anti-foulants, anti-biofoulants, oxygen scavengers, pH buffers, density, hydrophobicity, hydrophilicity, surface tension, self-attraction forces, repelling forces, coalescing properties, viscosity, density, density difference between liquid phases, hydrophobicity, hydrophilicity, surface tension, self-attraction forces, repelling forces, coalescing properties, viscosity, or a combination thereof.

Note: Liquid-liquid phase transition facilitator reagents or liquid-liquid phase transition separation facilitator reagents or salting-out reagents or phase transition temperature adjustment reagents may include, but are not limited to, salts, or inorganics, or organics, or other reagents which may improve one or more or a combination of properties which enable or facilitate liquid-liquid phase transition. Said properties may include, but are not limited to, liquid-liquid phase transition temperature range, liquid-liquid phase transition temperature, composition of the constituent liquid phases, water concentration in mostly non-water liquid phase, residual non-water reagent concentration in mostly water liquid phase, enthalpy of liquid-liquid phase transition, toxicity, volatility, flammability, cost, corrosion inhibitors, degradation inhibitors, antiscalants, anti-foulants, anti-biofoulants, oxygen scavengers, pH buffers, density, hydrophobicity, hydrophilicity, surface tension, self-attraction forces, repelling forces, coalescing properties, viscosity, or a combination thereof.

Note: Liquid-liquid phase separation facilitator reagents or liquid-liquid phase transition facilitator reagents or salting-out reagents or phase transition temperature adjustment reagents may include, but are not limited to, salts, or inorganics, or organics, or other reagents which may improve one or more or a combination of properties which enable or facilitate liquid-liquid phase separation. Said properties may include, but are not limited to, density, hydrophobicity, hydrophilicity, surface tension, self-attraction forces, repelling forces, coalescing properties, viscosity, or a combination thereof Note: Dextrose, maltodextrin, water soluble sugars, and many water-soluble sugar substitutes have been found to be effective alternatives to salts or supplements to salts for liquid-liquid phase transition temperature adjustment or 'salting-out'.

Note: LCST: May involve a liquid composition which undergoes an exothermic phase transition when transforming from two liquid phases to a single liquid phase and an endothermic phase transition when transforming from a single liquid phase to two liquid phases.

Note: UCST: May involve a liquid composition which undergoes an exothermic phase transition when transforming from a single liquid phase to two liquid phases and an endothermic phase transition when transforming from two liquid phases to a single liquid phase.

Note: 'Salting-Out' Reagent: May comprise a salt or an organic or a combination thereof. May also be described as phase transition temperature adjustment reagent.

Example desirable properties of salts may include, but are not limited to, one or more or a combination of the following:

Capability to reduce phase transition temperature or salt out an organic composition with minimal salt concentration or osmotic pressure.

Insoluble or minimally soluble or only partial solubility or a combination thereof in an organic liquid phase Ratio of phase transition temperature adjustment relative to salt concentration or osmotic pressure of salt in solution Enthalpy of phase transition of a composition when a liquid-liquid phase transition is driven by 'salting out' or phase transition temperature adjustment Concentration of residual organic reagents in aqueous liquid phase after 'salting out' and/or liquid-liquid phase transition Chemical compatibility with other reagents and/or materials and/or equipment in the process Example desirable properties of organics employed for liquid-liquid phase transition adjustment, as a supplement to or an alternative to salts, may include, but are not limited to:

Capability to reduce phase transition temperature or salt out an organic composition with minimal 'salting-out' reagent or phase transition temperature adjustment reagent concentration or osmotic pressure.

Insoluble or minimally soluble or only partial solubility or a combination thereof in a mostly organic liquid phase Ratio of phase transition temperature adjustment relative to 'salting-out' reagent or phase transition temperature adjustment reagent concentration or osmotic pressure of 'salting-out' reagent or phase transition temperature adjustment reagent concentration in solution Enthalpy of phase transition of a composition when a liquid-liquid phase transition is driven by 'salting out' or phase transition temperature adjustment using said 'salting-out reagent' or phase transition temperature adjustment reagent Concentration of residual organic reagents in aqueous liquid phase after 'salting out' and/or liquid-liquid phase transition Chemical compatibility with other reagents and/or materials and/or equipment in the process Note: If sugar or other biologically digestible reagents are employed, it may be important to introduce biocides to prevent biofouling or biological degradation. For example, biocides may include, but are not limited to, biocides known in the art for liquid phase applications. For example, biocides may include, but are not limited to, one or more or a combination of the following: chlorine or bromine or enzymes or chlorate, or bleach, or ammonia, or hydrogen sulfide, or carbon dioxide or oxygen scavenger, or salt, or acid, or base, or a combination thereof.

Note: Organic reagents may include, but are not limited to, one or more or a combination of the following:

Glycol ethers

Glycol ether polymers may include, but are not limited to, one or more or a combination of the following:
Polyethylene Glycol Dimethyl Ether
Polyethylene Glycol Monomethyl Ether Glycol Polymers
Polypropylene Glycol
Polyethylene Glycol
Polymers Combining PEG and PPG
PEG-PPG-PEG
PPG-PEG-PPG
'Rand' Polymers Polyol polymers Ionic Liquids Reagents with a liquid-liquid phase transition in water Reagents with a liquid-liquid phase transition in a solvent Ethers, glycol ethers, esters, alcohols, aldehydes, 2-Butoxyethanol, Propylene Glycol Propyl Ether, dipropylene glycol butyl ether, tripropylene glycol butyl ether, Dipropylene, Glycol Dimethyl Ether, Propylene Glycol Diacetate, Propylene Glycol Phenyl Ether, Tripropylene Glycol n-Butyl Ether, Dipropylene Glycol n-Butyl Ether, Propylene Glycol n-Butyl, Ether, Dipropylene Glycol n-Propyl Ether, Propylene Glycol n-Propyl Ether, Dipropylene Glycol Methyl Ether Acetate, Propylene Glycol Methyl Ether Acetate, Tripropylene Glycol Methyl Ether, Dipropylene Glycol Methyl Ether, Propylene Glycol Methyl Ether, Ethylene glycol, diacetate, Ethylene glycol n-butyl ether, diethylene glycol n-butyl ether, triethylene glycol mono n-butyl ether, diethylene glycol methyl ether, triethylene glycol mono methyl ether, ethylene glycol phenyl ether, propylene carbonate, ethylene carbonate, dimethyl carbonate, diethylene glycol hexyl ether Note: Organic reagents may include, but are not limited to, one or more or a combination of the following: polyglycols, or polyethers, or poly(alkylene oxides), or propylene glycol, or ethylene glycol, or polymers, or glycols, or ionic liquids, or polyethylene glycol ethers, or polypropylene glycol ethers, or glycol ethers, or polyols, or ethers, or propylene carbonate, or ethylene carbonate, Ethylene glycol monomethyl ether (2-methoxyethanol, $CH_3OCH_2CH_2OH$), or Ethylene glycol monoethyl ether (2-ethoxyethanol, $CH_3CH_2OCH_2CH_2OH$), or Ethylene glycol monopropyl ether (2-propoxyethanol, $CH_3CH_2CH_2OCH_2CH_2OH$), or Ethylene glycol monoisopropyl ether (2-isopropoxyethanol, $(CH_3)_2CHOCH_2CH_2OH$), or Ethylene glycol monobutyl ether (2-butoxyethanol, $CH_3CH_2CH_2CH_2OCH_2CH_2OH$), or Ethylene glycol monophenyl ether (2-phenoxyethanol, $C_6H_5OCH_2CH_2OH$), or Ethylene glycol monobenzyl ether (2-benzyloxyethanol, $C_6H_5CH_2OCH_2CH_2OH$), Propylene glycol methyl ether, (1-methoxy-2-propanol, $CH_3OCH_2CH(OH)CH_3$), or Diethylene glycol monomethyl ether (2-(2-methoxyethoxy)ethanol, methyl carbitol, $CH_3OCH_2CH_2OCH_2CH_2OH$), or Diethylene glycol monoethyl ether (2-(2-ethoxyethoxy)ethanol, carbitol cellosolve, or $CH_3CH_2OCH_2CH_2OCH_2CH_2OH$) Diethylene glycol mono-n-butyl ether (2-(2-butoxyethoxy)ethanol, butyl carbitol, $CH_3CH_2CH_2CH_2OCH_2CH_2OCH_2CH_2OH$), or Dipropyleneglycol methyl ether C12-15 pareth-12, or Ethylene glycol dimethyl ether (dimethoxyethane, $CH_3OCH_2CH_2OCH_3$), or Ethylene glycol diethyl ether (diethoxyethane, $CH_3CH_2OCH_2CH_2OCH_2CH_3$), or Ethylene glycol dibutyl ether (dibutoxyethane, $CH_3CH_2CH_2CH_2OCH_2CH_2OCH_2CH_2CH_2CH_3$), or Ethylene glycol methyl ether acetate (2-methoxyethyl acetate, $CH_3OCH_2CH_2OCOCH_3$), or Ethylene glycol monoethyl ether acetate (2-ethoxyethyl acetate, $CH_3CH_2OCH_2CH_2OCOCH_3$), or Ethylene glycol monobutyl ether acetate (2-butoxyethyl acetate, $CH_3CH_2CH_2CH_2OCH_2CH_2OCOCH_3$), or Propylene glycol methyl ether acetate (1-methoxy-2-propanol acetate), or Ethylene glycol polymer-bound, or Poly (ethylene glycol) bis(3-methylsulfinyl)propionate, polymer-bound, or Poly(propylene glycol), or tolylene 2,4-diisocyanate terminated, or Dimethyl ether CH3—O—CH3, or Diethyl ether CH3CH2-O—CH2CH3, or Tetrahydrofuran O(CH2)4, or Dioxane O(C2H4)20, or fluorocarbon compounds, or halogenated carbon compounds, or diethylene glycol hexyl ether, ethylene glycol, propylene glycol, glycerol, diethyl carbonate, dimethyl carbonate, propylene glycol propyl ether, diethylene glycol hexyl ether, or 2-butoxyethanol, or propylene glycol propyl ether, or diethylene glycol diethyl ether, or diethylene glycol dimethyl ether, or dipropylene glycol butyl ether, or tripropylene glycol butyl ether, or dipropylene glycol n-propyl ether, or propylene glycol butyl ether, or dipropylene glycol dimethyl ether, akylene glycol alkyl ether, dialkylene glycol alkyl ether, trialkylene glycol alkyl ether, alkylene glycol dialkyl ethers. 2,2,4-Trimethyl-1,3-Pentanediol Monoisobutyrate, or 3-Ethoxypropionic Acid Ethyl Ester, or Alkylphenol Polyether, or Branched Secondary Alcohol Polyether, or Diethylene Glycol Ether, or Diethylene Glycol Ethyl Ether, or Diethylene Glycol Hexyl Ether, or Diethylene Glycol Mono Butyl Ether, or Diethylene Glycol Mono Ethyl Ether, or Diethylene Glycol Mono Hexyl Ether, or Diethylene Glycol Mono Methyl Ether, or Diethylene Glycol Mono N-Butyl Ether, or Diethylene Glycol Mono N-Butyl Ether Acetate, or Diethylene Glycol N-Butyl Ether, or Diethylene Glycol N-Butyl Ether Acetate, or Diethylene Glycol Phenyl Ether, or Diisobutyl Ketone, or Dioctyl Sulfosuccinate, or Dipropylene Glycol Dimethyl Ether, or Dipropylene Glycol Methyl Ether, or Dipropylene Glycol Methyl Ether Acetate, or Dipropylene Glycol Mono Methyl Ether, or Dipropylene Glycol Mono Methyl Ether Acetate, or Dipropylene Glycol Mono N-Butyl Ether, or Dipropylene Glycol Mono Propyl Ether, or Dipropylene Glycol N-Butyl Ether, or Dipropylene Glycol N-Propyl Ether, or Dipropylene Glycol Phenyl Ether, or Eo/Po Block Polyether, or Ethylene Glychol Mono Phenyl Ether, or Ethylene Glycol Hexyl Ether, or Ethylene Glycol Isopropyl Ether, or Ethylene Glycol Mono Butyl Ether, or Ethylene Glycol Mono Ethyl Ether, or Ethylene Glycol Mono Hexyl Ether, or Ethylene Glycol Mono Methyl Ether, or Ethylene Glycol Mono N-Butyl Ether, or Ethylene Glycol Mono N-Butyl Ether Acetate, or Ethylene Glycol Mono Propyl Ether, or Ethylene Glycol N-Butyl Ether, or Ethylene Glycol N-Butyl Ether Acetate, or Ethylene Glycol Phenyl Ether, or Ethylene Glycol Propyl Ether, or Glycol Ether Coalescent, or Heptaoxyethylene Dodecyl Ether, or Mono And Di Ethylene Glycol Phenyl Ether, or Natural Plant Oil Polyether, or N-Butyl Propionate, or N-Pentyl Propionate, or Poly(Oxy-1,2-Ethanediyl), Alpha-Phenyl-Omega-Hydroxy, or Propylene Glycol Diacetate, or Propylene Glycol Methyl Ether, or Propylene Glycol Methyl Ether Acetate, or Propylene Glycol Mono Methyl Ether, or Propylene Glycol Mono Methyl Ether Acetate, or Propylene Glycol Mono N-Butyl Ether, or Propylene Glycol Mono N-Propyl Ether, or Propylene Glycol Mono Propyl Ether, or Propylene Glycol N-Butyl Ether, or Propylene Glycol N-Propyl Ether, or Propylene Glycol Phenyl Ether, or Tri Ethylene Glycol Mono Butyl Ether, or Tripropylene Glycol Methyl Ether, or Tripropylene Glycol Mono Methyl Ether, or Tripropylene Glycol Mono N-Butyl Ether Note: Alkyl may comprise C1-6, or C1-C7, or C1-C8, or C1-C9, or C1-C10, or C1-C5, C1-C4, or C1-C11

Note: The particle count per mL of a composition below a cloud point temperature may be less than or greater than or equal to one or more or a combination of the following: 0, or 10, or 20, or 30, or 40, or 50, or 60, or 70, or 80, or 90, or 100, or 125, or 150, or 175, or 200, or 225, or 250, or 275, or 300, or 325, or 350, or 375, or 400, or 425, or 450, or 475, or 500, or 525, or 550, or 575, or 600, or 625, or 650, or 675, or 700, or 725, or 750, or 775, or 800, or 825, or 850, or 875, or 900, or 925, or 950, or 975, or 1000, or 1025, or 1050, or 1075, or 1100, or 1125, or 1150, or 1175, or 1200, or 1225, or 1250, or 1275, or 1300, or 1325, or 1350, or 1375, or 1400, or 1425, or 1450, or 1475, or 1500, or 1525, or 1550, or 1575, or 1600, or 1625, or 1650, or 1675, or 1700, or 1725, or 1750, or 1775, or 1800, or 1825, or 1850, or 1875, or 1900, or 1925, or 1950, or 1975, or 2000, or 2025, or 2050, or 2075, or 2100, or 2125, or 2150, or 2175, or 2200, or 2225, or 2250, or 2275, or 2300, or 2325, or 2350, or 2375, or 2400, or 2425, or 2450, or 2475, or 2500, or 2525, or 2550, or 2575, or 2600, or 2625, or 2650, or 2675, or 2700, or 2725, or 2750, or 2775, or 2800, or 2825, or 2850, or 2875, or 2900, or 2925, or 2950, or 2975, or 3000

Note: The particle count per mL of a single liquid phase composition in a turbulent flow may be less than or equal to one or more or a combination of the following: 0, or 10, or 20, or 30, or 40, or 50, or 60, or 70, or 80, or 90, or 100, or 125, or 150, or 175, or 200, or 225, or 250, or 275, or 300, or 325, or 350, or 375, or 400, or 425, or 450, or 475, or 500, or 525, or 550, or 575, or 600, or 625, or 650, or 675, or 700, or 725, or 750, or 775, or 800, or 825, or 850, or 875, or 900, or 925, or 950, or 975, or 1000, or 1025, or 1050, or 1075, or 1100, or 1125, or 1150, or 1175, or 1200, or 1225, or 1250, or 1275, or 1300, or 1325, or 1350, or 1375, or 1400, or 1425, or 1450, or 1475, or 1500, or 1525, or 1550, or 1575, or 1600, or 1625, or 1650, or 1675, or 1700, or 1725, or 1750, or 1775, or 1800, or 1825, or 1850, or 1875, or 1900, or 1925, or 1950, or 1975, or 2000, or 2025, or 2050, or 2075, or 2100, or 2125, or 2150, or 2175, or 2200, or 2225, or 2250, or 2275, or 2300, or 2325, or 2350, or 2375, or 2400, or 2425, or 2450, or 2475, or 2500, or 2525, or 2550, or 2575, or 2600, or 2625, or 2650, or 2675, or 2700, or 2725, or 2750, or 2775, or 2800, or 2825, or 2850, or 2875, or 2900, or 2925, or 2950, or 2975, or 3000

Note: The particle count per mL of a multi-liquid phase composition in a turbulent flow may be greater than or equal to one or more or a combination of the following: 0, or 10, or 20, or 30, or 40, or 50, or 60, or 70, or 80, or 90, or 100, or 125, or 150, or 175, or 200, or 225, or 250, or 275, or 300, or 325, or 350, or 375, or 400, or 425, or 450, or 475, or 500, or 525, or 550, or 575, or 600, or 625, or 650, or 675, or 700, or 725, or 750, or 775, or 800, or 825, or 850, or 875, or 900, or 925, or 950, or 975, or 1000, or 1025, or 1050, or 1075, or 1100, or 1125, or 1150, or 1175, or 1200, or 1225, or 1250, or 1275, or 1300, or 1325, or 1350, or 1375, or 1400, or 1425, or 1450, or 1475, or 1500, or 1525, or 1550, or 1575, or 1600, or 1625, or 1650, or 1675, or 1700, or 1725, or 1750, or 1775, or 1800, or 1825, or 1850, or 1875, or 1900, or 1925, or 1950, or 1975, or 2000, or 2025, or 2050, or 2075, or 2100, or 2125, or 2150, or 2175, or 2200, or 2225, or 2250, or 2275, or 2300, or 2325, or 2350, or 2375, or 2400, or 2425, or 2450, or 2475, or 2500, or 2525, or 2550, or 2575, or 2600, or 2625, or 2650, or 2675, or 2700, or 2725, or 2750, or 2775, or 2800, or 2825, or 2850, or 2875, or 2900, or 2925, or 2950, or 2975, or 3000

Note: The particle count per mL of a composition above a cloud point temperature may be less than or greater than or equal to one or more or a combination of the following: 100, or 125, or 150, or 175, or 200, or 225, or 250, or 275, or 300, or 325, or 350, or 375, or 400, or 425, or 450, or 475, or 500, or 525, or 550, or 575, or 600, or 625, or 650, or 675, or 700, or 725, or 750, or 775, or 800, or 825, or 850, or 875, or 900, or 925, or 950, or 975, or 1000, or 1025, or 1050, or 1075, or 1100, or 1125, or 1150, or 1175, or 1200, or 1225, or 1250, or 1275, or 1300, or 1325, or 1350, or 1375, or 1400, or 1425, or 1450, or 1475, or 1500, or 1525, or 1550, or 1575, or 1600, or 1625, or 1650, or 1675, or 1700, or 1725, or 1750, or 1775, or 1800, or 1825, or 1850, or 1875, or 1900, or 1925, or 1950, or 1975, or 2000, or 2025, or 2050, or 2075, or 2100, or 2125, or 2150, or 2175, or 2200, or 2225, or 2250, or 2275, or 2300, or 2325, or 2350, or 2375, or 2400, or 2425, or 2450, or 2475, or 2500, or 2525, or 2550, or 2575, or 2600, or 2625, or 2650, or 2675, or 2700, or 2725, or 2750, or 2775, or 2800, or 2825, or 2850, or 2875, or 2900, or 2925, or 2950, or 2975, or 3000

Note: The average molecular weight of one or more polymers may be less than or equal to or greater than or equal to, including, but not limited to, one or more or a combination of the following: 100, or 125, or 150, or 175, or 200, or 225, or 250, or 275, or 300, or 325, or 350, or 375, or 400, or 425, or 450, or 475, or 500, or 525, or 550, or 575, or 600, or 625, or 650, or 675, or 700, or 725, or 750, or 775, or 800, or 825, or 850, or 875, or 900, or 925, or 950, or 975, or 1000, or 1025, or 1050, or 1075, or 1100, or 1125, or 1150, or 1175, or 1200, or 1225, or 1250, or 1275, or 1300, or 1325, or 1350, or 1375, or 1400, or 1425, or 1450, or 1475, or 1500, or 1525, or 1550, or 1575, or 1600, or 1625, or 1650, or 1675, or 1700, or 1725, or 1750, or 1775, or 1800, or 1825, or 1850, or 1875, or 1900, or 1925, or 1950, or 1975, or 2000, or 2025, or 2050, or 2075, or 2100, or 2125, or 2150, or 2175, or 2200, or 2225, or 2250, or 2275, or 2300, or 2325, or 2350, or 2375, or 2400, or 2425, or 2450, or 2475, or 2500, or 2525, or 2550, or 2575, or 2600, or 2625, or 2650, or 2675, or 2700, or 2725, or 2750, or 2775, or 2800, or 2825, or 2850, or 2875, or 2900, or 2925, or 2950, or 2975, or 3000, or 3025, or 3050, or 3075, or 3100, or 3125, or 3150, or 3175, or 3200, or 3225, or 3250, or 3275, or 3300, or 3325, or 3350, or 3375, or 3400, or 3425, or 3450, or 3475, or 3500, or 3525, or 3550, or 3575, or 3600, or 3625, or 3650, or 3675, or 3700, or 3725, or 3750, or 3775, or 3800, or 3825, or 3850, or 3875, or 3900, or 3925, or 3950, or 3975, or 4000, or 4025, or 4050, or 4075, or 4100, or 4125, or 4150, or 4175, or 4200, or 4225, or 4250, or 4275, or 4300, or 4325, or 4350, or 4375, or 4400, or 4425, or 4450, or 4475, or 4500, or 4525, or 4550, or 4575, or 4600, or 4625, or 4650, or 4675, or 4700, or 4725, or 4750, or 4775, or 4800, or 4825, or 4850, or 4875, or 4900, or 4925, or 4950, or 4975, or 5000, or 5025, or 5050, or 5075, or 5100, or 5125, or 5150, or 5175, or 5200, or 5225, or 5250, or 5275, or 5300, or 5325, or 5350, or 5375, or 5400, or 5425, or 5450, or 5475, or 5500, or 5525, or 5550, or 5575, or 5600, or 5625, or 5650, or 5675, or 5700, or 5725, or 5750, or 5775, or 5800, or 5825, or 5850, or 5875, or 5900, or 5925, or 5950, or 5975, or 6000, or 6025, or 6050, or 6075, or 6100, or 6125, or 6150, or 6175, or 6200, or 6225, or 6250, or 6275, or 6300, or 6325, or 6350, or 6375, or 6400, or 6425, or 6450, or 6475, or 6500, or 6525, or 6550, or 6575, or 6600, or 6625, or 6650, or 6675, or 6700, or 6725, or 6750, or 6775, or 6800, or 6825, or 6850, or 6875, or 6900, or 6925, or 6950, or 6975, or 7000, or 7025, or 7050, or 7075, or 7100, or 7125, or 7150, or 7175, or 7200, or 7225, or 7250, or 7275, or 7300, or 7325, or 7350, or 7375, or 7400, or 7425, or 7450, or 7475, or 7500, or 7525, or 7550, or 7575, or 7600, or 7625, or 7650, or 7675, or 7700, or 7725, or 7750, or 7775, or 7800, or 7825, or 7850, or 7875, or 7900, or 7925, or 7950, or 7975, or 8000, or 8025, or 8050, or 8075, or 8100, or 8125, or 8150, or 8175, or 8200, or 8225, or 8250, or 8275, or 8300, or 8325, or 8350, or 8375, or 8400, or 8425, or 8450, or 8475, or 8500, or 8525, or 8550, or 8575, or 8600, or 8625, or 8650, or 8675, or 8700, or 8725, or 8750, or 8775, or 8800, or 8825, or 8850, or 8875, or 8900, or 8925, or 8950, or 8975, or 9000, or 9025, or 9050, or 9075, or 9100, or 9125, or 9150, or 9175, or 9200, or 9225, or 9250, or 9275, or 9300, or 9325, or 9350, or 9375, or 9400, or 9425, or 9450, or 9475, or 9500, or 9525, or 9550, or 9575, or 9600, or 9625, or 9650, or 9675, or 9700, or 9725, or 9750, or 9775, or 9800, or 9825, or 9850, or 9875, or 9900, or 9925, or 9950, or 9975, or 10000, or 15000, or 20000, or 25000, or 30000, or 35000, or 40000, or 45000, or 50000, or 55000, or 60000, or 65000, or 70000, or 75000, or 80000, or 85000, or 90000, or 95000, or 100000

Note: The average molecular weight of one or more reagents may be less than or equal to or greater than or equal to, including, but not limited to, one or more or a combination of the following: 10, or 15, or 20, or 25, or 30, or 35, or 40, or 45, or 50, or 55, or 60, or 65, or 70, or 75, or 80, or 85, or 90, or 95, or 100, or 125, or 150, or 175, or 200, or 225, or 250, or 275, or 300, or 325, or 350, or 375, or 400, or 425, or 450, or 475, or 500, or 525, or 550, or 575, or 600, or 625, or 650, or 675, or 700, or 725, or 750, or 775, or 800, or 825, or 850, or 875, or 900, or 925, or 950, or 975, or 1000, or 1025, or 1050, or 1075, or 1100, or 1125, or 1150, or 1175, or 1200, or 1225, or 1250, or 1275, or 1300, or 1325, or 1350, or 1375, or 1400, or 1425, or 1450, or 1475, or 1500, or 1525, or 1550, or 1575, or 1600, or 1625, or 1650, or 1675, or 1700, or 1725, or 1750, or 1775, or 1800, or 1825, or 1850, or 1875, or 1900, or 1925, or 1950, or 1975, or 2000, or 2025, or 2050, or 2075, or 2100, or 2125, or 2150, or 2175, or 2200, or 2225, or 2250, or 2275, or 2300, or 2325, or 2350, or 2375, or 2400, or 2425, or 2450, or 2475, or 2500, or 2525, or 2550, or 2575, or 2600, or 2625, or 2650, or 2675, or 2700, or 2725, or 2750, or 2775, or 2800, or 2825, or 2850, or 2875, or 2900, or 2925, or 2950, or 2975, or 3000, or 3025, or 3050, or 3075, or 3100, or 3125, or 3150, or 3175, or 3200, or 3225, or 3250, or 3275, or 3300, or 3325, or 3350, or 3375, or 3400, or 3425, or 3450, or 3475, or 3500, or 3525, or 3550, or 3575, or 3600, or 3625, or 3650, or 3675, or 3700, or 3725, or 3750, or 3775, or 3800, or 3825, or 3850, or 3875, or 3900, or 3925, or 3950, or 3975, or 4000, or 4025, or 4050, or 4075, or 4100, or 4125, or 4150, or 4175, or 4200, or 4225, or 4250, or 4275, or 4300, or 4325, or 4350, or 4375, or 4400, or 4425, or 4450, or 4475, or 4500, or 4525, or 4550, or 4575, or 4600, or 4625, or 4650, or 4675, or 4700, or 4725, or 4750, or 4775, or 4800, or 4825, or 4850, or 4875, or 4900, or 4925, or 4950, or 4975, or 5000, or 5025, or 5050, or 5075, or 5100, or 5125, or 5150, or 5175, or 5200, or 5225, or 5250, or 5275, or 5300, or 5325, or 5350, or 5375, or 5400, or 5425, or 5450, or 5475, or 5500, or 5525, or 5550, or 5575, or 5600, or 5625, or 5650, or 5675, or 5700, or 5725, or 5750, or 5775, or 5800, or 5825, or 5850, or 5875, or 5900, or 5925, or 5950, or 5975, or 6000, or 6025, or 6050, or 6075, or 6100, or 6125, or 6150, or 6175, or 6200, or 6225, or 6250, or 6275, or 6300, or 6325, or 6350, or 6375, or 6400, or 6425, or 6450, or 6475, or 6500, or 6525, or 6550, or 6575, or 6600, or 6625, or 6650, or 6675, or 6700, or 6725, or 6750, or 6775, or 6800, or 6825, or 6850, or 6875, or 6900, or 6925, or 6950, or 6975, or 7000, or 7025, or 7050, or 7075, or 7100, or 7125, or 7150, or 7175, or 7200, or 7225, or 7250, or 7275, or 7300, or 7325, or 7350, or 7375, or 7400, or 7425, or 7450, or 7475, or 7500, or 7525, or 7550, or 7575, or 7600, or 7625, or 7650, or 7675, or 7700, or 7725, or 7750, or 7775, or 7800, or 7825, or 7850, or 7875, or 7900, or 7925, or 7950, or 7975, or 8000, or 8025, or 8050, or 8075, or 8100, or 8125, or 8150, or 8175, or 8200, or 8225, or 8250, or 8275, or 8300, or 8325, or 8350, or 8375, or 8400, or 8425, or 8450, or 8475, or 8500, or 8525, or 8550, or 8575, or 8600, or 8625, or 8650, or 8675, or 8700, or 8725, or 8750, or 8775, or 8800, or 8825, or 8850, or 8875, or 8900, or 8925, or 8950, or 8975, or 9000, or 9025, or 9050, or 9075, or 9100, or 9125, or 9150, or 9175, or 9200, or 9225, or 9250, or 9275, or 9300, or 9325, or 9350, or 9375, or 9400, or 9425, or 9450, or 9475, or 9500, or 9525, or 9550, or 9575, or 9600, or 9625, or 9650, or 9675, or 9700, or 9725, or 9750, or 9775, or 9800, or 9825, or 9850, or 9875, or 9900, or 9925, or 9950, or 9975, or 10000, or 15000, or 20000, or 25000, or 30000, or 35000, or 40000, or 45000, or 50000, or 55000, or 60000, or 65000, or 70000, or 75000, or 80000, or 85000, or 90000, or 95000, or 100000

Note: Organic liquid phase may comprise an ionic liquid

Note: One or more reagents may comprise an ionic liquid

Note: The weight percent concentration of one or more or a combination of reagents may include, but is not limited to, less than, or equal to, or greater than one or more or a combination of the following: 0%, or 0.5%, or 1%, or 1.5%, or 2%, or 2.5%, or 3%, or 3.5%, or 4%, or 4.5%, or 5%, or 5.5%, or 6%, or 6.5%, or 7%, or 7.5%, or 8%, or 8.5%, or 9%, or 9.5%, or 10%, or 10.5%, or 11%, or 11.5%, or 12%, or 12.5%, or 13%, or 13.5%, or 14%, or 14.5%, or 15%, or 15.5%, or 16%, or 16.5%, or 17%, or 17.5%, or 18%, or 18.5%, or 19%, or 19.5%, or 20%, or 20.5%, or 21%, or 21.5%, or 22%, or 22.5%, or 23%, or 23.5%, or 24%, or 24.5%, or 25%, or 25.5%, or 26%, or 26.5%, or 27%, or 27.5%, or 28%, or 28.5%, or 29%, or 29.5%, or 30%, or 30.5%, or 31%, or 31.5%, or 32%, or 32.5%, or 33%, or 33.5%, or 34%, or 34.5%, or 35%, or 35.5%, or 36%, or 36.5%, or 37%, or 37.5%, or 38%, or 38.5%, or 39%, or 39.5%, or 40%, or 40.5%, or 41%, or 41.5%, or 42%, or 42.5%, or 43%, or 43.5%, or 44%, or 44.5%, or 45%, or 45.5%, or 46%, or 46.5%, or 47%, or 47.5%, or 48%, or 48.5%, or 49%, or 49.5%, or 50%, or 50.5%, or 51%, or 51.5%, or 52%, or 52.5%, or 53%, or 53.5%, or 54%, or 54.5%, or 55%, or 55.5%, or 56%, or 56.5%, or 57%, or 57.5%, or 58%, or 58.5%, or 59%, or 59.5%, or 60%, or 60.5%, or 61%, or 61.5%, or 62%, or 62.5%, or 63%, or 63.5%, or 64%, or 64.5%, or 65%, or 65.5%, or 66%, or 66.5%, or 67%, or 67.5%, or 68%, or 68.5%, or 69%, or 69.5%, or 70%, or 70.5%, or 71%, or 71.5%, or 72%, or 72.5%, or 73%, or 73.5%, or 74%, or 74.5%, or 75%, or 75.5%, or 76%, or 76.5%, or 77%, or 77.5%, or 78%, or 78.5%, or 79%, or 79.5%, or 80%, or 80.5%, or 81%, or 81.5%, or 82%, or 82.5%, or 83%, or 83.5%, or 84%, or 84.5%, or 85%, or 85.5%, or 86%, or 86.5%, or 87%, or 87.5%, or 88%, or 88.5%, or 89%, or 89.5%, or 90%, or 90.5%, or 91%, or 91.5%, or 92%, or 92.5%, or 93%, or 93.5%, or 94%, or 94.5%, or 95%, or 95.5%, or 96%, or 96.5%, or 97%, or 97.5%, or 98%, or 98.5%, or 99%, or 99.5%, or 100%

Note: The weight percent solubility of one or more or a combination of reagents may include, but is not limited to, less than, or equal to, or greater than one or more or a combination of the following: 0%, or 0.5%, or 1%, or 1.5%, or 2%, or 2.5%, or 3%, or 3.5%, or 4%, or 4.5%, or 5%, or 5.5%, or 6%, or 6.5%, or 7%, or 7.5%, or 8%, or 8.5%, or 9%, or 9.5%, or 10%, or 10.5%, or 11%, or 11.5%, or 12%, or 12.5%, or 13%, or 13.5%, or 14%, or 14.5%, or 15%, or 15.5%, or 16%, or 16.5%, or 17%, or 17.5%, or 18%, or 18.5%, or 19%, or 19.5%, or 20%, or 20.5%, or 21%, or 21.5%, or 22%, or 22.5%, or 23%, or 23.5%, or 24%, or 24.5%, or 25%, or 25.5%, or 26%, or 26.5%, or 27%, or 27.5%, or 28%, or 28.5%, or 29%, or 29.5%, or 30%, or 30.5%, or 31%, or 31.5%, or 32%, or 32.5%, or 33%, or 33.5%, or 34%, or 34.5%, or 35%, or 35.5%, or 36%, or 36.5%, or 37%, or 37.5%, or 38%, or 38.5%, or 39%, or 39.5%, or 40%, or 40.5%, or 41%, or 41.5%, or 42%, or 42.5%, or 43%, or 43.5%, or 44%, or 44.5%, or 45%, or 45.5%, or 46%, or 46.5%, or 47%, or 47.5%, or 48%, or 48.5%, or 49%, or 49.5%, or 50%, or 50.5%, or 51%, or 51.5%, or 52%, or 52.5%, or 53%, or 53.5%, or 54%, or 54.5%, or 55%, or 55.5%, or 56%, or 56.5%, or 57%, or 57.5%, or 58%, or 58.5%, or 59%, or 59.5%, or 60%, or 60.5%, or 61%, or 61.5%, or 62%, or 62.5%, or 63%, or 63.5%, or 64%, or 64.5%, or 65%, or 65.5%, or 66%, or 66.5%, or 67%, or 67.5%, or 68%, or 68.5%, or 69%, or 69.5%, or 70%, or 70.5%, or 71%, or 71.5%, or 72%, or 72.5%, or 73%, or 73.5%, or 74%, or 74.5%, or 75%, or 75.5%, or 76%, or 76.5%, or 77%, or 77.5%, or 78%, or 78.5%, or 79%, or 79.5%, or 80%, or 80.5%, or 81%, or 81.5%, or 82%, or 82.5%, or 83%, or 83.5%, or 84%, or 84.5%, or 85%, or 85.5%, or 86%, or 86.5%, or 87%, or 87.5%, or 88%, or 88.5%, or 89%, or 89.5%, or 90%, or 90.5%, or 91%, or 91.5%, or 92%, or 92.5%, or 93%, or 93.5%, or 94%, or 94.5%, or 95%, or 95.5%, or 96%, or 96.5%, or 97%, or 97.5%, or 98%, or 98.5%, or 99%, or 99.5%, or 100%

The weight percent concentration of water may include, but is not limited to, less than, or equal to, or greater than one or more or a combination of the following: 0%, or 0.5%, or 1%, or 1.5%, or 2%, or 2.5%, or 3%, or 3.5%, or 4%, or 4.5%, or 5%, or 5.5%, or 6%, or 6.5%, or 7%, or 7.5%, or 8%, or 8.5%, or 9%, or 9.5%, or 10%, or 10.5%, or 11%, or 11.5%, or 12%, or 12.5%, or 13%, or 13.5%, or 14%, or 14.5%, or 15%, or 15.5%, or 16%, or 16.5%, or 17%, or 17.5%, or 18%, or 18.5%, or 19%, or 19.5%, or 20%, or 20.5%, or 21%, or 21.5%, or 22%, or 22.5%, or 23%, or 23.5%, or 24%, or 24.5%, or 25%, or 25.5%, or 26%, or 26.5%, or 27%, or 27.5%, or 28%, or 28.5%, or 29%, or 29.5%, or 30%, or 30.5%, or 31%, or 31.5%, or 32%, or 32.5%, or 33%, or 33.5%, or 34%, or 34.5%, or 35%, or 35.5%, or 36%, or 36.5%, or 37%, or 37.5%, or 38%, or 38.5%, or 39%, or 39.5%, or 40%, or 40.5%, or 41%, or 41.5%, or 42%, or 42.5%, or 43%, or 43.5%, or 44%, or 44.5%, or 45%, or 45.5%, or 46%, or 46.5%, or 47%, or 47.5%, or 48%, or 48.5%, or 49%, or 49.5%, or 50%, or 50.5%, or 51%, or 51.5%, or 52%, or 52.5%, or 53%, or 53.5%, or 54%, or 54.5%, or 55%, or 55.5%, or 56%, or 56.5%, or 57%, or 57.5%, or 58%, or 58.5%, or 59%, or 59.5%, or 60%, or 60.5%, or 61%, or 61.5%, or 62%, or 62.5%, or 63%, or 63.5%, or 64%, or 64.5%, or 65%, or 65.5%, or 66%, or 66.5%, or 67%, or 67.5%, or 68%, or 68.5%, or 69%, or 69.5%, or 70%, or 70.5%, or 71%, or 71.5%, or 72%, or 72.5%, or 73%, or 73.5%, or 74%, or 74.5%, or 75%, or 75.5%, or 76%, or 76.5%, or 77%, or 77.5%, or 78%, or 78.5%, or 79%, or 79.5%, or 80%, or 80.5%, or 81%, or 81.5%, or 82%, or 82.5%, or 83%, or 83.5%, or 84%, or 84.5%, or 85%, or 85.5%, or 86%, or 86.5%, or 87%, or 87.5%, or 88%, or 88.5%, or 89%, or 89.5%, or 90%, or 90.5%, or 91%, or 91.5%, or 92%, or 92.5%, or 93%, or 93.5%, or 94%, or 94.5%, or 95%, or 95.5%, or 96%, or 96.5%, or 97%, or 97.5%, or 98%, or 98.5%, or 99%, or 99.5%, or 100%

Note: Cloud point temperatures may be less than or equal to or greater than or equal to one or more or a combination of the following: −100° C., or −90° C., or −80° C., or −70° C., −60° C., or −50° C., or −45° C., or −40° C., or −35° C., or −30° C., or −25° C., or −20° C., or −19° C., or −18° C., or −17° C., or −16° C., or −15° C., or −15° C., or −14° C., or −13° C., −12° C., or −11° C., or −10° C., or −9° C., or −8° C., or −7° C., or −6° C., or −5° C., or −4° C., or −3° C. or −2° C., or −1° C., or 0° C., or 1° C., or 2° C., or 3° C., or 4° C., or 5° C., or 6° C., or 7° C., or 8° C., or 9° C., or 10° C., or 11° C., or 12° C., or 13° C., or 14° C., or 15° C., or 16° C., or 17° C., or 18° C., or 19° C., or 20° C., or 21° C., or 22° C., or 23° C., or 24° C., or 25° C., or 26° C., or 27° C., or 28° C., or 29° C., or 30° C., or 31° C., or 32° C., or 33° C., or 34° C., or 35° C., or 36° C., or 37° C., or 38° C., or 39° C., or 40° C., or 41° C., or 42° C., or 43° C., or 44° C., or 45° C., or 46° C., or 47° C., or 48° C., or 49° C., or 50° C., or 51° C., or 52° C., or 53° C., or 54° C., or 55° C., or 56° C., or 57° C., or 58° C., or 59° C., or 60° C., or 61° C., or 62° C., or 63° C., or 64° C., or 65° C., or 66° C., or 67° C., or 68° C., or 69° C., or 70° C., or 71° C., or 72° C., or 73° C., or 74° C., or 75° C., or 76° C., or 77° C., or 78° C., or 79° C., or 80° C., or 81° C., or 82° C., or 83° C., or 84° C., or 85° C., or 86° C., or 87° C., or 88, or 89° C., or 90° C., or 91° C., or 92° C., or 93° C., or 94° C., or 95° C., or 96° C., or 97° C., or 98° C., or 99° C., or 100° C., or 110° C., or 120° C., or 130° C., or 140° C., or 150° C., or 160° C., or 170° C., or 180° C., or 190° C., or 200° C., or 210° C., or 220° C., or 230° C., or 240° C., or 250° C., or 260° C., or 270° C., or 280° C., or 290° C., or 300° C., or 310° C., or 320° C., or 330° C., or 340° C., or 350° C., or 360° C., or 370° C., or 380° C., or 390° C., or 400° C., or 410° C., or 420° C., or 430° C., or 440° C., or 450° C., or 460° C., or 470° C., or 480° C., or 490° C., or 500° C., or 550° C., or 600° C., or 700° C., or 800° C., or 900° C., or 1000° C.

Note: Enthalpy of liquid-liquid phase transition temperature ranges, or peak enthalpy of liquid-liquid phase transition, or a combination thereof may be less than or equal to or greater than or equal to one or more or a combination of the following: −100° C., or −90° C., or −80° C., or −70° C., −60° C., or −50° C., or −45° C., or −40° C., or −35° C., or −30° C., or −25° C., or −20° C., or −19° C., or −18° C., or −17° C., or −16° C., or −15° C., or −15° C., or −14° C., or −13° C., −12° C., or −11° C., or −10° C., or −9° C., or −8° C., or −7° C., or −6° C., or −5° C., or −4° C., or −3° C. or −2° C., or −1° C., or 0° C., or 1° C., or 2° C., or 3° C., or 4° C., or 5° C., or 6° C., or 7° C., or 8° C., or 9° C., or 10° C., or 11° C., or 12° C., or 13° C., or 14° C., or 15° C., or 16° C., or 17° C., or 18° C., or 19° C., or 20° C., or 21° C., or 22° C., or 23° C., or 24° C., or 25° C., or 26° C., or 27° C., or 28° C., or 29° C., or 30° C., or 31° C., or 32° C., or 33° C., or 34° C., or 35° C., or 36° C., or 37° C., or 38° C., or 39° C., or 40° C., or 41° C., or 42° C., or 43° C., or 44° C., or 45° C., or 46° C., or 47° C., or 48° C., or 49° C., or 50° C., or 51° C., or 52° C., or 53° C., or 54° C., or 55° C., or 56° C., or 57° C., or 58° C., or 59° C., or 60° C., or 61° C., or 62° C., or 63° C., or 64° C., or 65° C., or 66° C., or 67° C., or 68° C., or 69° C., or 70° C., or 71° C., or 72° C., or 73° C., or 74° C., or 75° C., or 76° C., or 77° C., or 78° C., or 79° C., or 80° C., or 81° C., or 82° C., or 83° C., or 84° C., or 85° C., or 86° C., or 87° C., or 88, or 89° C., or 90° C., or 91° C., or 92° C., or 93° C., or 94° C., or 95° C., or 96° C., or 97° C., or 98° C., or 99° C., or 100° C., or 110° C., or 120° C., or 130° C., or 140° C., or 150° C., or 160° C., or 170° C., or 180° C., or 190° C., or 200° C., or 210° C., or 220° C., or 230° C., or 240° C., or 250° C., or 260° C., or 270° C., or 280° C., or 290° C., or 300° C., or 310° C., or 320° C., or 330° C., or 340° C., or 350° C., or 360° C., or 370° C., or 380° C., or 390° C., or 400° C., or 410° C., or 420° C., or 430° C., or 440° C., or 450° C., or 460° C., or 470° C., or 480° C., or 490° C., or 500° C., or 550° C., or 600° C., or 700° C., or 800° C., or 900° C., or 1000° C.

Note: The viscosity of a liquid phase may be less than, or greater than, or equal to, including, but not limited to, one or more or a combination of the following: 0.1 cP, or 0.5 cP, or 1 cP, or 1.5 cP, or 2 cP, or 2.5 cP, or 3 cP, or 3.5 cP, or 4 cP, or 4.5 cP, or 5 cP, or 5.5 cP, or 6 cP, or 6.5 cP, or 7 cP, or 7.5 cP, or 8 cP, or 8.5 cP, or 9 cP, or 9.5 cP, or 10 cP, or 11 cP, or 12 cP, or 13 cP, or 14 cP, or 15 cP, or 16 cP, or 17 cP, or 18 cP, or 19 cP, or 20 cP, or 21 cP, or 22 cP, or 23 cP, or 24 cP, or 25 cP, or 26 cP, or 27 cP, or 28 cP, or 29 cP, or 30 cP, or 31 cP, or 32 cP, or 33 cP, or 34 cP, or 35 cP, or 36 cP, or 37 cP, or 38 cP, or 39 cP, or 40 cP, or 41 cP, or 42 cP, or 43 cP, or 44 cP, or 45 cP, or 46 cP, or 47 cP, or 48 cP, or 49 cP, or 50 cP, or 55 cP, or 60 cP, or 65 cP, or 70 cP, or 75 cP, or 80 cP, or 85 cP, or 90 cP, or 95 cP, or 100 cP, or 105 cP, or 110 cP, or 115 cP, or 120 cP, or 125 cP, or 130 cP, or 135 cP, or 140 cP, or 145 cP, or 150 cP, or 155 cP, or 160 cP, or 165 cP, or 170 cP, or 175 cP, or 180 cP, or 185 cP, or 190 cP, or 195 cP, or 200 cP, or 205 cP, or 210 cP, or 215 cP, or 220 cP, or 225 cP, or 230 cP, or 235 cP, or 240 cP, or 245 cP, or 250 cP, or 255 cP, or 260 cP, or 265 cP, or 270 cP, or 275 cP, or 280 cP, or 285 cP, or 290 cP, or 295 cP, or 300 cP, or 305 cP, or 310 cP, or 315 cP, or 320 cP, or 325 cP, or 330 cP, or 335 cP, or 340 cP, or 345 cP, or 350 cP, or 355 cP, or 360 cP, or 365 cP, or 370 cP, or 375 cP, or 380 cP, or 385 cP, or 390 cP, or 395 cP, or 400 cP, or 405 cP, or 410 cP, or 415 cP, or 420 cP, or 425 cP, or 430 cP, or 435 cP, or 440 cP, or 445 cP, or 450 cP, or 455 cP, or 460 cP, or 465 cP, or 470 cP, or 475 cP, or 480 cP, or 485 cP, or 490 cP, or 495 cP, or 500 cP, or 550 cP, or 600 cP, or 650 cP, or 700 cP, or 750 cP, or 800 cP, or 850 cP, or 900 cP, or 950 cP, or 1,000 cP, or 1,250 cP, or 1,500 cP, or 1,750 cP, or 2,000 cP, or 2,250 cP, or 2,500 cP, or 2,750 cP, or 3,000 cP, or 3,250 cP, or 3,500 cP, or 3,750 cP, or 4,000 cP, or 4,250 cP, or 4,500 cP, or 4,750 cP, or 5,000 cP, or 5,250 cP, or 5,500 cP, or 5,750 cP, or 6,000 cP, or 6,250 cP, or 6,500 cP, or 6,750 cP, or 7,000 cP, or 7,250 cP, or 7,500 cP, or 7,750 cP, or 8000 cP, or 8,250 cP, or 8,500 cP, or 8,750 cP, or 9,000 cP, or 9,250 cP, or 9,500 cP, or 9,750 cP or 10,000 cP Note: Average molecular weight may be in grams per mole or molecular weights or molar masses Note: The density of a liquid phase may be less than or equal to or greater than or equal to one or more or a combination of the following: 0.5 g/mL, or 0.51 g/mL, or 0.52 g/mL, or 0.53 g/mL, or 0.54 g/mL, or 0.55 g/mL, or 0.56 g/mL, or 0.57 g/mL, or 0.58 g/mL, or 0.59 g/mL, or 0.6 g/mL, or 0.61 g/mL, or 0.62 g/mL, or 0.63 g/ml, 0.64 g/mL, or 0.65 g/mL, or 0.66 g/mL, or 0.67 g/mL, or 0.68 g/mL, or 0.69 g/mL, or 0.70 g/mL, or 0.71 g/mL, or 0.72 g/mL, or 0.73 g/mL, or 0.74 g/mL, or 0.75 g/mL, or 0.76 g/mL, or 0.77 g/mL, or 0.78 g/mL, or 0.79 g/mL, or 0.8 g/mL, or 0.805 g/mL, or 0.81 g/mL, or 0.815 g/mL, or 0.82 g/mL, or 0.825 g/mL, or 0.83 g/mL, or 0.835 g/mL, or 0.84 g/mL, or 0.845 g/mL, or 0.85 g/mL, or 0.855 g/mL, or 0.86 g/mL, or 0.865 g/mL, or 0.87 g/mL, or 0.875 g/mL, or 0.88 g/mL, or 0.885 g/mL, or 0.89 g/mL, or 0.895 g/mL, or 0.9 g/mL, or 0.905 g/mL, or 0.91 g/mL, or 0.915 g/mL, or 0.92 g/mL, or 0.925 g/mL, or 0.93 g/mL, or 0.935 g/mL, or 0.94 g/mL, or 0.945 g/mL, or 0.95 g/mL, or 0.955 g/mL, or 0.96 g/mL, or 0.965 g/mL, or 0.97 g/mL, or 0.975 g/mL, or 0.98 g/mL, or 0.985 g/mL, or 0.99 g/mL, or 0.995 g/mL, or 1 g/mL, or 1.005 g/mL, or 1.01 g/mL, or 1.015 g/mL, or 1.02 g/mL, or 1.025 g/mL, or 1.03 g/mL, or 1.035 g/mL, or 1.04 g/mL, or 1.045 g/mL, or 1.05 g/mL, or 1.055 g/mL, or 1.06 g/mL, or 1.065 g/mL, or 1.07 g/mL, or 1.075 g/mL, or 1.08 g/mL, or 1.085 g/mL, or 1.09 g/mL, or 1.095 g/mL, or 1.1 g/mL, or 1.11 g/mL, or 1.12 g/mL, or 1.13 g/mL, or 1.14 g/mL, or 1.15 g/mL, or 1.16 g/mL, or 1.17 g/mL, or 1.18 g/mL, or 1.19 g/mL, or 1.2 g/mL, or 1.21 g/mL, or 1.22 g/mL, or 1.23 g/mL, or 1.24 g/mL, or 1.25 g/mL, or 1.26 g/mL, or 1.27 g/mL, or 1.28 g/mL, or 1.29 g/mL, or 1.3 g/mL, or 1.31 g/mL, or 1.32 g/mL, or 1.33 g/mL, or 1.34 g/mL, or 1.35 g/mL, or 1.36 g/mL, or 1.37 g/mL, or 1.38 g/mL, or 1.39 g/mL, or 1.4 g/mL, or 1.41 g/mL, or 1.42 g/mL, or 1.43 g/mL, or 1.44 g/mL, or 1.45 g/mL, or 1.46 g/mL, or 1.47 g/mL, or 1.48 g/mL, or 1.49 g/mL, or 1.5 g/mL Note: The density of an organic liquid phase may be less than or equal to or greater than or equal to one or more or a combination of the following: 0.5 g/mL, or 0.51 g/mL, or 0.52 g/mL, or 0.53 g/mL, or 0.54 g/mL, or 0.55 g/mL, or 0.56 g/mL, or 0.57 g/mL, or 0.58 g/mL, or 0.59 g/mL, or 0.6 g/mL, or 0.61 g/mL, or 0.62 g/mL, or 0.63 g/ml, 0.64 g/mL, or 0.65 g/mL, or 0.66 g/mL, or 0.67 g/mL, or 0.68 g/mL, or 0.69 g/mL, or 0.70 g/mL, or 0.71 g/mL, or 0.72 g/mL, or 0.73 g/mL, or 0.74 g/mL, or 0.75 g/mL, or 0.76 g/mL, or 0.77 g/mL, or 0.78 g/mL, or 0.79 g/mL, or 0.8 g/mL, or 0.805 g/mL, or 0.81 g/mL, or 0.815 g/mL, or 0.82 g/mL, or 0.825 g/mL, or 0.83 g/mL, or 0.835 g/mL, or 0.84 g/mL, or 0.845 g/mL, or 0.85 g/mL, or 0.855 g/mL, or 0.86 g/mL, or 0.865 g/mL, or 0.87 g/mL, or 0.875 g/mL, or 0.88 g/mL, or 0.885 g/mL, or 0.89 g/mL, or 0.895 g/mL, or 0.9 g/mL, or 0.905 g/mL, or 0.91 g/mL, or 0.915 g/mL, or 0.92 g/mL, or 0.925 g/mL, or 0.93 g/mL, or 0.935 g/mL, or 0.94 g/mL, or 0.945 g/mL, or 0.95 g/mL, or 0.955 g/mL, or 0.96 g/mL, or 0.965 g/mL, or 0.97 g/mL, or 0.975 g/mL, or 0.98 g/mL, or 0.985 g/mL, or 0.99 g/mL, or 0.995 g/mL, or 1 g/mL, or 1.005 g/mL, or 1.01 g/mL, or 1.015 g/mL, or 1.02 g/mL, or 1.025 g/mL, or 1.03 g/mL, or 1.035 g/mL, or 1.04 g/mL, or 1.045 g/mL, or 1.05 g/mL, or 1.055 g/mL, or 1.06 g/mL, or 1.065 g/mL, or 1.07 g/mL, or 1.075 g/mL, or 1.08 g/mL, or 1.085 g/mL, or 1.09 g/mL, or 1.095 g/mL, or 1.1 g/mL, or 1.11 g/mL, or 1.12 g/mL, or 1.13 g/mL, or 1.14 g/mL, or 1.15 g/mL, or 1.16 g/mL, or 1.17 g/mL, or 1.18 g/mL, or 1.19 g/mL, or 1.2 g/mL, or 1.21 g/mL, or 1.22 g/mL, or 1.23 g/mL, or 1.24 g/mL, or 1.25 g/mL, or 1.26 g/mL, or 1.27 g/mL, or 1.28 g/mL, or 1.29 g/mL, or 1.3 g/mL, or 1.31 g/mL, or 1.32 g/mL, or 1.33 g/mL, or 1.34 g/mL, or 1.35 g/mL, or 1.36 g/mL, or 1.37 g/mL, or 1.38 g/mL, or 1.39 g/mL, or 1.4 g/mL, or 1.41 g/mL, or 1.42 g/mL, or 1.43 g/mL, or 1.44 g/mL, or 1.45 g/mL, or 1.46 g/mL, or 1.47 g/mL, or 1.48 g/mL, or 1.49 g/mL, or 1.5 g/mL Note: The density of an aqueous liquid phase may be less than or equal to or greater than or equal to one or more or a combination of the following: 0.5 g/mL, or 0.51 g/mL, or 0.52 g/mL, or 0.53 g/mL, or 0.54 g/mL, or 0.55 g/mL, or 0.56 g/mL, or 0.57 g/mL, or 0.58 g/mL, or 0.59 g/mL, or 0.6 g/mL, or 0.61 g/mL, or 0.62 g/mL, or 0.63 g/ml, 0.64 g/mL, or 0.65 g/mL, or 0.66 g/mL, or 0.67 g/mL, or 0.68 g/mL, or 0.69 g/mL, or 0.70 g/mL, or 0.71 g/mL, or 0.72 g/mL, or 0.73 g/mL, or 0.74 g/mL, or 0.75 g/mL, or 0.76 g/mL, or 0.77 g/mL, or 0.78 g/mL, or 0.79 g/mL, or 0.8 g/mL, or 0.805 g/mL, or 0.81 g/mL, or 0.815 g/mL, or 0.82 g/mL, or 0.825 g/mL, or 0.83 g/mL, or 0.835 g/mL, or 0.84 g/mL, or 0.845 g/mL, or 0.85 g/mL, or 0.855 g/mL, or 0.86 g/mL, or 0.865 g/mL, or 0.87 g/mL, or 0.875 g/mL, or 0.88 g/mL, or 0.885 g/mL, or 0.89 g/mL, or 0.895 g/mL, or 0.9 g/mL, or 0.905 g/mL, or 0.91 g/mL, or 0.915 g/mL, or 0.92 g/mL, or 0.925 g/mL, or 0.93 g/mL, or 0.935 g/mL, or 0.94 g/mL, or 0.945 g/mL, or 0.95 g/mL, or 0.955 g/mL, or 0.96 g/mL, or 0.965 g/mL, or 0.97 g/mL, or 0.975 g/mL, or 0.98 g/mL, or 0.985 g/mL, or 0.99 g/mL, or 0.995 g/mL, or 1 g/mL, or 1.005 g/mL, or 1.01 g/mL, or 1.015 g/mL, or 1.02 g/mL, or 1.025 g/mL, or 1.03 g/mL, or 1.035 g/mL, or 1.04 g/mL, or 1.045 g/mL, or 1.05 g/mL, or 1.055 g/mL, or 1.06 g/mL, or 1.065 g/mL, or 1.07 g/mL, or 1.075 g/mL, or 1.08 g/mL, or 1.085 g/mL, or 1.09 g/mL, or 1.095 g/mL, or 1.1 g/mL, or 1.11 g/mL, or 1.12 g/mL, or 1.13 g/mL, or 1.14 g/mL, or 1.15 g/mL, or 1.16 g/mL, or 1.17 g/mL, or 1.18 g/mL, or 1.19 g/mL, or 1.2 g/mL, or 1.21 g/mL, or 1.22 g/mL, or 1.23 g/mL, or 1.24 g/mL, or 1.25 g/mL, or 1.26 g/mL, or 1.27 g/mL, or 1.28 g/mL, or 1.29 g/mL, or 1.3 g/mL, or 1.31 g/mL, or 1.32 g/mL, or 1.33 g/mL, or 1.34 g/mL, or 1.35 g/mL, or 1.36 g/mL, or 1.37 g/mL, or 1.38 g/mL, or 1.39 g/mL, or 1.4 g/mL, or 1.41 g/mL, or 1.42 g/mL, or 1.43 g/mL, or 1.44 g/mL, or 1.45 g/mL, or 1.46 g/mL, or 1.47 g/mL, or 1.48 g/mL, or 1.49 g/mL, or 1.5 g/mL Note: The density of a combined solution liquid phase may be less than or equal to or greater than or equal to one or more or a combination of the following: 0.5 g/mL, or 0.51 g/mL, or 0.52 g/mL, or 0.53 g/mL, or 0.54 g/mL, or 0.55 g/mL, or 0.56 g/mL, or 0.57 g/mL, or 0.58 g/mL, or 0.59 g/mL, or 0.6 g/mL, or 0.61 g/mL, or 0.62 g/mL, or 0.63 g/ml, 0.64 g/mL, or 0.65 g/mL, or 0.66 g/mL, or 0.67 g/mL, or 0.68 g/mL, or 0.69 g/mL, or 0.70 g/mL, or 0.71 g/mL, or 0.72 g/mL, or 0.73 g/mL, or 0.74 g/mL, or 0.75 g/mL, or 0.76 g/mL, or 0.77 g/mL, or 0.78 g/mL, or 0.79 g/mL, or 0.8 g/mL, or 0.805 g/mL, or 0.81 g/mL, or 0.815 g/mL, or 0.82 g/mL, or 0.825 g/mL, or 0.83 g/mL, or 0.835 g/mL, or 0.84 g/mL, or 0.845 g/mL, or 0.85 g/mL, or 0.855 g/mL, or 0.86 g/mL, or 0.865 g/mL, or 0.87 g/mL, or 0.875 g/mL, or 0.88 g/mL, or 0.885 g/mL, or 0.89 g/mL, or 0.895 g/mL, or 0.9 g/mL, or 0.905 g/mL, or 0.91 g/mL, or 0.915 g/mL, or 0.92 g/mL, or 0.925 g/mL, or 0.93 g/mL, or 0.935 g/mL, or 0.94 g/mL, or 0.945 g/mL, or 0.95 g/mL, or 0.955 g/mL, or 0.96 g/mL, or 0.965 g/mL, or 0.97 g/mL, or 0.975 g/mL, or 0.98 g/mL, or 0.985 g/mL, or 0.99 g/mL, or 0.995 g/mL, or 1 g/mL, or 1.005 g/mL, or 1.01 g/mL, or 1.015 g/mL, or 1.02 g/mL, or 1.025 g/mL, or 1.03 g/mL, or 1.035 g/mL, or 1.04 g/mL, or 1.045 g/mL, or 1.05 g/mL, or 1.055 g/mL, or 1.06 g/mL, or 1.065 g/mL, or 1.07 g/mL, or 1.075 g/mL, or 1.08 g/mL, or 1.085 g/mL, or 1.09 g/mL, or 1.095 g/mL, or 1.1 g/mL, or 1.11 g/mL, or 1.12 g/mL, or 1.13 g/mL, or 1.14 g/mL, or 1.15 g/mL, or 1.16 g/mL, or 1.17 g/mL, or 1.18 g/mL, or 1.19 g/mL, or 1.2 g/mL, or 1.21 g/mL, or 1.22 g/mL, or 1.23 g/mL, or 1.24 g/mL, or 1.25 g/mL, or 1.26 g/mL, or 1.27 g/mL, or 1.28 g/mL, or 1.29 g/mL, or 1.3 g/mL, or 1.31 g/mL, or 1.32 g/mL, or 1.33 g/mL, or 1.34 g/mL, or 1.35 g/mL, or 1.36 g/mL, or 1.37 g/mL, or 1.38 g/mL, or 1.39 g/mL, or 1.4 g/mL, or 1.41 g/mL, or 1.42 g/mL, or 1.43 g/mL, or 1.44 g/mL, or 1.45 g/mL, or 1.46 g/mL, or 1.47 g/mL, or 1.48 g/mL, or 1.49 g/mL, or 1.5 g/mL Note: An enthalpy of liquid-liquid phase transition temperature range may occur over a temperature range greater than or less than or equal to one or more or a combination of the following: 0° K, or 0.25° K, or 0.5° K, or 0.75° K, or 1° K, or 1.25° K, or 1.5° K, or 1.75° K, or 2° K, or 2.25° K, or 2.5° K, or 2.75° K, or 3° K, or 3.25° K, or 3.5° K, or 3.75° K, or 4° K, or 4.25° K, or 4.5° K, or 4.75° K, or 5° K, or 5.25° K, or 5.5° K, or 5.75° K, or 6° K, or 6.25° K, or 6.5° K, or 6.75° K, or 7° K, or 7.25° K, or 7.5° K, or 7.75° K, or 8° K, or 8.25° K, or 8.5° K, or 8.75° K, or 9° K, or 9.25° K, or 9.5° K, or 9.75° K, or 10° K, or 10.25° K, or 10.5° K, or 10.75° K, or 11° K, or 11.25° K, or 11.5° K, or 11.75° K, or 12° K, or 12.25° K, or 12.5° K, or 12.75° K, or 13° K, or 13.25° K, or 13.5° K, or 13.75° K, or 14° K, or 14.25° K, or 14.5° K, or 14.75° K, or 15° K, or 15.25° K, or 15.5° K, or 15.75° K, or 16° K, or 16.25° K, or 16.5° K, or 16.75° K, or 17° K, or 17.25° K, or 17.5° K, or 17.75° K, or 18° K, or 18.25° K, or 18.5° K, or 18.75° K, or 19° K, or 19.25° K, or 19.5° K, or 19.75° K, or 20° K, or 20.5° K, or 21° K, or 21.5° K, or 22° K, or 22.5° K, or 23° K, or 23.5° K, or 24° K, or 24.5° K, or 25° K, or 25.5° K, or 26° K, or 26.5° K, or 27° K, or 27.5° K, or 28° K, or 28.5° K, or 29° K, or 29.5° K, or 30° K, or 32° K, or 34° K, or 36° K, or 38° K, or 40° K, or 42° K, or 44° K, or 46° K, or 48° K, or 50° K, or 52° K, or 54° K, or 56° K, or 58° K, or 60° K, or 62° K, or 64° K, or 66° K, or 68° K, or 70° K, or 72° K, or 74° K, or 76° K, or 78° K, or 80° K, or 82° K, or 84° K, or 86° K, or 88° K, or 90° K, or 92° K, or 94° K, or 96° K, or 98° K, or 100° K Note: Density of some polypropylene glycols are about the same as water. For example, polypropylene glycol P2000 has a density of 1.00 g/mL at 20° C. For example, polypropylene glycol average molecular number 425 has a density of 1.004 g/mL at 25° C. For example, polypropylene glycol average molecular number 725 has a density of 1.007 g/mL at 25° C. For example, polypropylene glycol average molecular number 725 has a density of 1.01 g/mL at 20° C. For example, polypropylene glycol average molecular number 2000 has a density of 1.005 g/mL at 25° C. For example, polypropylene glycol average molecular number 4000 has a density of 1.004 g/mL at 25° C. For example, polypropylene glycol average molecular number 2700 has a density of 1.004 g/mL at 25° C. For example, polypropylene glycol average molecular number 1000 has a density of 1.005 g/mL at 25° C. For example, polypropylene glycol average molecular number 1200 has a density of 1.005 g/mL at 25° C.

Note: 'Molecular weight' and/or 'molecular number' may be used interchangeably

Note: The ability for some compositions to possess an enthalpy of liquid-liquid phase transition over a broad temperature range may be distinct from other liquid-liquid phase transitions and solid-liquid phase transitions, which may possess an enthalpy of phase transition in a narrow temperature range or at a particular phase transition temperature.

Note: Combining or matching specific glycol ethers with specific glycol polymers may result in one or more or a combination of the following: reduce particle count below cloud point temperature, or increase degree of particle count change at cloud point, reduce viscosity, reduce density, possess Enthalpy of phase transition greater than 2.5 kJ/kg, or narrow enthalpy of phase transition temperature range, or reduce enthalpy of phase transition temperature or temperature range, or reduce cloud point temperature, or function similar to an azeotrope in that the glycol ether remains in the same liquid phase as the glycol polymer, or increase phase transition temperature Note: At least 10%, or 20%, or 30%, or 40%, or 50%, or 60%, or 70%, or 80%, or 90%, or 95%, or 99%, or a combination thereof of an organic reagent, or glycol polymer, or liquid-liquid phase transition reagent in a composition or process or both may be in a formed liquid phase or an organic liquid phase at or above the cloud point temperature of a composition.

Note: A viscosity measurement of a second liquid phase may be conducted after separating the a liquid phase into a non-contiguously separate liquid phase and cooling it to less than or equal to 25° C. or other relevant temperature for the viscosity measurement Note: A viscosity measurement wherein at least 98 wt % of the first liquid phase is separated from the second liquid phase before measuring the viscosity of the second liquid phase at less than or equal to 25° C. or other relevant temperature for the viscosity measurement Note: In some embodiments, a combined cloud point may be when two or more non-water reagents are combined in a composition with water and resulting solution possesses a same cloud point temperature. When two or more non-solvent reagents are combined in a composition with a solvent and resulting solution possesses a same cloud point temperature. It is important to note the two or more reagents may each individually have different cloud point temperatures than the other reagent(s) when in solution with water without the presence or with less presence of the other reagent(s). It is important to note the two or more reagents may each individually have different cloud point temperatures than the other reagent(s) when in solution with the solvent without the presence or with less presence of the other reagent(s). It is important to note one or more of the two or more reagents may not possess a cloud point if not in the presence of at least one or more of the other reagents. It is important to note one or more of the two or more reagents may possess a different cloud point temperature if not in the presence of at least one or more of the other reagents.

Note: Methods for cloud point measuring, or measuring cloud point temperature, or determining the existence of a second liquid phase, or determining the existence of more than one liquid phase, or a combination thereof may include, for example, the methods described in A. Eliassi, et al *Determination of Cloud Points of Poly (propylene glycol) Aqueous Mixtures Using Particle Counting Method*, incorporated herein as a reference, or the methods described by Zheng, et al *Thermoresponsive polymers with lower critical solution temperature: from fundamental aspects and measuring techniques to recommended turbidimetry conditions*, incorporated herein as a reference.

Note: Methods for cloud point measuring, or measuring cloud point temperature, or determining the existence of a second liquid phase, or determining the existence of more than one liquid phase, or a combination thereof may require the use of a laser particle counting method in a turbulent or mixing environment. Alternatively, or additionally, light scattering methods may determine the existence of a second phase or second liquid phase. Turbidity or turbidimetry measurements may be useful for determining the existence, or formation, or both of a second liquid phase. Turbidimetry measurements using a consistent visible light source and a photodetector may be employed to determine the onset of a cloud point. Turbidimetry measurements comparing light scattering or light transmittance of a sample may be employed to determine the existence of more than one liquid phase. For example, measurements comparing light scattering or light transmittance of a sample liquid-liquid phase transition liquid with a known single liquid phase liquid, such as water or mineral oil, may be employed. The existence of a second liquid phase may be determined visually. For example, if liquid-liquid interfaces, or droplets, or cloudiness exist in a composition, it is generally indicative of the existence of two or more liquid phases in a sample.

Note: Measuring viscosity may involve using a Brookfield AMETEK Digital Rotational Viscometer. If there are more than one liquid phase, viscosity measurements may be conducted of each liquid phase in the composition. For example, a liquid-liquid phase transition composition may be separated for viscosity measurements by (1) heating 220 mL of the composition to a temperature 15° K greater than the cloud point temperature using a 250 mL jacketed separatory funnel; (2) allowing the composition to remain at a temperature 15° K greater than the cloud point temperature for 3 hours to allow liquid phases to separate into two or more liquid layers; (3) separating a sample of one liquid phase using the separatory funnel such the separated liquid phase sample is least 99.9 wt % a single liquid phase or less than 0.1 wt % of other liquid phases; (4) adjusting the temperature of the separated liquid phase sample to 5° C.; (5) adding 10 mL of the 5° C. separated liquid phase sample to a Brookfield AMETEK Low-Range Viscosity Digital Rotational Viscometer with Brookfield Temperature Control unit and appropriate spindle for estimated viscosity range; (6) Measuring viscosity of the separated liquid phase using Brookfield AMETEK Low-Range Viscosity Digital Rotational Viscometer while heating sample from 5° C. to 30° C., wherein the sample increases in temperature at a rate equal to 1° K per 10 minutes.

Note: Generally when two or more liquid-liquid phase transitioning reagents are combined with water, and wherein said two or more reagents each possess a cloud point or liquid-liquid phase transition in an solution with water if isolated from or independent from the other reagents, the resulting solution usually comprises two cloud points, with each cloud point representing the cloud point of one of the two or more reagents. Generally when two or more liquid-liquid phase transitioning reagents are combined with water, and wherein said two or more reagents each possess a cloud point or liquid-liquid phase transition in an solution with water if isolated from or independent from the other reagents, the resulting solution can comprise one cloud point, with this one cloud point representing the cloud point of one of the two liquid-liquid phase transitioning reagents. A notable exception is mixtures of liquid-liquid phase transitioning reagents with common cloud points.

Note: In some embodiments, designing a composition with a combined cloud point may involve employing a glycol polymer or glycol polymer ether or both with a first cloud point temperature and a glycol ether with a second cloud point temperature, wherein the first cloud point temperature is as close as possible to the second cloud point temperature. In some instances, the cloud point temperature of a binary mixture of polymer and water may be different from a binary mixture of the glycol ether and water by a significant margin, for example, greater than +/−1° K, or +/−1.5° K, or +/−2° K, or +/−2.5° K, or +/−3° K, or +/−3.5° K, or +/−4° K, or +/−4.5° K, or +/−5° K, or +/−5.5° K, or +/−6° K, or +/−6.5° K, or +/−7° K, or +/−7.5° K, or +/−8° K, or +/−8.5° K, or +/−9° K, or +/−9.5° K, or +/−10° K. Generally, the cloud point temperature of a combined cloud point will be different from each of the cloud point temperatures of the respective reagents in binary mixtures with water.

Note: Some compositions may possess more than one cloud point temperature.

Note: Some compositions may contain a LCST liquid-liquid phase transition, or a UCST liquid-liquid phase transition, or both.

Note: Reducing density of an aqueous liquid phase or a liquid phase comprising more than 50 wt % water may be conducted by employing highly water soluble low density reagents, such as, including, but not limited to, alcohols, methanol, ethanol, acetone, organic solvents, highly soluble ethers, aldehydes, ketones, esters, low density inorganics, ammonia, or amine, or a combination thereof.

Embodiments

Set 1
1. A liquid-liquid phase transition process comprising:
   forming a composition comprising a glycol polymer and water;
   phase transitioning the composition at or above the composition's cloud point temperature to form at least two liquid phases wherein enthalpy of liquid-liquid phase transition is greater than 5 kJ per kg as measured by a calorimeter;

wherein a first liquid phase of said at least two liquid phases comprises greater than 50 wt. % water; and wherein a second liquid phase of said at least two liquid phases comprises a glycol polymer and wherein:

(1) the second liquid phase comprising a glycol polymer has a density less than the density of the liquid phase comprising greater than 50 wt % water according to ASTM D1122; or (2) wherein the second liquid phase comprising the glycol polymer has a viscosity less than 100 cP at 25° C. wherein viscosity is measured on the second liquid phase as a non-contiguous separate phase with a viscometer; or (3) both (1) and (2).

2. The process of embodiment 1 wherein the glycol polymer has an average molecular number greater than or equal to 1000 and less than or equal to 3,000.

3. The process of embodiment 1 or embodiment 2 wherein the glycol polymer comprises a polypropylene glycol.

4. The process of embodiment 1 or embodiment 2 wherein the glycol polymer comprises a polyethylene glycol.

5. The process of embodiment 1 or embodiment 2 wherein the glycol polymer comprises a block co-polymer selected from PEG-Ran-PG, or PPG-PEG-PPG, or PPG-PEG-PPG, or PEG-PPG-PEG, or PEG-PPG-PEG, or PEG-PPG-PEG, or any combination thereof.

6. The process of embodiment 1 or embodiment 2 wherein the second liquid phase comprising a glycol polymer further comprises a glycol ether selected from an akylene glycol alkyl ether, a dialkylene glycol alkyl ether, a trialkylene glycol alkyl ether, an alkylene glycol dialkyl, or any combination thereof wherein alkyl is a C1-C6 alkyl.

7. The process of embodiment 1 or embodiment 2 wherein the temperature of phase transitioning comprises a combined cloud point.

8. The process of embodiment 1 or embodiment 2 wherein the second liquid phase further comprises a density reducing reagent, a density enhancing reagent, a viscosity reducing reagent, or any combination thereof.

9. The process of embodiment 1 or embodiment 2 wherein the glycol polymer comprises at least 80 wt. % of the second liquid phase phase based on the total weight of the second phase and wherein the second liquid phase comprises less than 20 wt. % water phase based on the total weight of the second phase.

10. A glycol polymer composition comprising:

from about 1 to about 80 percent by weight of total composition of at least one glycol polymer having a number average molecular weight of less than or equal to 3,000;

from about 1 to about 99 percent by weight of total composition of water;

wherein the composition comprises a cloud point temperature above which a liquid phase comprising glycol polymer forms due to a liquid-liquid phase transition and wherein (1) density of the formed liquid phase is less than 1 gram per mL; and (2) enthalpy of liquid-liquid phase transition is greater than 5 kJ per kg as measured by a calorimeter.

11. The composition of embodiment 10 wherein the glycol polymer has a number average molecular weight greater than or equal to 1000.

12. The composition of embodiment 10 or embodiment 11 further comprising from about 0.25 to about 30 percent by weight of total composition of an organic reagent with a density less than 1 g/mL at 10° C. and wherein (1) said organic reagent possesses a cloud point temperature in water in the absence of glycol polymer; (2) said glycol polymer possesses a cloud point temperature in water in the absence of the organic reagent; and wherein (1) and (2) are different temperatures by greater than +/−0.3 deg K.

13. The composition of embodiment 10 or 11 wherein said organic reagent and the glycol polymer exhibit a combined cloud point.

14. The composition of embodiment 10 or embodiment 11 further comprising from about 0.5 to about 50 percent by weight of a glycol ether selected from an akylene glycol alkyl ether, a dialkylene glycol alkyl ether, a trialkylene glycol alkyl ether, an alkylene glycol dialkyl, or any combination thereof wherein alkyl is a C1-C6 alkyl.

15. The composition of embodiment 10 or embodiment 11 wherein the glycol polymer comprises a block co-polymer selected from PEG-Ran-PG, or PPG-PEG-PPG, or PPG-PEG-PPG, or PEG-PPG-PEG, or PEG-PPG-PEG, or PEG-PPG-PEG, or PEG-PPG-PEG, or any combination thereof.

Set 2

1. A liquid-liquid phase transition process comprising:

forming a composition comprising a glycol polymer and water;

phase transitioning the composition at or above the composition's cloud point temperature to form at least two liquid phases;

wherein a first liquid phase of said at least two liquid phases comprises greater than 50 wt % water;

wherein a second liquid phase of said at least two liquid phases comprises a glycol polymer; and wherein (1) the second liquid phase comprising a glycol polymer has a density less than the density of the liquid phase comprising greater than 50 wt % water according to ASTM D1122; and (2) enthalpy of liquid-liquid phase transition is greater than 5 kJ per kg as measured by a calorimeter.

2. The process of embodiment 1 wherein the glycol polymer comprises a polypropylene glycol.

3. The process of embodiment 1 wherein the glycol polymer comprises a polyethylene glycol.

4. The process of embodiment 1 wherein the glycol polymer comprises a block co-polymer.

5. The process of embodiment 4 wherein the block co-polymer is selected from PEG-Ran-PG, or PPG-PEG-PPG, or PPG-PEG-PPG, or PEG-PPG-PEG, or PEG-PPG-PEG, or PEG-PPG-PEG, or PEG-PPG-PEG, or any combination thereof.

6. The process of embodiment 1 wherein the glycol polymer has an average molecular number greater than or equal to 1,000 and less than or equal to 3,000.

7. The process of embodiment 1 wherein the second phase comprising a glycol polymer further comprises a glycol ether.

8. The process of embodiment 7 wherein said glycol ether is selected from an akylene glycol alkyl ether, a dialkylene glycol alkyl ether, a trialkylene glycol alkyl ether, an alkylene glycol dialkyl, or any combination thereof wherein alkyl is a C1-C6 alkyl.

9. The process of embodiment 7 wherein the cloud point comprises a combined cloud point.

10. A glycol polymer composition comprising:

from about 1 to about 80 percent by weight of total composition of at least one glycol polymer having a number average molecular weight of less than or equal to 3,000;

from about 1 to about 99 percent by weight of total composition of water;

wherein the composition comprises a cloud point temperature above which a liquid phase comprising glycol polymer forms due to a liquid-liquid phase transition and wherein (1) density of the formed liquid phase is less than 1 gram per mL; and (2) enthalpy of liquid-liquid phase transition is greater than 5 kJ per kg as measured by a calorimeter.

11. The composition of embodiment 10 further comprising from about 0.25 to about 30 percent by weight of total composition of an organic reagent with a density less than 1 g/mL at 10° C.

12. The composition of embodiment 11 wherein (1) said organic reagent possesses a cloud point temperature in water in the absence of glycol polymer; and (2) said glycol polymer possesses a cloud point temperature in water in the absence of the organic reagent.

13. The composition of embodiment 12 wherein (1) and (2) are different temperatures.

14. The composition of embodiment 11 wherein said organic reagent and the glycol polymer exhibit a combined cloud point.

15. The composition of embodiment 11 wherein (1) said glycol polymer possesses a cloud point temperature in water in the absence of the organic reagent; (2) said composition possesses a combined cloud point; and (3) wherein the temperature of '(1)' is different from the temperature of '(2)' by greater than +/−0.3 deg K.

16. The composition of embodiment 11 wherein: (1) said organic reagent possesses a cloud point temperature in water in the absence of glycol polymer; (2) said glycol polymer possesses a cloud point temperature in water in the absence of the organic reagent; (3) said composition possesses a combined cloud point; and (4) wherein the temperature of '(3)' is different than the temperature of '(1)', or '(2)', or both.

17. A glycol polymer composition comprising:
from about 1 to about 80 percent by weight of total composition of at least one polypropylene glycol having a number average molecular weight greater than or equal to 2,000 and less than or equal to 3,000;
from about 1 to about 99 percent by weight of total composition of water;
wherein (1) the composition comprises a single liquid phase combined solution at a temperature below 5° C. which may be defined as determined by the number of particles per mL of the composition wherein the number of particles per mL of the composition is less than 150 as measured by laser particle counting at a temperature below 5° C.; and
(2) enthalpy of liquid-liquid phase transition is greater than 5 kJ per kg as measured by a calorimeter.

18. The composition of embodiment 17 further comprising from about 0.5 to about 50 percent by weight of a glycol ether.

19. A liquid-liquid phase transition process comprising:
forming a composition comprising a glycol polymer with an average molecular number greater than or equal to 1000 and water; and
phase transitioning the composition into at least two liquid phases;
wherein a first liquid phase of said at least two liquid phases comprises greater than 50 wt % water;
wherein a second liquid phase of said at least two liquid phases comprises the glycol polymer with an average molecular number greater than or equal to 1000;

wherein the second liquid phase comprising the glycol polymer has a viscosity less than 100 cP at 25° C. wherein viscosity is measured on the second liquid phase as a non-contiguous separate phase with a viscometer; and wherein the enthalpy of liquid-liquid phase transition is greater than 5 kJ per kg of composition as measured by a calorimeter.

20. The process of embodiment 19 wherein the second liquid phase further comprises a density reducing reagent.

21. The process of embodiment 19 wherein the second liquid phase further comprises a density enhancing reagent.

22. The process of embodiment 19 wherein the second liquid phase further comprises a viscosity reducing reagent.

23. The process of embodiment 19 wherein the second liquid phase further comprises a glycol ether.

24. The process of embodiment 23 wherein the glycol ether and the glycol polymer have a combined cloud point.

25. The process of embodiment 19 wherein the glycol polymer comprises at least 50 wt. % of the second liquid phase based on the total weight of the second phase.

26. The process of embodiment 19 wherein the glycol polymer comprises at least 80 wt. % of the second liquid phase based on the total weight of the second phase.

27. The process of embodiment 19 wherein the second liquid phase comprises less than 20 wt. % water phase based on the total weight of the second phase.

28. The process of embodiment 19 wherein the cloud point temperature of the composition is greater than 25° C.

29. The process of embodiment 19 wherein the cloud point temperature of the composition is less than 25° C.

The invention claimed is:

1. A liquid-liquid phase transition process comprising:
forming a composition comprising a glycol polymer, water, and a glycol ether, wherein the composition has a cloud point temperature; and
phase transitioning the composition at or above the composition's cloud point temperature to form at least two liquid phases;
wherein a first liquid phase of said at least two liquid phases comprises greater than 50 wt % water;
wherein a second liquid phase of said at least two liquid phases comprises the glycol polymer and the glycol ether; and
wherein the second liquid phase comprising the glycol polymer has a density less than the density of the liquid phase comprising greater than 50 wt % water when non-contiguously separate from other liquid phases and at a temperature of 10° C. according to ASTM D1122; and
enthalpy of liquid-liquid phase transition is greater than 5 kJ per kg as measured by a mixing calorimeter;
wherein said glycol ether is selected from an alkylene glycol alkyl ether, a dialkylene glycol alkyl ether, a trialkylene glycol alkyl ether, an alkylene glycol dialkyl ether, or any combination thereof wherein alkyl is a C1-C6 alkyl;
wherein the cloud point comprises a combined cloud point; and
wherein the process is employed in an HVAC system.

2. The process of claim 1 wherein the glycol polymer comprises a polypropylene glycol.

3. The process of claim 1 wherein the glycol polymer comprises a polyethylene glycol.

4. The process of claim 1 wherein the glycol polymer comprises a block co-polymer.

5. The process of claim 4 wherein the block co-polymer is selected from PEG-Ran-PG, or PPG-PEG-PPG, or PEG-PPG-PEG, or any combination thereof.

6. The process of claim 1 wherein the glycol polymer has an average molecular number greater than or equal to 1,000 and less than or equal to 3,000.

7. The process of claim 1 wherein the glycol ether is diethylene glycol monohexyl ether.

8. A liquid-liquid phase transition process comprising:
forming a composition comprising a glycol polymer with an average molecular number greater than or equal to 1000, water, and a glycol ether; and
phase transitioning the composition into at least two liquid phases;
wherein a first liquid phase of said at least two liquid phases comprises greater than 50 wt % water;
wherein a second liquid phase of said at least two liquid phases comprises the glycol polymer with an average molecular number greater than or equal to 1000 and the glycol ether;
wherein the second liquid phase comprising the glycol polymer has a viscosity less than 100 cP at 25° C. wherein viscosity is measured on the second liquid phase as a non-contiguous separate phase with a viscometer; and
wherein the enthalpy of liquid-liquid phase transition is greater than 5 kJ per kg of composition as measured by a mixing calorimeter; and
wherein said glycol ether is selected from an alkylene glycol alkyl ether, a dialkylene glycol alkyl ether, a trialkylene glycol alkyl ether, an alkylene glycol dialkyl ether, or any combination thereof wherein alkyl is a C1-C6 alkyl; and
wherein the process is employed in an HVAC system.

9. The process of claim 8 wherein the second liquid phase further comprises a density reducing reagent.

10. The process of claim 8 wherein the second liquid phase further comprises a density enhancing reagent.

11. The process of claim 8 wherein the second liquid phase further comprises a viscosity reducing reagent.

12. The process of claim 8 wherein the glycol ether and the glycol polymer have a combined cloud point.

13. The process of claim 8 wherein the glycol polymer comprises at least 50 wt. % of the second liquid phase based on the total weight of the second phase.

14. The process of claim 8 wherein the glycol polymer comprises at least 80 wt. % of the second liquid phase based on the total weight of the second phase.

15. The process of claim 8 wherein the second liquid phase comprises less than 20 wt. % water based on the total weight of the second phase.

16. The process of claim 8 wherein the composition comprises a cloud point temperature of greater than 25° C.

17. The process of claim 8 wherein the composition comprises a cloud point temperature of less than 25° C.

18. The process of claim 8 wherein the glycol ether is diethylene glycol monohexyl ether.

* * * * *